(12) United States Patent
Ge et al.

(10) Patent No.: US 11,251,981 B2
(45) Date of Patent: Feb. 15, 2022

(54) COMMUNICATION METHOD AND APPARATUS

(71) Applicant: HUAWEI TECHNOLOGIES CO., LTD., Guangdong (CN)

(72) Inventors: Cuili Ge, Beijing (CN); Yanmei Yang, Beijing (CN); Yizhuang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/376,327

(22) Filed: Apr. 5, 2019

(65) Prior Publication Data

US 2019/0238352 A1 Aug. 1, 2019

Related U.S. Application Data

(63) Continuation of application No. PCT/CN2018/088256, filed on May 24, 2018.

(30) Foreign Application Priority Data

Sep. 30, 2017 (CN) .......................... 201710945904.5
Jan. 15, 2018 (CN) .......................... 201810036433.0

(51) Int. Cl.
*H04L 12/18* (2006.01)
*H04W 4/08* (2009.01)
(Continued)

(52) U.S. Cl.
CPC .......... *H04L 12/18* (2013.01); *H04L 65/1073* (2013.01); *H04L 65/403* (2013.01);
(Continued)

(58) Field of Classification Search
CPC ... H04L 12/18; H04L 65/1073; H04L 65/403; H04L 67/26; H04W 4/08; H04W 76/40; H04W 76/45
See application file for complete search history.

(56) References Cited

U.S. PATENT DOCUMENTS 7,991,417 B2 * 8/2011 Albertsson ............ H04W 84/08
455/518
9,432,820 B2 * 8/2016 Anchan ................. H04W 76/40
(Continued)

FOREIGN PATENT DOCUMENTS

CN 101527641 A 9/2009
CN 105307126 A 2/2016
(Continued)

OTHER PUBLICATIONS

3GPP TS 23.379 V0.2.0, 3rd Generation Partnership Project Technical Specification Group Services and System Aspects, Functional architecture and information flows to support Mission Critical Push To Talk(MCPTT), Stage 2 (Release 14), Jun. 2016, 171 pages.
(Continued)

*Primary Examiner* — Jerry B Dennison
(74) *Attorney, Agent, or Firm* — Fish & Richardson P.C.

(57) ABSTRACT

The present disclosure relates to communication methods and apparatus. One example method includes receiving, by a target service entity, a first request message from a first participating service entity, and sending, by the target service entity, a first response message to the first participating service entity. The first request message comprises an identity of a target multicast bearer and a group identity of a terminal group. The first response message is used to instruct the first participating service entity to use the target multicast bearer to send service data of the terminal group.

22 Claims, 12 Drawing Sheets

(51) Int. Cl.
  *H04W 76/40* (2018.01)
  *H04W 76/45* (2018.01)
  *H04L 29/06* (2006.01)
  *H04L 29/08* (2006.01)

(52) U.S. Cl.
  CPC .............. *H04L 67/26* (2013.01); *H04W 4/08* (2013.01); *H04W 76/40* (2018.02); *H04W 76/45* (2018.02)

(56) References Cited

U.S. PATENT DOCUMENTS

| | | | |
|---|---|---|---|
| 9,510,166 B1* | 11/2016 | Allen | H04W 4/08 |
| 10,225,226 B2* | 3/2019 | Ko | H04L 51/26 |
| 10,645,732 B2* | 5/2020 | Jiang | H04W 56/0005 |
| 11,128,991 B2* | 9/2021 | Yang | H04W 4/08 |
| 2008/0045224 A1* | 2/2008 | Lu | H04L 65/103 455/446 |
| 2008/0112431 A1* | 5/2008 | Jagadesan | H04W 72/005 370/453 |
| 2008/0220765 A1* | 9/2008 | Chu | H04L 65/4061 455/422.1 |
| 2012/0099504 A1* | 4/2012 | Hyun | H04L 12/1818 370/312 |
| 2012/0170501 A1 | 7/2012 | Drozt et al. | |
| 2013/0064160 A1* | 3/2013 | Newberg | H04W 76/40 370/312 |
| 2015/0173107 A1 | 6/2015 | Newberg et al. | |
| 2016/0227588 A1* | 8/2016 | Patel | H04W 92/02 |
| 2016/0262068 A1* | 9/2016 | Won | H04L 67/12 |
| 2016/0381526 A1* | 12/2016 | Allen | H04L 67/42 709/203 |
| 2017/0078371 A1* | 3/2017 | Kodaypak | H04L 12/189 |
| 2017/0188333 A1* | 6/2017 | Wu | H04W 4/06 |
| 2017/0303100 A1* | 10/2017 | Dong | H04L 65/4038 |
| 2017/0303102 A1* | 10/2017 | Dong | H04W 4/10 |
| 2018/0077208 A1* | 3/2018 | Li | H04W 4/10 |
| 2018/0109911 A1* | 4/2018 | Chandramouli | H04W 76/40 |
| 2018/0332462 A1 | 11/2018 | Kim et al. | |
| 2019/0158986 A1* | 5/2019 | Marque-Pucheu | H04W 4/06 |
| 2019/0238352 A1* | 8/2019 | Ge | H04L 67/26 |
| 2021/0227078 A1* | 7/2021 | Tokuchi | H04M 15/8083 |

FOREIGN PATENT DOCUMENTS

| | | | |
|---|---|---|---|
| CN | 105813025 | A | 7/2016 |
| EP | 3079383 | A1 | 10/2016 |
| WO | 2016161242 | A1 | 10/2016 |
| WO | 2017004062 | A1 | 1/2017 |
| WO | 2017078491 | A1 | 5/2017 |

OTHER PUBLICATIONS

Office Action issued in Chinese Application No. 201810036433.0 dated Feb. 3, 2020, 9 pages.
Harris Corporation, Nokia,"Pseudo-CR on Multiple MBMS servers solution to TS 23.280",3GPP TSG-SA WG6 Meeting #14 S6-161626(revision of S6-161614, S6-161565),Reno, Nevada, USA, Nov. 14-18, 2016,total 8 pages.
Harris Corporation, Nokia,Multiple MBMS servers solution to TS 23.280,3GPP TSG-SA WG6 Meeting #14 S6-161614(revision of S6-161565),Reno, United States, Nov. 14-18, 2016,total 7 pages.
3GPP TS 23.246 V14.2.0 (Sep. 2017);3rd Generation Partnership Project;Technical Specification Group Services and System Aspects;Multimedia Broadcast/Multicast Service (MBMS);Architecture and functional description(Release 14),total 76 pages.
Huawei, HiSilicon,"Pseudo-CR on key issue about the MBMS bearer management involved multiple MCPTT systems",3GPP TSG-SA WG6 Meeting #11 S6-160426(revision of S6-160xxx),Bangalore, India, Apr. 23-27, 2016,total 3 pages.
3GPP TS 23.468 V14.0 0 (Mar. 2017);3rd Generation Partnership Project;Technical Specification Group Services and System Aspects;Group Communication System Enablers for LTE (GCSE_LTE); Stage 2(Release 14),total 30 pages.
Nokia,"Clarifications and Corrections",3GPP TSG-SA WG6 Meeting #14 S6-161565(revision of S6-161458, 1356), Reno, Nevada, USA, Nov. 14-18, 2016,total 6 pages.
3GPP TS 23.280 V15.1.0 (Sep. 2017);3rd Generation Partnership Project;Technical Specification Group Services and System Aspects;Common functional architecture to support mission critical services;Stage 2(Release 15),total 158 pages.
Harris Corporation, Nokia,"Pseudo-CR on Multiple MBMS servers solution to TS 23.280",3GPP TSG-SA WG6 Meeting #14 S6-161632(revision of S6-161626),Reno, Nevada, USA, Nov. 14-18, 2016,total 8 pages.
International Search Report and Written Opinion issued in International Application No. PCT/CN2018/088256 dated Aug. 2, 2018, 6 pages.
Extended European Search Report issued in European Application No. 18849392.8 dated Aug. 21, 2019, 10 pages.
S6-161271—Huawei et al., "Pseudo-CR on MBMS bearer usage for separating MBMS management from MC service server," 3GPP TSG-SA WG6 Meeting #13, Sophia Antipolis, France, XP051172300, Oct. 10-14, 2016, 8 pages.
Office Action issued in Japanese Application No. 2019-517982 dated Jun. 15, 2020, 9 pages (with English translation).
EPO Communication under Rule 71(3) EPC iissued in European Application No. 18849392.8 dated Jun. 16, 2020, 106 pages.
Nec, "Pseudo-CR on editorial corrections," 3GPP TSG-SA WG6 Meeting #14, S6-161544, Reno, Nevada, USA, Nov. 14-18, 2016, 42 pages.
Office Action issued in Japanese Application No. 2019-517982 dated Feb. 8, 2021, 5 pages (with English translation).

\* cited by examiner

ABSTRACT# COMMUNICATION METHOD AND APPARATUS

CROSS-REFERENCE TO RELATED APPLICATIONS

This application is a continuation of International Application No. PCT/CN2018/088256, filed on May 24, 2018, which claims priority to Chinese Patent Application No. 201710945904.5, filed on Sep. 30, 2017 and Chinese Patent Application No. 201810036433.0, filed on Jan. 15, 2018, The disclosures of the aforementioned applications are hereby incorporated by reference in their entireties.

TECHNICAL FIELD

This application relates to the field of mobile communications technologies, and in particular, to a communication method and an apparatus.

BACKGROUND

Public trunking services, including mission critical push-to-talk (MCPTT), mission critical video (MCVideo), mission critical data (MCData), and the like, are used in public security applications and general commercial applications, for example, public utilities or railway applications, and support one-to-many group communication.

For one-to-many group communication, a mission critical service system supports two media transmission modes: unicast bearer transmission and multicast bearer transmission. Multicast bearer transmission may be implemented by using a mission critical service entity (MC service entity). The MC service entity includes, for example, a mission critical service server (MC service server). The MC service entity may be logically divided into a controlling service entity and a participating service entity. The participating service entity is mainly configured to register a terminal, send data to the registered terminal, and determine to send data to a terminal group by using unicast bearer transmission or a multicast bearer transmission. The controlling service entity is mainly configured to manage establishment of group communication, receive uplink service data of the terminal group, and distribute the service data to the terminal group by using the participating service entity. The terminal group may include terminals registered with a same participating service entity, or may include terminals registered with different participating service entities.

When the terminals in the terminal group are registered with different participating service entities, the different participating service entities may all send data to the terminal group, and the sent data may be the same. Consequently, the terminals in the terminal group repeatedly receive the same data, causing a resource waste.

SUMMARY

This application provides a communication method and an apparatus to reduce a quantity of times of receiving same service data by a terminal group and save resources.

According to a first aspect, this application provides a communication method, where the method may be performed by a target service entity or a chip in a target service entity, and the target service entity may be a controlling service entity or a multicast bearer management entity. The method includes: first receiving, by a target service entity, a first request message from a first participating service entity, where the first request message includes a group identity and an identity of a target multicast bearer, and the first request message is used to request to use the target multicast bearer to send service data of a terminal group corresponding to the group identity; and then sending, by the target service entity, a first response message to the first participating service entity, where the first response message includes a status of use of the target multicast bearer by the terminal group.

In the method, after the target service entity receives, from the first participating service entity, the first request message used to request to use the target multicast bearer to send the service data of the terminal group, the target service entity sends the status of use of the target multicast bearer by the terminal group to the first participating service entity, so that the first participating service entity can determine, according to the received status of use, whether the target multicast bearer can be used to send the service data to the terminal group. For example, the first participating service entity uses the target multicast bearer to send the service data only when the first participating service entity determines that the status of use of the target multicast bearer by the terminal group is "not in use". This helps prevent a plurality of participating service entities from simultaneously using the target multicast bearer to send data to the terminal group, and further helps prevent a terminal in the terminal group from repeatedly receiving same service data. Therefore, resources can be saved.

In the method, the status of use of the target multicast bearer by the terminal group may also be expressed as a status of transmission to the terminal group by the target multicast bearer. The status of transmission is a status of transmitting service data, where the service data includes control signaling and media data.

In a possible implementation, the status of use of the target multicast bearer by the terminal group in the method may be implemented in the following manners:

Implementation 1: The status of use is "in use", or the status of use is "not in use".

In this implementation, the target service entity records the status of use of the target multicast bearer as "in use" or "not in use".

"In use" indicates that currently a participating service entity is using the target multicast bearer to send service data or that currently a participating service entity is using the target multicast bearer and is ready to send service data.

"Not in use" indicates that currently no service entity is using the target multicast bearer to send service data, or that currently no participating service entity is using the target multicast bearer nor is ready to send service data.

Implementation 2: The status of use is "service data of the terminal group is being sent on the target multicast bearer", or the status of use is "no service data of the terminal group is being sent on the target multicast bearer".

In this implementation, the target service entity records the status of use of the target multicast bearer as "service data of the terminal group is being sent on the target multicast bearer", or "no service data of the terminal group is being sent on the target multicast bearer".

"Service data of the terminal group is being sent on the target multicast bearer" indicates that currently the target multicast bearer is used to send the service data of the terminal group.

"No service data of the terminal group is being sent on the target multicast bearer" indicates that currently the target multicast bearer is not being used to send the service data of the terminal group.

Implementation 3: The status of use is "no participating service entity is using the target multicast bearer to send service data of the terminal group", or the status of use is "a participating service entity is using the target multicast bearer to send service data of the terminal group", or the status of use is "a second participating service entity is using the target multicast bearer to send service data of the terminal group".

The implementation 3 is to further record, on a basis of the implementation 2, an object using the target multicast bearer, that is, a participating service entity.

Specifically, in the implementation 3, "service data of the terminal group is being sent on the target multicast bearer" in the implementation 2 is recorded as "a participating service entity is using the target multicast bearer to send service data of the terminal group", or "a second participating service entity is using the target multicast bearer to send service data of the terminal group". The second participating service entity is any participating service entity associated with the target service entity.

In the implementation 3, "no service data of the terminal group is being sent on the target multicast bearer" in the implementation 2 is recorded as "no participating service entity is using the target multicast bearer to send service data of the terminal group".

It should be noted that, all the foregoing three implementations are methods for recording the status of use of the target multicast bearer. In an actual application, any one or more of the methods may be selected for implementing.

In a possible implementation, the method includes: receiving, by the target service entity, an indication message from the first participating service entity, where the indication message is used to indicate that the first participating service entity is using the target multicast bearer to send the service data of the terminal group; and updating, by the target service entity according to the indication message, the status of use. That is, when determining to use the target multicast bearer to send the service data of the terminal group, the first participating service entity notifies the target service entity. Therefore, the target service entity updates the status of use of the target multicast bearer. Further, in this case, other participating service entities cannot use the target multicast bearer to send service data to a same terminal group, so that only one participating service entity uses the target multicast bearer to send service data to the terminal group. This helps ensure that terminals in the same terminal group do not receive same service data from different participating service entities simultaneously.

In a possible implementation, the updating, by the target service entity according to the indication message, the status of use includes:

updating, by the target service entity, the status of use to "the first participating service entity is using the target multicast bearer to send the service data of the terminal group"; or updating, by the target service entity, the status of use to "a participating service entity is using the target multicast bearer to send the service data of the terminal group"; or updating, by the target service entity, the status of use to "in use".

In a possible implementation, the method further includes: receiving, by the target service entity, a second request message from a third participating service entity, where the second request message includes the group identity and the identity of the target multicast bearer, and the second request message is used to request to use the target multicast bearer to send service data of the terminal group; and sending, by the target service entity, a second response message to the third participating service entity, where the second response message includes the updated status of use of the target multicast bearer.

In a possible implementation, if the target service entity is a controlling service entity, the method in any one of the foregoing implementations further includes: sending, by the target service entity, a notification message to a third participating service entity, where the notification message includes the updated status of use of the target multicast bearer.

Because the target service entity may manage each associated participating service entity, after the target service entity updates the status of use of the target multicast bearer, the target service entity may actively notify the updated status of use to each associated participating service entity.

In a possible implementation, the method includes: receiving, by the target service entity, a notification status report message from the third participating service entity, where the notification status report message is used to indicate that the third participating service entity instructs a terminal to receive the service data of the terminal group on the target multicast bearer.

In a possible implementation, the method further includes: receiving, by the target service entity, a bearer information report message from a fourth participating service entity, where the bearer information report message includes an identifier of a service area, the group identity, and the identity of the target multicast bearer.

In the method, after creating a multicast bearer, the fourth participating service entity actively reports information about the created multicast bearer to the target service entity. For example, after creating the target multicast bearer, the fourth participating service entity sends the bearer information report message to the target service entity, where the bearer information report message includes the identifier of the service area corresponding to the target multicast bearer, the identity of the terminal group corresponding to the target multicast bearer, and the identity of the target multicast bearer. Optionally, the bearer information report message further includes information about the fourth participating service entity, for example, address information of the fourth participating service entity or identity information of the fourth service entity.

In a possible implementation, the method further includes: receiving, by the target service entity, a query request message from the first participating service entity, where the query request message includes an identifier of a service area, and the query request message is used to request to obtain the multicast bearer for sending the service data of the terminal group corresponding to the group identity; and sending, by the target service entity, a query response message to the first participating service entity, where the query response message includes the identity of the target multicast bearer.

According to a second aspect, this application provides a communication method, where the method may be performed by a participating service entity or a chip in a participating service entity. The method includes: sending, by a first participating service entity, a request message to a target service entity, where the request message includes a group identity and an identity of a target multicast bearer, and the request message is used to request to use the target multicast bearer to send service data of a terminal group corresponding to the group identity; and receiving, by the first participating service entity, a response message from the target service entity, where the response message includes a status of use of the target multicast bearer by the terminal group.

In the method, when sending the service data to the terminal group, the first participating service entity sends, to the target service entity, the request message used to request to use the target multicast bearer to send the service data of the terminal group, and then receives the response message sent by the target service entity, where the response message includes the status of use of the target multicast bearer by the terminal group. Further, the first participating service entity may determine, according to the received status of use, whether the target multicast bearer can be used to send the service data to the terminal group. For example, the first participating service entity uses the target multicast bearer to send the service data only when the first participating service entity determines that the status of use of the target multicast bearer by the terminal group is "not in use"; or the first participating service entity does not use the target multicast bearer to send the service data when the first participating service entity determines that the status of use of the target multicast bearer by the terminal group is "in use". This helps prevent a plurality of participating service entities from simultaneously using the target multicast bearer to send data to the terminal group, and further helps prevent a terminal in the terminal group from repeatedly receiving same service data. Therefore, resources can be saved.

In a possible implementation, the method includes: determining, by the first participating service entity according to the status of use, to use the target multicast bearer to send the service data of the terminal group; and sending, by the first participating service entity, an indication message to the target service entity, where the indication message is used to indicate that the first participating service entity is using the target multicast bearer to send the service data of the terminal group.

In the method, when the first participating service entity determines, according to the received status of use of the target multicast bearer by the terminal group, that the target multicast bearer can be used to send the service data of the terminal group, the first participating service entity determines to use the target multicast bearer to send the service data of the terminal group, and sends, to the target service entity, the indication message used to indicate that the first participating service entity is using the target multicast bearer to send the service data of the terminal group, so that the target service entity updates the recorded status of use of the target multicast bearer by the terminal group.

In a possible implementation, the determining, by the first participating service entity according to the status of use, to use the target multicast bearer to send the service data of the terminal group includes: when the first participating service entity has to-be-sent service data of the terminal group, and the status of use is "no participating service entity is using the target multicast bearer to send service data of the terminal group", or the status of use is "not in use", or the status of use is "no service data of the terminal group is being sent on the target multicast bearer", determining, by the first participating service entity, to use the target multicast bearer to send the service data of the terminal group; or when the status of use is "no participating service entity is using the target multicast bearer to send service data of the terminal group", or the status of use is "not in use", or the status of use is "no service data of the terminal group is being sent on the target multicast bearer", determining, by the first participating service entity, to use the target multicast bearer to send the service data of the terminal group.

In a possible implementation, when the first participating service entity determines to use the target multicast bearer to send the service data of the terminal group, the first participating service entity further sends a notification message to a terminal, where the notification message is used to instruct the terminal to receive the service data of the terminal group by using the target multicast bearer.

In an implementation, after sending the notification message to the terminal, the first participating service entity further sends a notification status report message to the target service entity, where the notification status report message is used to indicate that the first participating service entity instructs the terminal to receive the service data of the terminal group on the target multicast bearer.

In a possible implementation, when the target multicast bearer is created by the first participating service entity, the first participating service entity uses the target multicast bearer to send the service data of the terminal group; or when the target multicast bearer is created by a second participating service entity, the first participating service entity sends indication information and to-be-sent service data of the terminal group to the second participating service entity, where the indication information is used to instruct the second participating service entity to use the target multicast bearer to send the to-be-sent service data of the terminal group.

In a possible implementation, the first participating service entity sends a bearer information report message to the target service entity, where the bearer information report message includes an identifier of a service area, the group identity, and the identity of the target multicast bearer; or the first participating service entity receives a push message from the target service entity, where the push message includes an identifier of a service area, the group identity, and the identity of the target multicast bearer.

According to a third aspect, this application provides a communication method, where the method may be performed by a controlling service entity or a chip in a controlling service entity. The method includes: obtaining, by a controlling service entity, an identity of a multicast bearer, where the multicast bearer is used to transmit service data of a terminal group in a service area; sending, by the controlling service entity, a first indication message to a first participating service entity associated with the terminal group, where the first indication message is used to instruct the first participating service entity to send the service data of the terminal group by using the multicast bearer; and sending, by the controlling service entity, a second indication message to a second participating service entity associated with the terminal group, where the second indication message is used to instruct the second participating service entity not to send the service data of the terminal group to a terminal that is in the terminal group and is located in the service area, and the first participating service entity is different from the second participating service entity; where At least one terminal in the terminal group is registered with the first participating service entity, and at least one terminal in the terminal group is registered with the second participating service entity.

In the method, the controlling service entity instructs the first participating service entity to send the service data of the terminal group by using the multicast bearer, and instructs the second participating service entity not to send the service data of the terminal group to the terminal that is in the terminal group and is located in the service area. This prevents the terminal from repeatedly receiving the same service data and saves resources.

In a possible implementation, the obtaining, by a controlling service entity, an identity of a multicast bearer includes: sending, by the controlling service entity, a query message to a multicast bearer management entity, where the query message includes an identifier of the service area, and the query message is used to request to query the multicast bearer corresponding to the service area; and receiving, by the controlling service entity, a response message from the multicast bearer management entity, where the response message includes the identity of the multicast bearer.

In the method, information about the multicast bearer, such as the identity of the multicast bearer, is stored in the multicast bearer management entity. The controlling service entity requests the multicast bearer management entity, by using the query message, to query the identity of the multicast bearer corresponding to the service area. This facilitates management of the information about the multicast bearer.

In a possible implementation, the controlling service entity sends a request message to a third participating service entity associated with the terminal group, where the request message includes the identifier of the service area, and the request message is used to request the third participating service entity to create a multicast bearer in the service area.

In the method, when the controlling service entity fails to obtain the identity of the multicast bearer from the multicast bearer management entity, the controlling service entity requests a participating service entity such as the third participating service entity to create a multicast bearer.

After the multicast bearer is created, optionally, the controlling service entity receives a response message from the third participating service entity, where the response message includes an identity of the created multicast bearer. Therefore, the controlling service entity can obtain the identity of the created multicast bearer.

After the multicast bearer is created, optionally, the controlling service entity receives the response message from the third participating service entity, where the response message includes indication information, and the indication information is used to indicate that the multicast bearer is created successfully. In addition, the third participating service entity sends information about the created multicast bearer such as the identity of the multicast bearer to the multicast bearer management entity for storage. Therefore, the controlling service entity can further obtain the created multicast bearer from the multicast bearer management entity.

In a possible implementation, the request message includes an identity of the terminal group. When the request message includes the identity of the terminal group, the identity of the multicast bearer that is obtained by the controlling service entity corresponds to the terminal group corresponding to the identity of the terminal group, that is, the obtained identity of the multicast bearer is an identity of a bearer associated with the terminal group.

Optionally, the response message further includes the identity of the terminal group.

In a possible implementation, the controlling service entity receives a notification message from the first participating service entity, where the notification message is used to instruct the first participating service entity to stop sending the service data of the terminal group by using the multicast bearer; and the controlling service entity sends a third indication message to the second participating service entity, where the third indication message is used to instruct the second participating service entity to send the service data of the terminal group to a terminal that is in the terminal group and is located in the service area and is registered with the second participating service entity.

In the method, when the first participating service entity stops using the multicast bearer to send the service data of the terminal group, the controlling service entity instructs the second participating service entity to send the service data to the terminal that is in the terminal group and is located in the service area and is registered with the second participating service entity. Therefore, when the terminal that is in the terminal group and is located in the service area and is registered with the second participating service entity cannot receive the service data from the first participating service entity, the terminal may further receive the service data from the second participating service entity, so that the terminal that is in the terminal group and is located in the service area and is registered with the second participating service entity can receive the service data normally.

In a possible implementation, the controlling service entity sends indication information to a fourth participating service entity, where the indication information is used to instruct to use a unicast mode to send service data to a terminal that is in the terminal group and is located in the service area and is registered with the fourth participating service entity, and the fourth participating service entity is any one of participating service entities associated with the terminal group. To be specific, when the controlling service entity determines to stop using the multicast bearer, the controlling service entity instructs all participating service entities associated with the multicast bearer to separately use the unicast mode to send service data to terminals that are in the terminal group and are registered with the participating service entities.

In another possible implementation, the controlling service entity sends indication information to a fourth participating service entity, where the indication information is used to instruct the fourth participating service entity to send service data to a terminal that is in the terminal group and is located in the service area and is registered with the fourth participating service entity, and the fourth participating service entity is any one of participating service entities associated with the terminal group. To be specific, when the controlling service entity determines to stop using the multicast bearer, the controlling service entity instructs all participating service entities associated with the multicast bearer to separately send service data to terminals that are in the terminal group and are registered with the participating service entities. A mode of sending data is determined by the participating service entity itself, for example, may be a unicast mode or a multicast mode.

According to a fourth aspect, this application provides a communication method, where the method may be performed by a participating service entity or a chip in a participating service entity. The method includes: receiving, by a participating service entity, a second indication message from a controlling service entity, where the second indication message includes an identity of a multicast bearer, an identifier of a service area, and a group identity, and the second indication message is used to instruct the participating service entity not to send service data of a terminal group to a terminal that is in the terminal group corresponding to the group identity and is located in the service area; and sending, by the participating service entity, a fourth indication message to the terminal, where the fourth indication message includes the identity of the multicast bearer, and the fourth indication message is used to instruct the terminal to receive service data of the terminal group by using the multicast bearer.

In a possible implementation, the participating service entity receives a third indication message from the controlling service entity, where the third indication message is used to instruct the participating service entity to send the service data of the terminal group to the terminal.

According to a fifth aspect, this application provides a communication method, where the method may be performed by a participating service entity or a chip in a participating service entity. The method includes: sending, by a participating service entity, a request message to a target service entity, where the request message includes an identifier of a service area and a group identity, the request message is used to request to query a target multicast bearer, and the target multicast bearer is used to send, in the service area, service data of a terminal group corresponding to the group identity; receiving, by the participating service entity, a response message from the target service entity, where the response message includes an identity of the target multicast bearer; and sending, by the participating service entity, an indication message to a terminal, where the indication message is used to instruct the terminal to receive the service data of the terminal group by using the target multicast bearer.

In the method, the participating service entity may actively obtain the identity of the target multicast bearer from the target service entity, and after obtaining the identity of the target multicast bearer, instruct a terminal that is in the terminal group and is located in the service area and is registered with the participating service entity to receive the service data on the target multicast bearer, so that all terminals in the terminal group and located in the service area receive the service data Therefore, as long as one participating service entity sends the service data, all the terminals in the terminal group can receive the service data. This prevents the terminals in the terminal group from repeatedly receiving the data, and can further reduce resource consumption of the participating service entity.

In a possible implementation, the participating service entity sends the service data of the terminal group by using the target multicast bearer; or the response message further includes first indication information, where the first indication information is used to instruct the participating service entity to send the service data of the terminal group by using the target multicast bearer; and the participating service entity sends the service data of the terminal group by using the target multicast bearer.

Optionally, when the participating service entity determines not to send the service data to the terminal group by using the target multicast bearer, the participating service entity sends a first notification message to the target service entity, where the first notification message is used to notify the target service entity that the participating service entity stops sending the service data of the terminal group by using the target multicast bearer. Therefore, after receiving the first notification message, the target service entity may instruct another participating service entity to send the service data to the terminal group.

In a possible implementation, the response message further includes second indication information, where the second indication information is used to instruct the participating service entity not to send the service data of the terminal group to a terminal that is in the terminal group and is located in the service area.

Alternatively, the fifth aspect and various possible implementation solutions may be further described as follows:

A participating service entity sends a request message to a target service entity, where the request message includes an identifier of a service area and a group identity, the request message is used to request to query a target multicast bearer, and the target multicast bearer is used to send, in the service area, service data of a terminal group corresponding to the group identity; and the participating service entity receives a response message from the target service entity, where the response message includes indication information.

When the indication information is an identity of the target multicast bearer, the participating service entity sends an indication message to a terminal, where the indication message is used to instruct the terminal to receive the service data of the terminal group on the target multicast bearer, and the terminal is a terminal that is in the terminal group and is located in the service area and is registered with the participating service entity; and the participating service entity sends the service data of the terminal group by using the target multicast bearer.

When the indication information is an identity of the target multicast bearer and first indication information, the participating service entity sends the foregoing indication message to a terminal, and sends the service data of the terminal group by using the target multicast bearer, where the first indication information is used to instruct the participating service entity to send the service data of the terminal group by using the target multicast bearer.

When the indication information is an identity of the target multicast bearer and second indication information, the participating service entity sends the foregoing indication message to a terminal, where the second indication information is used to instruct the participating service entity not to send the service data of the terminal group to the terminal that is in the terminal group and is located in the service area.

According to a sixth aspect, this application provides a communication method, where the method may be performed by a target service entity or a chip in a target service entity. The method includes: receiving, by a target service entity, a request message from a participating service entity, where the request message includes an identifier of a service area and a group identity, the request message is used to request to query a target multicast bearer, and the target multicast bearer is used to send, in the service area, service data of a terminal group corresponding to the group identity; and sending, by the target service entity, a response message to the participating service entity, where the response message includes an identity of the target multicast bearer.

In a possible implementation, the response message further includes first indication information, where the first indication information is used to instruct the participating service entity to send the service data of the terminal group by using the target multicast bearer.

In a possible implementation, the response message further includes second indication information, where the second indication information is used to instruct the participating service entity not to send the service data of the terminal group to a terminal that is in the terminal group and is located in the service area.

Alternatively, the sixth aspect and various possible implementation solutions may be further described as follows:

A target service entity receives a request message from a participating service entity, where the request message includes an identifier of a service area and a group identity, the request message is used to request to query a target multicast bearer, and the target multicast bearer is used to send, in the service area, service data of a terminal group corresponding to the group identity; and the target service entity sends a response message to the participating service entity, where the response message includes indication information.

The indication information is an identity of the target multicast bearer; or the indication information is an identity of the target multicast bearer and first indication information, where the first indication information is used to instruct the participating service entity to send the service data of the terminal group by using the target multicast bearer; or the indication information is an identity of the target multicast bearer and second indication information, where the second indication information is used to instruct the participating service entity not to send the service data of the terminal group to a terminal that is in the terminal group and is located in the service area.

In a possible implementation, when the target service entity receives a first notification message from the participating service entity, where the first notification message is used to notify the target service entity that the participating service entity stops sending the service data of the terminal group by using the target multicast bearer, the target service entity may send indication information to a first participating service entity, where the indication information is used to instruct the first participating service entity to send the service data of the terminal group by using the target multicast bearer.

In a possible implementation, the target service entity receives a second notification message from a second participating service entity, where the second notification message includes the identity of the target multicast bearer and the identifier of the service area.

According to a seventh aspect, this application provides an apparatus, where the apparatus may be a target service entity, or may be a chip in a target service entity. The apparatus has a function for implementing each implementation of the first aspect. The function may be implemented by hardware, or may be implemented by hardware executing corresponding software. The hardware or software includes one or more modules corresponding to the foregoing function.

In a possible implementation, when the apparatus is a target service entity, the target service entity includes a processing unit and a communications unit, where the processing unit may be, for example, a processor, the communications unit may be, for example, a transceiver, and the transceiver includes a radio frequency circuit. Optionally, the target service entity further includes a storage unit, where the storage unit may be, for example, a memory. When the target service entity includes a storage unit, the storage unit stores a computer-executable instruction. The processing unit is connected to the storage unit. The processing unit executes the computer-executable instruction stored in the storage unit, so that the target service entity performs the communication method in any implementation of the first aspect.

In another possible implementation, when the apparatus is a chip in a target service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the first aspect is performed. Optionally, the storage unit is a storage unit in the chip, for example, a register or a cache. The storage unit may also be a storage unit located outside the chip in the target service entity, for example, a read-only memory (ROM), any other type of static storage device capable of storing static information and instructions, or a random access memory (RAM).

The processor mentioned anywhere above may be a general-purpose central processing unit (CPU), a microprocessor, an application-specific integrated circuit (ASIC), or one or more integrated circuits for controlling program execution of the communication method in the first aspect.

According to an eighth aspect, this application provides an apparatus, where the apparatus may be a participating service entity, or may be a chip in a participating service entity. The apparatus has a function for implementing each implementation of the second aspect. The function may be implemented by hardware, or may be implemented by hardware executing corresponding software. The hardware or software includes one or more modules corresponding to the foregoing function.

In a possible implementation, when the apparatus is a participating service entity, the participating service entity includes a processing unit and a communications unit, where the processing unit may be, for example, a processor, the communications unit may be, for example, a transceiver, and the transceiver includes a radio frequency circuit. Optionally, the participating service entity further includes a storage unit, where the storage unit may be, for example, a memory. When the participating service entity includes a storage unit, the storage unit stores a computer-executable instruction. The processing unit is connected to the storage unit. The processing unit executes the computer-executable instruction stored in the storage unit, so that the participating service entity performs the communication method in any implementation of the second aspect.

In another possible implementation, when the apparatus is a chip in a participating service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the second aspect is performed. Optionally, the storage unit is a storage unit in the chip, for example, a register or a cache. The storage unit may also be a storage unit located outside the chip in the participating service entity, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the communication method in the second aspect.

According to a ninth aspect, this application provides an apparatus, where the apparatus may be a controlling service entity, or may be a chip in a controlling service entity. The apparatus has a function for implementing each implementation of the third aspect. The function may be implemented by hardware, or may be implemented by hardware executing corresponding software. The hardware or software includes one or more modules corresponding to the foregoing function.

In a possible implementation, when the apparatus is a controlling service entity, the controlling service entity includes a processing unit and a communications unit, where the processing unit may be, for example, a processor, the communications unit may be, for example, a transceiver, and the transceiver includes a radio frequency circuit. Optionally, the controlling service entity further includes a storage unit, where the storage unit may be, for example, a memory. When the controlling service entity includes a storage unit, the storage unit stores a computer-executable instruction. The processing unit is connected to the storage unit. The processing unit executes the computer-executable instruction stored in the storage unit, so that the controlling service entity performs the communication method in any implementation of the third aspect.

In another possible implementation, when the apparatus is a chip in a controlling service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the third aspect is performed. Optionally, the storage unit is a storage unit in the chip, for example, a register or a cache. The storage unit may also be a storage unit located outside the chip in the controlling service entity, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the communication method in the third aspect.

According to a tenth aspect, this application provides an apparatus, where the apparatus may be a participating service entity, or may be a chip in a participating service entity. The apparatus has a function for implementing each implementation of the fourth aspect. The function may be implemented by hardware, or may be implemented by hardware executing corresponding software. The hardware or software includes one or more modules corresponding to the foregoing function.

In a possible implementation, when the apparatus is a participating service entity, the participating service entity includes a processing unit and a communications unit, where the processing unit may be, for example, a processor, the communications unit may be, for example, a transceiver, and the transceiver includes a radio frequency circuit. Optionally, the participating service entity further includes a storage unit, where the storage unit may be, for example, a memory. When the participating service entity includes a storage unit, the storage unit stores a computer-executable instruction. The processing unit is connected to the storage unit. The processing unit executes the computer-executable instruction stored in the storage unit, so that the participating service entity performs the communication method in any implementation of the fourth aspect.

In another possible implementation, when the apparatus is a chip in a participating service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the fourth aspect is performed. Optionally, the storage unit is a storage unit in the chip, for example, a register or a cache. The storage unit may also be a storage unit located outside the chip in the participating service entity, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the communication method in the fourth aspect.

According to an eleventh aspect, this application provides an apparatus, where the apparatus may be a participating service entity, or may be a chip in a participating service entity. The apparatus has a function for implementing each implementation of the fifth aspect. The function may be implemented by hardware, or may be implemented by hardware executing corresponding software. The hardware or software includes one or more modules corresponding to the foregoing function.

In a possible implementation, when the apparatus is a participating service entity, the participating service entity includes a processing unit and a communications unit, where the processing unit may be, for example, a processor, the communications unit may be, for example, a transceiver, and the transceiver includes a radio frequency circuit. Optionally, the participating service entity further includes a storage unit, where the storage unit may be, for example, a memory. When the participating service entity includes a storage unit, the storage unit stores a computer-executable instruction. The processing unit is connected to the storage unit. The processing unit executes the computer-executable instruction stored in the storage unit, so that the participating service entity performs the communication method in any implementation of the fifth aspect.

In another possible implementation, when the apparatus is a chip in a participating service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the fifth aspect is performed. Optionally, the storage unit is a storage unit in the chip, for example, a register or a cache. The storage unit may also be a storage unit located outside the chip in the participating service entity, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the communication method in the fifth aspect.

According to a twelfth aspect, this application provides an apparatus, where the apparatus may be a controlling service entity, or may be a chip in a controlling service entity. The apparatus has a function for implementing each implementation of the sixth aspect. The function may be implemented by hardware, or may be implemented by hardware executing corresponding software. The hardware or software includes one or more modules corresponding to the foregoing function.

In a possible implementation, when the apparatus is a controlling service entity, the controlling service entity includes a processing unit and a communications unit, where the processing unit may be, for example, a processor, the communications unit may be, for example, a transceiver, and the transceiver includes a radio frequency circuit. Optionally, the controlling service entity further includes a storage unit, where the storage unit may be, for example, a memory. When the controlling service entity includes a storage unit, the storage unit stores a computer-executable instruction. The processing unit is connected to the storage unit. The processing unit executes the computer-executable instruction stored in the storage unit, so that the controlling service entity performs the communication method in any implementation of the sixth aspect.

In another possible implementation, when the apparatus is a chip in a controlling service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the sixth aspect is performed. Optionally, the storage unit is a storage unit in the chip, for example, a register or a cache. The storage unit may also be a storage unit located outside the chip in the controlling service entity, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the communication method in the sixth aspect.

According to a thirteenth aspect, this application provides a communication method, where the method may be performed by a target service entity or a chip in a target service entity, and the target service entity may be a controlling service entity or a multicast bearer management entity. The method includes: receiving, by a target service entity, a first request message from a first participating service entity, where the first request message includes an identity of a target multicast bearer and a group identity of a terminal group, and the first request message is used to request to use the target multicast bearer to send service data of the terminal group; and sending, by the target service entity, a first response message to the first participating service entity, where the first response message is used to instruct the first participating service entity to use the target multicast bearer to send the service data of the terminal group.

In a possible implementation, the first response message includes first indication information, and the first indication information is used to instruct the first participating service entity to use the target multicast bearer to send the service data of the terminal group.

In a possible implementation, the method includes: receiving, by the target service entity, a second request message from a second participating service entity, where the second request message includes the identity of the target multicast bearer and the group identity of the terminal group, and the second request message is used to request to use the target multicast bearer to send service data of the terminal group; and sending, by the target service entity, a second response message to the second service entity, where the second response message is used to instruct the second participating service entity not to use the target multicast bearer to send the service data of the terminal group.

In a possible implementation, the second response message includes second indication information, and the second indication information is used to instruct the second participating service entity not to use the target multicast bearer to send the service data of the terminal group.

In a possible implementation, the method includes: receiving, by the target service entity, a report message from a third participating service entity, where the report message includes the identity of the target multicast bearer.

In a possible implementation, the report message further includes address information of the third participating service entity.

According to a fourteenth aspect, this application provides a communication method, where the method may be performed by a participating service entity or a chip in a participating service entity. The method includes: sending, by a participating service entity, a request message to a target service entity, where the request message includes an identity of a target multicast bearer and a group identity of a terminal group, and the request message is used to request to use the target multicast bearer to send service data of the terminal group; and receiving, by the participating service entity, a response message from the target service entity, where the response message is used to instruct the participating service entity to use the target multicast bearer to send the service data of the terminal group.

In a possible implementation, the response message includes first indication information, and the first indication information is used to instruct the participating service entity to use the target multicast bearer to send the service data of the terminal group.

In a possible implementation, the participating service entity uses the target multicast bearer to send the service data of the terminal group.

According to a fifteenth aspect, this application provides an apparatus, where the apparatus may be a target service entity, or may be a chip in a target service entity. The apparatus has a function for implementing each implementation of the thirteenth aspect. The function may be implemented by hardware, or may be implemented by hardware executing corresponding software. The hardware or software includes one or more modules corresponding to the foregoing function.

In a possible implementation, when the apparatus is a target service entity, the controlling service entity includes a processing unit and a communications unit, where the processing unit may be, for example, a processor, the communications unit may be, for example, a transceiver, and the transceiver includes a radio frequency circuit. Optionally, the target service entity further includes a storage unit, where the storage unit may be, for example, a memory. When the target service entity includes a storage unit, the storage unit stores a computer-executable instruction. The processing unit is connected to the storage unit. The processing unit executes the computer-executable instruction stored in the storage unit, so that the target service entity performs the communication method in any implementation of the thirteenth aspect.

In another possible implementation, when the apparatus is a chip in a target service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the thirteenth aspect is performed. Optionally, the storage unit is a storage unit in the chip, for example, a register or a cache. The storage unit may also be a storage unit located outside the chip in the controlling service entity, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the communication method in the thirteenth aspect.

According to a sixteenth aspect, this application provides an apparatus, where the apparatus may be a participating service entity, or may be a chip in a participating service entity. The apparatus has a function for implementing each implementation of the fourteenth aspect. The function may be implemented by hardware, or may be implemented by hardware executing corresponding software. The hardware or software includes one or more modules corresponding to the foregoing function.

In a possible implementation, when the apparatus is a participating service entity, the participating service entity includes a processing unit and a communications unit, where the processing unit may be, for example, a processor, the communications unit may be, for example, a transceiver, and the transceiver includes a radio frequency circuit. Optionally, the participating service entity further includes a storage unit, where the storage unit may be, for example, a memory. When the participating service entity includes a storage unit, the storage unit stores a computer-executable instruction. The processing unit is connected to the storage unit. The processing unit executes the computer-executable instruction stored in the storage unit, so that the participating service entity performs the communication method in any implementation of the fourteenth aspect.

In another possible implementation, when the apparatus is a chip in a participating service entity, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the communication method in any implementation of the fourteenth aspect is performed. Optionally, the storage unit is a storage unit in the chip, for example, a register or a cache. The storage unit may also be a storage unit located outside the chip in the participating service entity, for example, a ROM, another type of static storage device capable of storing static information and instructions, or a RAM.

The processor mentioned anywhere above may be a general-purpose CPU, a microprocessor, an ASIC, or one or more integrated circuits for controlling program execution of the communication method in the fourteenth aspect.

According to a seventeenth aspect, this application further provides a computer-readable storage medium, where the computer-readable storage medium stores an instruction, and when a computer runs the instruction, the computer performs the method in each of the foregoing aspects.

According to an eighteenth aspect, this application further provides a computer program product including an instruction, where when a computer runs the computer program product, the computer performs the method in each of the foregoing aspects.

These aspects of this application or other aspects are clearer and more comprehensible in the following description of embodiments.

DESCRIPTION OF EMBODIMENTS

Figure 1:
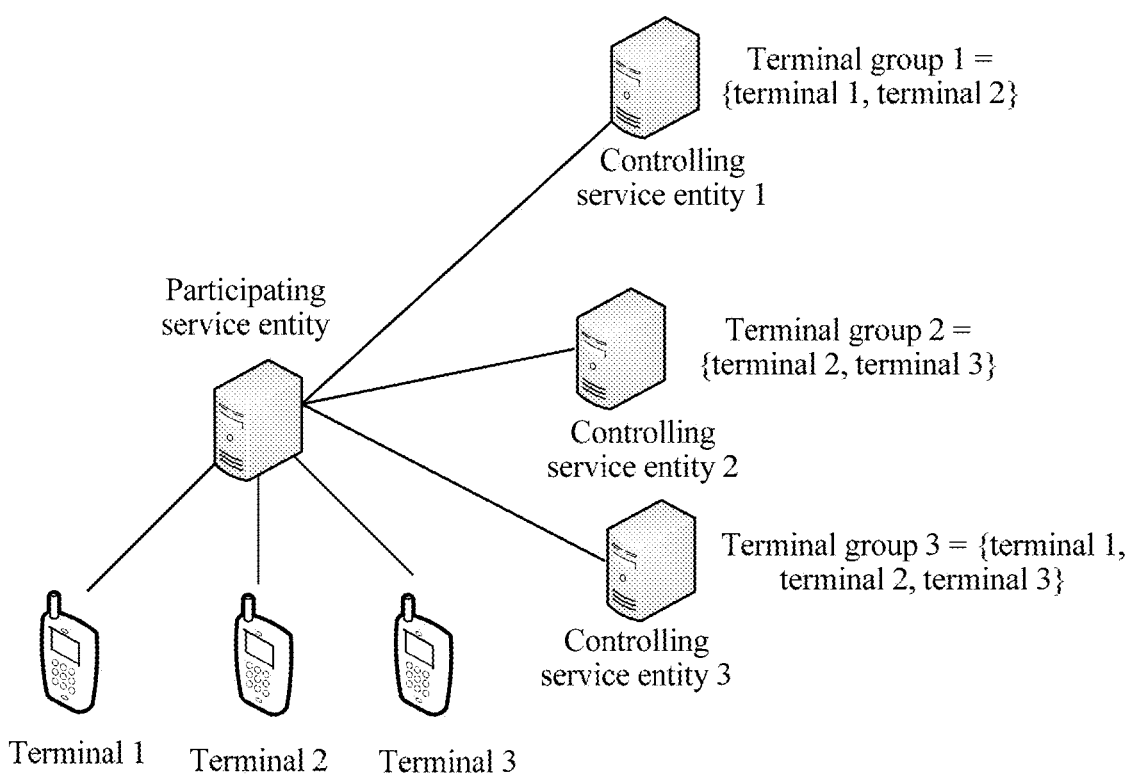
FIG. 1 is an architecture of a mission critical service system in the prior art.

To make the objectives, technical solutions, and advantages of this application clearer, the following further describes this application in detail with reference to the accompanying drawings. A specific method in a method embodiment may also be applicable to an apparatus embodiment or a system embodiment. In descriptions of this application, "a plurality of" means two or more than two unless otherwise specified.

It should be noted that, a communication method in this application may be performed by an apparatus. The apparatus may be a controlling service entity, a multicast bearer management entity, or a participating service entity, or a chip in a controlling service entity, or a chip in a multicast bearer management entity, or a chip in a participating service entity.

For ease of description, the communication method is described by using a controlling service entity, a multicast bearer management entity, or a participating service entity as an example of the apparatus. For an implementation method in which the apparatus is a chip in a controlling service entity, or a chip in a multicast bearer management entity, or a chip in a participating service entity, refer to detailed descriptions of the communication method in which the apparatus is a controlling service entity, a multicast bearer management entity, or a participating service entity. Details are not described repeatedly.

In this application, an MC service entity has the following functions: receiving uplink unicast data of a terminal; delivering downlink data to a terminal in a terminal group in unicast or multicast mode, where the data may be control signaling, such as a group call request message in an MCPTT service, or may be media data, such as a voice, a video, or data, or may be media plane control signaling, such as a floor request message in an MCPTT service; and supporting service continuity of the downlink data received by the terminal between unicast and multicast transmission modes. The MC service entity may be logically divided into a controlling service entity and a participating service entity according to functions.

The controlling service entity is a logical entity defined from a perspective of group call management. The controlling service entity undertakes a main control function in a group call, directly or indirectly obtains location information of a member in a terminal group, and directly or indirectly receives a multicast bearer quality report from a terminal. The controlling service entity may receive a multicast bearer quality report according to the location information of the member in the terminal group, and determine whether to use unicast or multicast to send data to the member in the terminal group. The controlling service entity includes, for example, a controlling mission critical service server (Controlling MC service server).

The participating service entity is configured to register a terminal, send service data to the terminal, and the like, that is, the terminal is registered with the participating service entity. The participating service entity is responsible for routing a request or a response sent by a group member in a group call, and routing a request message of the controlling service entity to the group member. It may be understood that, the participating service entity and the terminal directly communicate with each other. For example, the participating service entity includes a participating mission critical service server (Participating MC service server).

It should be noted that, in 5th generation (5G) communication, a multicast bearer includes a multicast bearer and a broadcast bearer; in 4th generation (4G) communication system, a multicast bearer is also referred to as a multimedia broadcast/multicast service (MBMS) bearer. In this application, the multicast bearer is used for description.

In a specific service, when the MC service entity is an MC service server, the MC service server may be an MCPTT server, an MCVideo server, an MCData server, or other types of servers having similar functions.

When the controlling service entity is a controlling MC service server, the controlling MC service server may be a controlling MCPTT server, a controlling MCVideo server, a controlling MCData server, or other types of servers having similar functions in a specific service.

When the participating service entity is a participating MC service server, the participating MC service server may be a participating MCPTT server, a participating MCVideo server, a participating MCData server, or other types of servers having similar functions in a specific service. This is not limited in the present application.

As shown in FIG. 1, FIG. 1 is an architecture of a mission critical service system in the prior art. For example, three terminals in total are registered with a participating service entity, and are a terminal 1, a terminal 2, and a terminal 3 respectively. If the terminal 1 and the terminal 2 form a group, the group is referred to as a terminal group 1. Specifically, the terminal group 1={terminal 1, terminal 2}. In this case, communication of terminals in the terminal group 1 is controlled by a controlling service entity, for example, is controlled by a controlling service entity 1. For another example, a terminal group 2={terminal 2, terminal 3}, and communication of terminals in the terminal group 2 is controlled by a controlling service entity 2. For another example, a terminal group 3={terminal 1, terminal 2, terminal 3}, and communication of terminals in the terminal group 3 is controlled by a controlling service entity 3.

Therefore, one participating service entity may correspond to a plurality of controlling service entities. Specifically, each terminal group formed by terminals registered with a participating service entity may correspond to a controlling service entity. Therefore, a quantity of terminal groups may correspond to a quantity of controlling service entities, and each controlling service entity controls communication of terminals in a terminal group.

It should be noted that, both the participating service entity and the controlling service entity are obtained through logical division. Physically, the participating service entity and the controlling service entity may be two physical entities separately or a part of two physical entities separately, or may be integrated in one physical entity.

Figure 2:
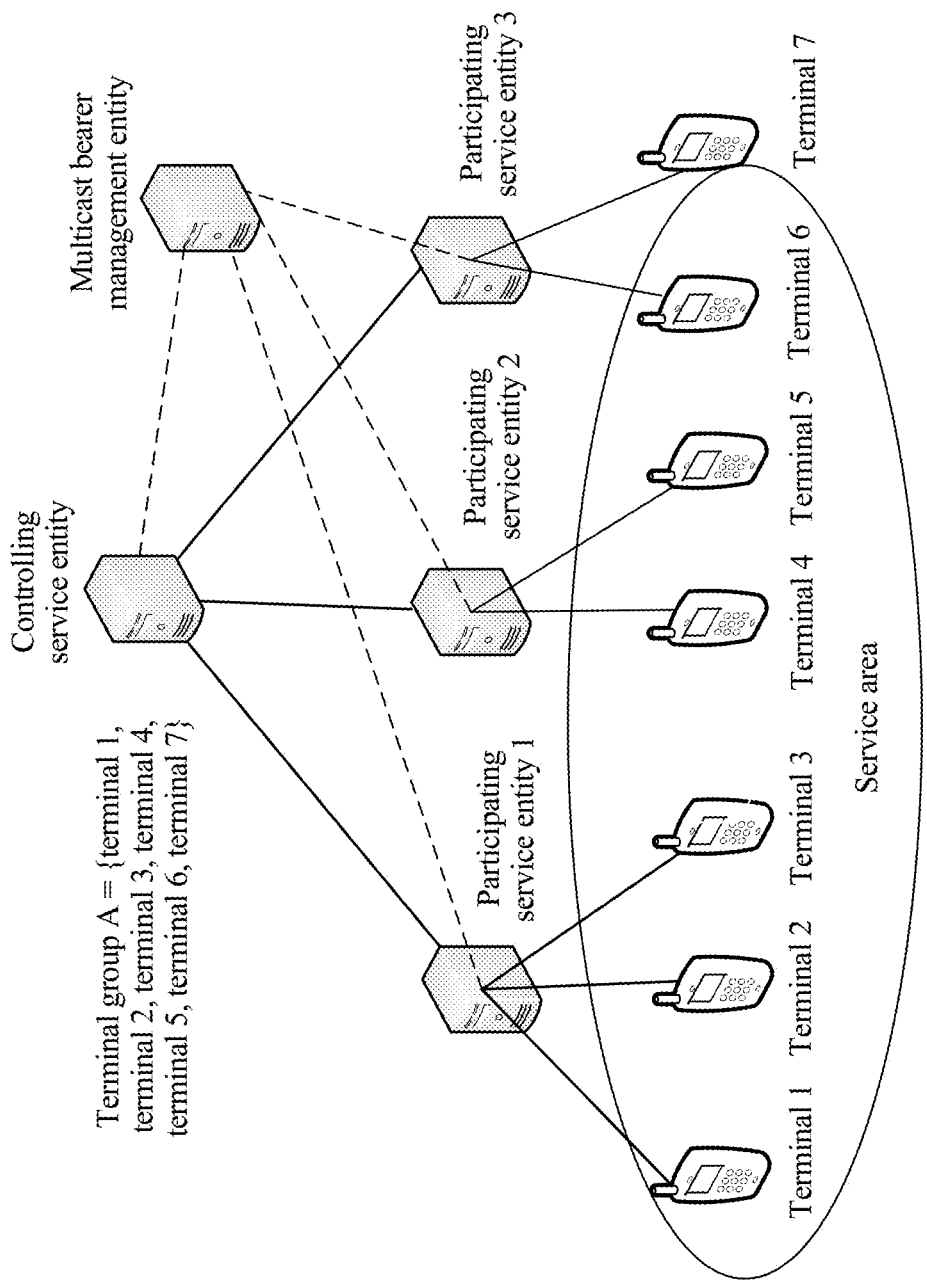
FIG. 2 is a possible system architecture to which this application is applicable.

Based on the architecture of the mission critical service system shown in FIG. 1, as shown in FIG. 2, FIG. 2 is a possible system architecture to which this application is applicable. Terminals registered with a plurality of participating service entities form a terminal group. The terminal group is controlled by a controlling service entity, and the controlling service entity may be integrated in any one of the participating service entities, or may be physically independent of each participating service entity.

Optionally, the system architecture further includes a multicast bearer management entity. The multicast bearer management entity is mainly configured to manage a multicast or broadcast bearer used in a system, for example, store information about a multicast bearer or a broadcast bearer, including an identity of the multicast bearer, an identifier of a service area, and a correspondence between the identity of the multicast bearer and the identifier of the service area, and further record a multicast bearer that is being used and an identity of a participating service entity that is using the multicast bearer, and may further record an identity of a terminal group corresponding to the multicast bearer that is being used, and the like. The multicast bearer management entity may also be referred to as a multicast bearer control entity, for example, may be a multicast bearer management server.

Optionally, functions of the multicast bearer management entity may be integrated in the controlling service entity. To be specific, the multicast bearer management entity may be canceled, and the functions of the multicast bearer management entity may be integrated in the controlling service entity. In an actual application, according to an actual requirement, the functions of the multicast bearer management entity may be integrated in the controlling service entity, or the controlling service entity and the multicast bearer management entity may be disposed separately. The functions of the multicast bearer management entity may also be integrated in a participating service entity. In this case, the participating service entity and the multicast bearer management entity may be integrated and deployed in a same physical network device, or the participating service entity and the multicast bearer management entity may be disposed separately.

For ease of description, this application is described by using an example in which the controlling service entity, the participating service entity, and the multicast bearer management entity are disposed separately.

As shown in FIG. 2, a specific example is provided. A participating service entity 1, a participating service entity 2, and a participating service entity 3 respectively manage a plurality of registered terminals. In addition, a terminal 1, a terminal 2, and a terminal 3 registered with the participating service entity 1, a terminal 4 and a terminal 5 registered with the participating service entity 2, and a terminal 6 and a terminal 7 registered with the participating service entity 3 currently form a terminal group, for example, referred to as a terminal group A. In this case, the terminal group A={terminal 1, terminal 2, terminal 3, terminal 4, terminal 5, terminal 6, terminal 7}, and the terminal group A is controlled by the controlling service entity in FIG. 2.

The terminal in FIG. 2 may be a mission critical service client. The terminal is a peer application layer entity of an MC service server, and is mainly responsible for processing of an application layer transaction. In a specific service, the terminal may be an MCPTT client, an MCVideo client, an MCData client, or a service client having a similar function.

For example, an application scenario of the system shown in FIG. 2 may be as follows: When a traffic accident occurs in a place, traffic police, a hospital, and public security police are needed at a same time. For example, a communications device used by the traffic police, such as a walkie-talkie, is registered with the participating service entity 1; a communications device used by the hospital, such as a terminal display device or a walkie-talkie, is registered with the participating service entity 2; and a communications device used by the public security police, such as a walkie-talkie, is registered with the participating service entity 3. In addition, the terminal 1 to the terminal 7 form the terminal group A. Downlink data in group communication is downlink data sent by the controlling service entity to the terminal group A.

Specifically, the controlling service entity or the participating service entity may determine whether to use a unicast or multicast mode to transmit downlink group communication data, and if multicast is used, may use a multicast bearer to send downlink communication data of the terminal group.

Currently, for the foregoing application scenario, an existing implementation is: according to a location of a registered terminal in the terminal group, each participating service entity independently determines to use and/or create a multicast bearer.

A possible case is: each terminal in the terminal group may trigger a participating service entity to use or create a multicast bearer. Therefore, a plurality of different multicast bearers in the same service area transmit same content, causing an unnecessary waste of multicast bearer resources.

Another possible case is: each terminal in the terminal group may trigger a service entity to use or create a multicast bearer, and the participating service entities use a same multicast bearer. In this case, the terminals in the terminal group simultaneously receive same service data sent by a plurality of participating service entities.

In the method in the prior art, a plurality of participating service entities use same or different multicast bearers to send same service data to the terminals in the terminal group. Therefore, not only communication quality is reduced, but also a resource waste is caused.

To resolve the foregoing problem, this application provides two communication methods to save resources and improve communication quality in the system architecture shown in FIG. 2.

Figure 3:
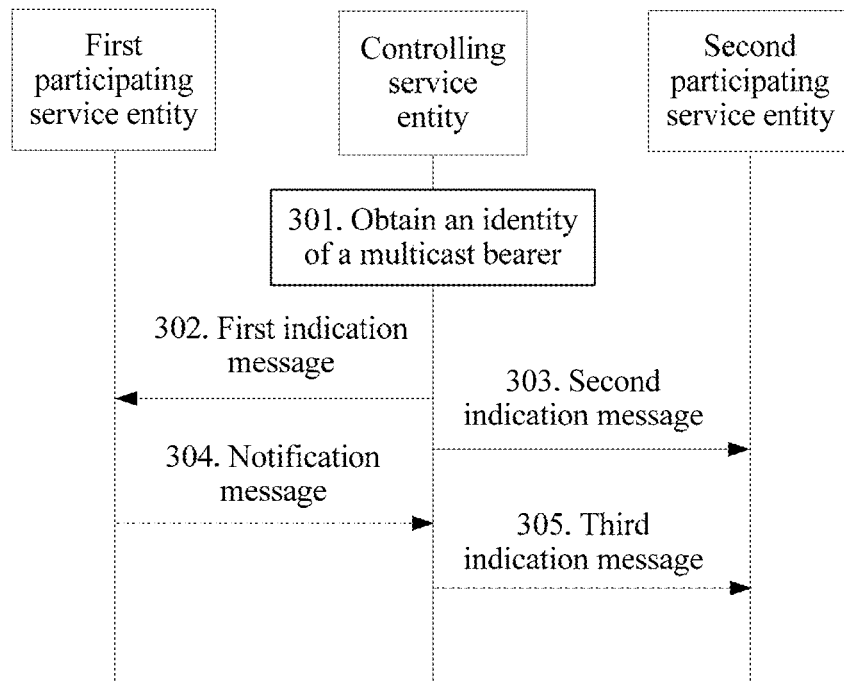
FIG. 3 is a schematic diagram of a communication method according to this application.

As shown in FIG. 3, FIG. 3 is a schematic diagram of a communication method according to this application. The method includes the following steps.

Step 301: A controlling service entity obtains an identity of a multicast bearer.

For example, when a terminal group is performing a group communication service, for example, is performing group voice communication or is performing group video communication, or is performing group data (such as a file and a data stream) communication, the controlling service entity determines to use a multicast bearer in a service area to transmit downlink data of the terminal group. In this case, the controlling service entity obtains the identity of the multicast bearer, where the multicast bearer is used to transmit service data of a terminal in the service area.

One or more multicast bearers exist in the service area. Each multicast bearer is indicated by an identity of the multicast bearer, and each multicast bearer may be used to transmit service data of one or more terminal groups. The controlling service entity obtains an identity of a multicast bearer corresponding to the terminal group in the service area. This may also be understood as "the controlling service entity obtains, from the one or more multicast bearers in the service area, an identity of a multicast bearer that can be used to transmit service data of the terminal group in the service area".

The controlling service entity may determine, according to terminal location information reported by terminals in the terminal group, a quantity of terminals located in the same service area. Further, if the quantity of terminals located in the same service area satisfies a preset condition, the controlling service entity determines to use the multicast bearer to transmit service data for the terminals that are in the terminal group and are located in the service area.

The service data may be service control signaling such as an MCPTT/MCVideo call control message, or may be media plane control signaling such as an MCPTT floor control message (such as a floor occupation message) or an MCVideo transmission control message (such as a media reception notification message), or may be media data such as a voice, a video, or a file.

The location information may be geographical location information, or latitude and longitude information, or a cell identity, or a service area identifier, or a combination of the foregoing two or more.

For another example, the controlling service entity determines, according to a configuration policy, to use the multicast bearer to transmit service data for the terminals that are in the terminal group and are located in the service area, where the configuration policy indicates that the multicast bearer is always used in the service area to transmit data of the terminal group, or the configuration policy indicates that the multicast bearer is always used in the service area in a specific time period to transmit data of the terminal group.

Step 302: The controlling service entity sends a first indication message to a first participating service entity associated with a terminal group, and the first participating service entity receives the first indication message from the controlling service entity.

The first indication message is used to instruct the first participating service entity to send the service data of the terminal group in the service area by using the multicast bearer corresponding to the identity of the multicast bearer.

Step 303: The controlling service entity sends a second indication message to a second participating service entity associated with the terminal group, and the second participating service entity receives the second indication message from the controlling service entity.

The second indication message is used to instruct the second participating service entity not to send the service data of the terminal group to a terminal that is in the terminal group and is located in the service area.

In the foregoing step 302, the first indication message may be a broadcast bearer use message, or a broadcast bearer use notification message. Optionally, the first indication message includes an identifier of the service area, the identity of the multicast bearer, an identity of the terminal group, and a service data sending indication. It may be understood that, the controlling service entity indicates, by using the first indication message, that the first participating service entity is allowed to send the service data of the terminal group in the service area by using the multicast bearer. It may also be understood that, the controlling service entity indicates, by using the first indication message, that the first participating service entity can send the service data of the terminal group in the service area by using the multicast bearer.

In other words, the first indication message is used to indicate that the first participating service entity is capable of sending the service data of the terminal group. A specific time of sending the service data by the first participating service entity to a terminal in the terminal group is determined according to an actual situation. In an implementation, the first participating service entity sends the service data in the service area immediately after receiving the first indication message. In another implementation, the first participating service entity does not immediately send the service data after receiving the first indication message; instead, the first participating service entity starts to send the service data only after receiving another indication message sent by the controlling service entity, where the indication message is used to instruct the first participating service entity to immediately send the service data in the service area.

The second indication message in the foregoing step 303 may be a broadcast bearer use message, or a broadcast bearer use indication message. Optionally, the second indication message includes the identifier of the service area, the identity of the multicast bearer, the identifier of the terminal group, and a service data sending indication. The second indication message is used to instruct the second participating service entity not to send the service data of the terminal group to the terminal that is in the terminal group and is located in the service area.

It may also be understood that, the second indication message is used to indicate that the second participating service entity cannot send the service data of the terminal group to the terminal that is in the terminal group and is located in the service area.

It may also be understood that, the second indication message is used to indicate that the second participating service entity is not allowed to send the service data of the terminal group to the terminal that is in the terminal group and is located in the service area.

In an implementation, the service data sending indication may be indicated by using one bit. For example, when being "1", the service data sending indication instructs to send the service data of the terminal group in the service area by using the multicast bearer. When being "0", the service data sending indication instructs not to send the service data of the terminal group in the service area to the terminal that is in the terminal group and is located in the service area.

In this implementation, the service data sending indication in the first indication message is "1", and the service data sending indication in the second indication message is "0".

Certainly, "1" may also be used to instruct not to send the service data of the terminal group in the service area to the terminal that is in the terminal group and is located in the service area, and "0" is used to instruct to send the service data of the terminal group in the service area by using the multicast bearer. In this case, the service data sending indication in the first indication message is "0", and the service data sending indication in the second indication message is "1". This is not limited in this application.

In the foregoing step 303, after the second participating service entity receives the second indication message, if the second participating service entity is currently sending the service data of the terminal group to the terminal that is in the terminal group and is located in the service area, the second participating service entity stops sending. If the second participating service entity is currently not sending the service data of the terminal group to the terminal that is in the terminal group and is located in the service area, the second participating service entity continues not to send the service data of the terminal group to the terminal that is in the terminal group and is located in the service area.

In another implementation, the first indication message may include the identifier of the service area, the identity of the multicast bearer, and the identity of the terminal group. When the first participating service entity receives the first indication message, the first participating service entity may send by default, according to a pre-agreement, the service data in the service area by using the multicast bearer. In this case, a combination of one or more of the identifier of the service area, the identity of the multicast bearer, and the identity of the terminal group may be considered as an implicit service data sending indication. In addition, the second indication message includes the identifier of the service area, the identity of the multicast bearer, and the identity of the terminal group, and further includes occupation information, where the occupation information may be any information. When receiving the occupation information, the second participating service entity determines not to send the service data of the terminal group to the terminal that is in the terminal group and is located in the service area.

Alternatively, in another implementation, the first indication message includes the identifier of the service area, the identity of the multicast bearer, the identity of the terminal group, and occupation information. When receiving the first indication message, the first participating service entity obtains the occupation information, where the occupation information may be any information. When receiving the occupation information, the first participating service entity determines that the service data of the terminal group can be sent in the service area by using the multicast bearer. In addition, the second indication message includes the identifier of the service area, the identity of the multicast bearer, and the identity of the terminal group, but does not include occupation information. In this case, according to a pre-agreement, the second participating service entity does not send by default, the service data of the terminal group to the terminal that is in the terminal group and is located in the service area.

The first participating service entity is different from the second participating service entity. At least one terminal in the terminal group is registered with the first participating service entity, and at least one terminal in the terminal group is registered with the second participating service entity.

The first participating service entity is one of participating service entities with which the terminals in the terminal group are registered. The second participating service entity is a participating service entity other than the first participating service entity among the participating service entities with which the terminals in the terminal group are registered.

For example, referring to FIG. 2, participating service entities with which the terminals in the terminal group A are registered are the participating service entity 1, the participating service entity 2, and the participating service entity 3. In this case:

the first participating service entity is the participating service entity 1, and second participating service entities are the participating service entity 2 and the participating service entity 3; or the first participating service entity is the participating service entity 2, and second participating service entities are the participating service entity 1 and the participating service entity 3; or the first participating service entity is the participating service entity 3, and second participating service entities are the participating service entity 1 and the participating service entity 2.

After step 302, the method further includes: the first participating service entity sends a service reception indication message to a terminal, where the service reception indication message includes the identity of the multicast bearer, and optionally may further include the identity of the terminal group.

In an implementation, the first participating service entity sends the indication message to the service area in multicast transmission mode. In this case, terminals receiving the service reception indication message may include some or all of the terminals in the terminal group, or may include terminals in other groups, and the terminals may be registered with the first participating service entity or may be registered with other participating service entities. This implementation may be understood as "the first participating service entity sends the service reception indication message in the service area to some or all of the terminals in the service area in multicast transmission mode".

In another implementation, the first participating service entity sends, in unicast mode, the indication message to a terminal that is in the terminal group and is registered with the first participating service entity.

In another implementation, the first participating service entity sends, in unicast mode, the service reception indication message to a terminal that is in the terminal group and is registered with the first participating service entity and is currently located in the service area.

The service reception indication message is used to instruct the terminal to receive the service data by using the multicast bearer. If the terminal receiving the message is not in the service area, the terminal cannot receive the service data. If the terminal receiving the message is not a terminal in the terminal group, another processing manner may be used. For example, the terminal discards the service data when failed to attempt to decrypt content of the message, or discards the data packet when determining that the terminal is not a terminal in the terminal group.

After the foregoing step 303, the method further includes: the second participating service entity sends a service reception indication message to a terminal, where the service reception indication message may also be referred to as a fourth indication message. The service reception indication message includes the identity of the multicast bearer, and optionally further includes the identity of the terminal group. A function and implementation of the service reception indication message are the same as those of the service reception indication message sent by the first participating service entity to the terminal. For details, refer to the foregoing descriptions. Details are not described again herein.

By performing the foregoing step 301 to step 303, the controlling service entity instructs the first participating service entity to send the service data of the terminal group in the service area by using the multicast bearer, and instructs the second participating service entity not to send the service data of the terminal group to the terminal that is in the terminal group and is located in the service area. Therefore, the terminal that is in the terminal group and is located in the service area can receive the service data of the terminal group only from the first participating service entity. This avoids receiving the same service data from a plurality of participating service entities and saves consumption of terminals.

The following describes an implementation process of the foregoing step 301 to step 303 with reference to FIG. 2.

The terminal group A includes the terminal 1 to the terminal 7. It is assumed that only the terminal 1 to the terminal 6 are located in the service area, and that the terminal 7 is not in the service area. When the controlling service entity determines to use the multicast bearer to send the service data in the service area, if the controlling service entity determines that the participating service entity 1 is the first participating service entity, and that the participating service entity 2 and the participating service entity 3 are the second participating service entities, the following steps occur:

Step 1: The controlling service entity obtains the identity of the multicast bearer, and determines to use the multicast bearer to send the service data.

Step 2: The controlling service entity sends a first indication message to the participating service entity 1.

The first indication message is used to instruct the participating service entity 1 to send the service data of the terminal group by using the multicast bearer.

After receiving the first indication message, the participating service entity 1 further sends a service reception indication message to the terminal 1 to the terminal 3 separately. To be specific, the participating service entity 1 instructs the terminal 1 to the terminal 3 to receive the service data by using the multicast bearer.

Step 3: The controlling service entity sends a second indication message to the participating service entity 2 and the participating service entity 3.

The second indication message is used to instruct the participating service entity 2 and the participating service entity 3 not to send the service data of the terminal group to terminals that are in the terminal group and are located in the service area, that is, instruct the participating service entity 2 and the participating service entity 3 not to send the service data to the terminal 1 to the terminal 6.

For example, in an implementation, after receiving the second indication message, the participating service entity 2 may send a service reception indication message (or referred to as a fourth indication message) to the terminal 4 and the terminal 5 separately. To be specific, the participating service entity 2 instructs the terminal 4 and the terminal 5 to receive the service data by using the multicast bearer.

For example, in an implementation, after receiving the second indication message, the participating service entity 3 may send a service reception indication message (or referred to as a fourth indication message) to the terminal 6. To be specific, the participating service entity 3 instructs the terminal 6 to receive the service data by using the multicast bearer.

Step 4: The participating service entity 1 sends the service data of the terminal group in the service area by using the multicast bearer, and the terminal 1 to the terminal 6 receive the service data by using the multicast bearer.

Therefore, after the foregoing step 1 to step 4 are performed, the terminal 1 to the terminal 6 that are in the terminal group A and are located in the service area receive the service data only from the participating service entity 1. This avoids receiving the same service data from a plurality of participating service entities and saves consumption of terminals.

The method in the foregoing step 301 in which the controlling service entity obtains the identity of the multicast bearer, for example, may include the following steps.

Step A: The controlling service entity sends a query message to a multicast bearer management entity, and the multicast bearer management entity receives the query message from the controlling service entity.

The query message includes the identifier of the service area, and the query message is used to request to query the multicast bearer corresponding to the service area.

Step B: The multicast bearer management entity sends a response message to the controlling service entity, and the controlling service entity receives the response message from the multicast bearer management entity. When the response message includes the identity of the multicast bearer, the procedure ends. When the response message does not include the identity of the multicast bearer, the procedure goes to step C.

When the response message includes the identity of the multicast bearer, it indicates that the multicast bearer can be used and can be used to send downlink service data in the service area. Therefore, the controlling service entity successfully obtains the identity of the multicast bearer in the service area.

When the response message does not include the identity of the multicast bearer, for example, when the response message is null or the response message includes a piece of indication information indicating that obtaining fails, the controlling service entity determines that the identity of the multicast bearer is not obtained.

Step C: The controlling service entity sends a request message to a third participating service entity associated with the terminal group, and the third participating service entity receives the request message from the controlling service entity.

The third participating service entity is any one of participating service entities associated with the terminal group. Using FIG. 2 as an example, the third participating service entity may be the participating service entity 1, the participating service entity 2, or the participating service entity 3.

The request message includes the identifier of the service area, and the request message is used to request the third participating service entity to create a multicast bearer in the service area corresponding to the identifier of the service area. The request message may also be referred to as a broadcast bearer creation request message, or a broadcast bearer request message.

To be specific, after the controlling service entity fails to obtain the identity of the multicast bearer from the multicast bearer management entity, the controlling service entity instructs the third participating service entity to create a multicast bearer in the service area.

Step D: The third participating service entity sends a notification message to the multicast bearer management entity, and the multicast bearer management entity receives the notification message from the third participating service entity.

The notification message includes an identity of the multicast bearer and the identifier of the service area, and further includes information about the multicast bearer.

After successfully creating the multicast bearer, the third participating service entity sends the notification message to the multicast bearer management entity.

Step E: The third participating service entity sends a response message to the controlling service entity, and the controlling service entity receives the response message from the third participating service entity.

In an implementation, the response message includes the identity of the multicast bearer. To be specific, after creating the multicast bearer, on one hand, the third participating service entity sends the identity of the multicast bearer to the multicast bearer management entity for storage, and on the other hand, further sends the identity of the multicast bearer to the controlling service entity, so that the controlling service entity can successfully obtain the identity of the multicast bearer. The procedure ends here.

In another implementation, the response message includes notification information, where the notification information is used to notify the controlling service entity that the multicast bearer is already successfully created and that the identity of the multicast bearer and related information are sent to the multicast bearer management entity. Therefore, when receiving the notification information, the controlling service entity further performs the foregoing step A and step B again to obtain the identity of the multicast bearer. The procedure ends.

Optionally, when the request message in the foregoing step C includes the identity of the terminal group, it indicates that the controlling service entity requests to create a multicast bearer for the terminal group corresponding to the identity of the terminal group. In this case, the notification message in step D may further include the identity of the terminal group, and in the first implementation of step E, the response message may further include the identity of the terminal group in addition to the identity of the multicast bearer.

It should be noted that, operations of the foregoing step A to step E may be further performed in the following manners:

In an implementation, only step A and step B are performed. When obtaining the identity of the multicast bearer from the multicast bearer management entity succeeds or fails, the procedure ends. If the identity of the multicast bearer fails to be obtained from the multicast bearer management entity, it indicates that a multicast bearer transmission mode is no longer used.

In another implementation, step C and step D are performed first. To be specific, first, the third participating service entity creates a multicast bearer, and then sends the created multicast bearer to the multicast bearer management entity. Then step A and step B are performed, and the controlling service entity obtains, from the multicast bearer management entity, the multicast bearer created by the third participating service entity.

In another implementation, step C and step D are performed first. To be specific, the third participating service entity first creates a multicast bearer, and then sends the created multicast bearer to the multicast bearer management entity. Then step E is performed, where the response message in step E includes the multicast bearer created by the third participating service entity. To be specific, after creating the multicast bearer, the third participating service entity directly feeds back the multicast bearer to the controlling service entity.

In another implementation, step C is performed first. To be specific, first, the third participating service entity creates a multicast bearer. Then step E is performed, where the response message in step E includes the multicast bearer created by the third participating service entity. To be specific, after creating the multicast bearer, the third participating service entity directly feeds back the multicast bearer to the controlling service entity. In addition, further, the controlling service entity sends the created multicast bearer to the multicast bearer management entity for storage.

Certainly, it should be noted that, if the third participating service entity includes a created multicast bearer, and the multicast bearer satisfies a request of the controlling service entity, there is no need to create a multicast bearer again, but information about the multicast bearer is directly sent to the controlling service entity and/or the multicast bearer management entity. Further, if the third participating service entity fails to obtain the multicast bearer, and fails to create a multicast bearer, the third participating service entity returns a null message to the controlling service entity, or returns a failure indication message.

Optionally, after step 303, the method further includes step 304 and step 305.

Step 304: The first participating service entity sends a notification message to the controlling service entity, and the controlling service entity receives the notification message from the first participating service entity.

The notification message is used to notify that the first participating service entity stops sending the service data of the terminal group by using the multicast bearer.

For example, because of a fault, overload, or the like, the first participating service entity needs to stop sending the service data of the terminal group in the service area by using the multicast bearer; in this case, the first participating service entity sends the notification message to the controlling service entity, notifying that sending the service data by using the multicast bearer will be stopped in the service area.

Step 305: The controlling service entity sends a third indication message to the second participating service entity, and the second participating service entity receives the third indication message from the controlling service entity.

The third indication message is used to instruct the second participating service entity to send the service data of the terminal group to the terminal that is in the terminal group and is located in the service area and is registered with the second participating service entity.

To be specific, each second participating service entity separately sends the service data of the terminal group to the terminal that is in the terminal group and is located in the service area and is registered with the second participating service entity. A sending mode is determined by each second participating service entity, for example, may be unicast or multicast.

For example, referring to FIG. 2, it is assumed that the first participating service entity is the participating service entity 1, and that the second participating service entities are the participating service entity 2 and the participating service entity 3; and the terminal 1 to the terminal 6 are located in the service area.

Currently, the participating service entity 1 sends the service data of the terminal group by using the multicast bearer, and the participating service entity 2 and the participating service entity 3 do not send the service data to the terminal 1 to the terminal 6. In other words, the terminal 1 to the terminal 6 receive the service data of the terminal group from the participating service entity 1 by using the multicast bearer.

When the participating service entity 1 sends a notification message to the controlling service entity, notifying the controlling service entity that the participating service entity 1 stops sending the service data in the service area by using the multicast bearer, the terminal 1 to the terminal 6 cannot receive the service data of the terminal group from the participating service entity 1 by using the multicast bearer. The controlling service entity may send a third indication message to the participating service entity 2 and the participating service entity 3 separately, where the third indication message includes the identifier of the service area.

After receiving the third indication message, the participating service entity 2 determines to send the service data of the terminal group to the terminal 4 and the terminal 5 in unicast or multicast mode. When determining that the multicast mode may be used for sending, the participating service entity 2 further requests the identity of the multicast bearer from the controlling service entity corresponding to the terminal group formed by the terminal 4 and the terminal 5, and uses the requested multicast bearer and the broadcast mode to send the service data to the terminal 4 and the terminal 5. When determining to use the unicast mode for sending, the participating service entity 2 sends the service data of the terminal group to the terminal 4 and the terminal 5 in unicast mode.

After receiving the third indication message, the participating service entity 3 sends the service data of the terminal group to the terminal 6 in unicast mode.

In another possible implementation, when the controlling service entity determines not to use the multicast bearer to send the service data in the service area any longer, the controlling service entity may further send indication information to all participating service entities corresponding to the multicast bearer. For example, the indication information is a message for stopping using the multicast bearer, and is used to instruct all the participating service entities to send, in unicast transmission mode, the service data to the terminals that are in the terminal group and are registered with the participating service entities.

For example, referring to FIG. 2, when the controlling service entity determines not to use the multicast bearer to send the service data in the service area any longer, the controlling service entity sends indication information to the participating service entity 1 to the participating service entity 3 separately, instructing the participating service entity 1 to send the service data of the terminal group to the terminal 1 to the terminal 3 in unicast mode, instructing the participating service entity 2 to send the service data of the terminal group to the terminal 4 and the terminal 5 in unicast mode, and instructing the participating service entity 3 to send the service data of the terminal group to the terminal 6 in unicast mode.

In another possible implementation, when the controlling service entity determines not to use the multicast bearer to send the service data in the service area any longer, the controlling service entity may further send indication information to all participating service entities corresponding to the multicast bearer. For example, the indication information is a message for stopping using the multicast bearer, and is used to instruct each participating service entity to send the service data to a terminal that is in the terminal group and is registered with the participating service entity. A mode of sending the data may be the unicast mode or the multicast mode. In this implementation, each participating service entity itself determines the mode of sending the data.

For example, referring to FIG. 2, when the controlling service entity determines not to send the service data in the service area by using the multicast bearer any longer, the controlling service entity sends indication information to the participating service entity 1 to the participating service entity 3 separately, instructing the participating entity 1 to send the service data of the terminal group to the terminal 1 to the terminal 3, where whether the unicast mode or the multicast mode is specifically used is determined by the participating service entity 1, instructing the participating entity 2 to send the service data of the terminal group to the terminal 4 and the terminal 5, where whether the unicast mode or the multicast mode is specifically used is determined by the participating service entity 2, and instructing the participating entity 3 to send the service data of the terminal group to the terminal 6, where the participating service entity 3 determines to use the unicast mode for sending.

In the foregoing communication method, on one hand, the controlling service entity can control one of the participating service entities corresponding to the multicast bearer to send the service data of the terminal group, to prevent a plurality of participating service entities from sending the same service data simultaneously and save resources and improve communication quality; on the other hand, when the participating service entity stops sending the service data, each participating service entity separately sends the service data to the terminal registered with the participating service entity, so that the terminal can receive the service data in time.

Figure 4:
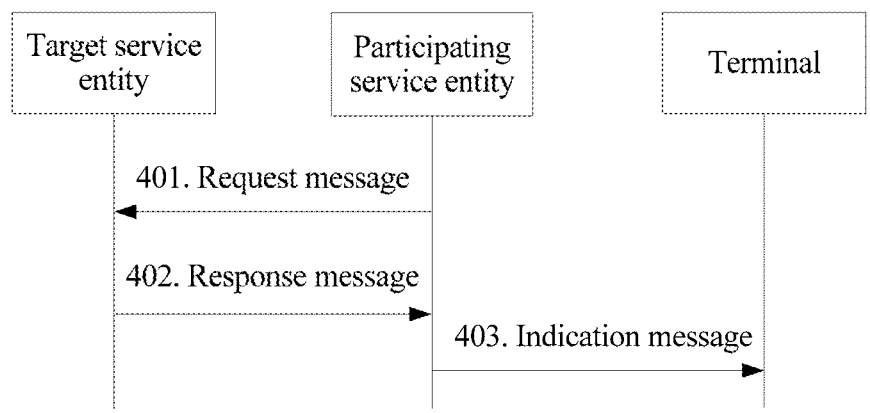
FIG. 4 is a schematic diagram of another communication method according to this application.

As shown in FIG. 4, FIG. 4 is a schematic diagram of another communication method according to this application. The method includes the following steps.

Step 401: A participating service entity sends a request message to a target service entity, and the target service entity receives the request message from the participating service entity.

The target service entity is a controlling service entity or a multicast bearer management entity.

The request message includes an identifier of a service area and a group identity, the request message is used to request to query a target multicast bearer, and the target multicast bearer is used to send service data of a terminal group in the service area.

After receiving the request message from the participating service entity, the target service entity queries the target multicast bearer, and obtains an identity of the target multicast bearer. The identity of the target multicast bearer may be obtained locally. For example, the target multicast bearer may be pre-created previously, or created dynamically after the message is received in step 401, or is reported to the target control entity after being created by another participating service entity previously, or is created and stored by another participating service entity on request of the target service entity previously, or may be obtained from another multicast bearer management entity. Certainly, if the target multicast bearer is not obtained, any participating service entity may be requested to create the target multicast bearer. Finally, the target service entity may obtain the identity of the target multicast bearer and related information.

Further, if the identity of the target multicast bearer is obtained, the target service entity further queries whether another participating service entity is currently using the target multicast bearer, that is, whether another participating service entity is using the target multicast bearer to send the service data or is ready for using the target multicast bearer to send the service data. If no other participating service entity is currently using the target multicast bearer to send the service data or is ready for using the target multicast bearer to send the service data, step 402 is performed.

Step 402: The target service entity sends a response message to the participating service entity, and the participating service entity receives the response message from the target service entity.

The target service entity sends the response message carrying the identity of the target multicast bearer to the participating service entity.

The foregoing step 401 and step 402 may also be completed by using the following step 4011 to step 4014, that is, step 4011 to step 4014 may be used as a whole to replace step 401 and step 402.

The foregoing step 401 and step 402 may also be completed by using the following step 4013 and step 4014, that is, step 4013 and step 4014 may be used as a whole to replace step 401 and step 402.

Step 4011: The participating service entity sends a first request message to the target service entity, and the target service entity receives the first request message from the participating service entity.

The first request message includes the identifier of the service area, the first request message is used to request to query the target multicast bearer, and the target multicast bearer is used to send the service data of the terminal group in the service area; or in other words, the target multicast bearer is a bearer that can provide a multicast bearer transmission service in the service area for the terminal group.

Step 4012: The target service entity sends a first response message to the participating service entity, and the participating service entity receives the first response message from the target service entity.

The first response message includes the identity of the target multicast bearer. Optionally, the first response message may further include some or all of the following parameters of the target multicast bearer: a user plane address and a port number of the target multicast bearer, the service area corresponding to the target multicast bearer, a radio frequency corresponding to the target multicast bearer, and the like.

Optionally, the first response message may further include address information of the participating service entity creating the target multicast bearer, where the address information may be an Internet Protocol version 4 (IPv4) address, may be an Internet Protocol version 6 (IPv6) address, may be a fully qualified domain name (FQDN), or may be a uniform resource locator (URL). The address information may be used by another participating service entity that discovers the target multicast bearer from the target service entity and uses the target multicast bearer to forward the service data to the participating service entity creating the target multicast bearer, so that the participating service entity creating the target multicast bearer sends the received service data (media plane data and control signaling) on the target multicast bearer. An address of the participating service entity creating the target multicast bearer may be an address of the target service entity.

For example, in an implementation, the target multicast bearer is created by a participating service entity (such as a third participating service entity, where the third participating service entity is any one of participating service entities that terminals in the terminal group are registered with). Before the foregoing step 4011, the method may further include the following step:

The third participating service entity sends a report message to the target service entity, where the report message includes the identity of the target multicast bearer, and optionally further includes address information of the third participating service entity.

In this step, the target service entity may obtain and store information about the target multicast bearer, for example, including the identity of the target multicast bearer, so that after the participating service entity sends the first request message to the target service entity, the target service entity can locally obtain the identity of the target multicast bearer and send the first response message carrying the identity of the target multicast bearer to the participating service entity.

Step 4013: The participating service entity sends a second request message to the target service entity, and the target service entity receives the second request message from the participating service entity.

The second request message includes the identity of the target multicast bearer and the group identity of the terminal group.

The second request message may be used to request the target service entity to establish a binding relationship between the identity of the target multicast bearer and the group identity. To be specific, the second request message indicates, to the target service entity, that the participating service entity uses the target multicast bearer to transmit the service data of the terminal group. It may be understood that, the second request message may be used to request to use the target multicast bearer to send the service data of the terminal group.

After establishing the binding relationship between the identity of the target multicast bearer and the group identity, the target service entity may coordinate a plurality of participating service entities in using the target multicast bearer. For example, when another participating service entity requests to transmit service data of a communication group with a same group identity in the same service area, the target service entity may notify the another participating service entity that the foregoing participating service entity is using the target multicast bearer to send the service data of the terminal group in the service area. The target service entity sends the identity of the target multicast bearer to the another participating service entity, and instructs the another participating service entity not to send the service data of the terminal group to a terminal that is in the terminal group and is located in the service area. In an implementation, the target service entity receives a request message from the another participating service entity, where the request message includes the identity of the target multicast bearer and the group identity of the terminal group, and the request message is used to request to use the target multicast bearer to send the service data of the terminal group. The target service entity sends a response message to the another participating service entity, where the response message is used to instruct the another participating service entity not to use the target multicast bearer to send the service data of the terminal group.

After receiving the identity of the target multicast bearer and the indication from the target service entity, the another participating service entity instructs a terminal that is managed by the another participating service entity and is located in the service area to receive the service data of the group on the target multicast bearer, and the another participating service entity stops sending the service data of the terminal group to the terminal that is in the terminal group and is located in the service area. Certainly, sending the service data of the terminal group to the terminal that is in the terminal group and is located in the service area may be stopped after an agreed time, where the agreed time may be preconfigured or may be sent by the target service entity.

For example, the another participating service entity may instruct, in the following manner, the terminal that is managed by the another participating service entity and is located in the service area to receive the service data of the terminal group on the target multicast bearer:

In an implementation, the another participating service entity instructs, in multicast transmission mode, the terminal that is managed by the another participating service entity and is located in the service area to receive the service data of the terminal group on the target multicast bearer.

In another implementation, the another participating service entity instructs, in unicast transmission mode, the terminal that is managed by the another participating service entity and is located in the service area to receive the service data of the terminal group on the target multicast bearer.

Step 4014: The target service entity sends a second response message to the participating service entity, and the participating service entity receives the second response message from the target service entity.

Optionally, the second response message is used to notify the participating service entity that the binding relationship between the identity of the target multicast bearer and the group identity of the terminal group is established successfully, and the participating service entity can use the target multicast bearer to send the service data of the terminal group.

It may be understood that, the second response message may be used to instruct the participating service entity to use the target multicast bearer to send the service data of the terminal group. In an implementation, the target service entity may add first indication information to the second response message in step 4014, where the first indication information is used to instruct the participating service entity to use the target multicast bearer to send the service data of the terminal group. The first indication information may be carried in a specific position in the second response message, for example, implemented by using a character code or a digital code in a specific position in the second response message. Specifically, the first indication information may be indicated by "00", or indicated by "SEND". In another implementation, when receiving the second response message in step 4014, the participating service entity may confirm that no other participating service entity is using the target multicast bearer. Therefore, the participating service entity can use the target multicast bearer.

Herein that the participating service entity uses the target multicast bearer to send the service data of the terminal group may be specifically implemented in the following manner:

In an implementation 1, when the target multicast bearer is created by the participating service entity, the participating service entity may use the target multicast bearer to send the service data of the terminal group.

In an implementation 2, when the target multicast bearer is created by another participating service entity, the participating service entity may send the service data of the terminal group to the another participating service entity, and the another participating service entity uses the target multicast bearer to send the service data of the terminal group.

In an example, the participating service entity may send indication information to the another participating service entity, where the indication information is used to instruct the another participating service entity to use the target multicast bearer to send the service data of the terminal group. The participating service entity may obtain information about the another participating service entity in a manner of pushed by the controlling service entity or a manner of actively requesting, for example, identity information of the another participating service entity, and/or address information of the another participating service entity.

In an implementation 3, the participating service entity directly uses the target multicast bearer to send the service data of the terminal group. Specifically, the participating service entity sends the service data of the terminal group to the user plane address and port number of the target multicast bearer. In the implementation 3, regardless of which participating service entity creates the target multicast bearer, the participating service entity directly uses the target multicast bearer to send the service data of the terminal group.

Step 403: The participating service entity sends an indication message to a terminal, and the terminal receives the indication message from the participating service entity.

After receiving the response message, the participating service entity obtains the identity of the target multicast bearer in the response message. Therefore, the participating service entity further sends an indication message to a terminal that is in the terminal group and is registered with the participating service entity, where the indication message includes the identity of the target multicast bearer, and the indication message is used to instruct the terminal to receive the service data of the terminal group on the target multicast bearer.

The indication message includes the identity of the multicast bearer, and optionally further includes the identity of the terminal group.

In an implementation, the participating service entity sends the indication message to the service area in multicast transmission mode. In this case, terminals receiving the indication message may include some or all of the terminals in the terminal group, or may include terminals in other groups, and the terminals may be registered with the participating service entity or may be registered with other participating service entities. This implementation may be understood as "the participating service entity sends the indication message in the service area to some or all of the terminals in the service area in multicast transmission mode.

In another implementation, the participating service entity sends, in unicast mode, the indication message to a terminal that is in the terminal group and is registered with the participating service entity.

In another implementation, the participating service entity sends, in unicast mode, the indication message to a terminal that is in the terminal group and is registered with the participating service entity and is currently located in the service area.

The indication message is used to instruct the terminal to receive the service data by using the multicast bearer. If the terminal receiving the message is not in the service area, the terminal cannot receive the service data. If the terminal receiving the message is not a terminal in the terminal group, another processing manner may be used. For example, the terminal discards the data packet when failed to attempt to decrypt content of the message, or discards the data packet when determining that the terminal is not a terminal in the terminal group.

For example, referring to FIG. 2, it is assumed that terminals that are in the terminal group and are located in the service area are the terminal 1 to the terminal 6. In an implementation, the participating service entity 1 sends a request message to the target service entity (a controlling service entity or a multicast bearer management entity), and obtains the identity of the target multicast bearer from a received response message, so as to instruct, the terminal 1 to the terminal 3, to receive the service data on the target multicast bearer.

Likewise, in an implementation, the participating service entity 2 may instruct the terminal 4 and the terminal 5 to receive the service data on the target multicast bearer. The participating service entity 3 may instruct the terminal 6 to receive the service data on the target multicast bearer.

By performing the foregoing step 401 to step 403, the participating service entity can actively obtain the identity of the target multicast bearer from the target service entity, and after obtaining the identity of the target multicast bearer, instruct the terminal that is in the terminal group and is located in the service area and is registered with the participating service entity to receive the service data on the target multicast bearer, so that all the terminals that are in the terminal group and are located in the service area receive services. Therefore, as long as one participating service entity sends the service data, all the terminals in the terminal group can receive the service data. This can reduce resource consumption of the participating service entity.

The following describes in detail how each participating service entity determines whether the participating service entity itself can use the target multicast bearer to send the service data to the terminal in the terminal group.

In the foregoing step 401, after the target service entity receives the request message sent by the participating service entity, a query result includes two cases described separately below.

Case 1: It is found that no other participating service entity is using the target multicast bearer.

In this case, because no other participating service entity is currently using the target multicast bearer, the target service entity may notify the participating service entity sending the request message that the target multicast bearer can be used. Specifically, there are at least the following two implementations:

Implementation 1: The response message sent by the target service entity to the participating service entity includes the identity of the target multicast bearer.

In this implementation, when the response message includes only the identity of the target multicast bearer, the participating service entity may consider, by default according to a pre-agreement, that no other participating service entity is using the target multicast bearer. Therefore, the participating service entity can use the target multicast bearer.

Therefore, when receiving the response message and obtaining the identity of the target multicast bearer in the response message, on one hand, the participating service entity sends, by performing the foregoing step 403, the indication message to the terminal that is in the terminal group and is registered with the participating service entity, instructing the terminal to receive the service data on the target multicast bearer; on the other hand, the participating service entity sends the service data of the terminal group in the service area by using the target multicast bearer.

For example, referring to FIG. 2, after the participating service entity 1 sends the request message to the target service entity, the received response message includes only the identity of the target multicast bearer. In this case, the participating service entity considers that no other participating service entity is currently using the target multicast bearer to send the service data to a terminal in the terminal group. Therefore, on one hand, the participating service entity 1 instructs, by using an indication message, the terminal 1 to the terminal 3 to receive the service data on the target multicast bearer; on the other hand, the participating service entity 1 sends the service data of the terminal group in the service area by using the target multicast bearer.

Certainly, the participating service entity 2 and the participating service entity 3 also need to separately instruct the terminal 4 to the terminal 6 to receive the service data on the target multicast bearer. For example, the participating service entity 2 also sends a request message to the target service entity, and after receiving a response message, the participating service entity 2 obtains the identity of the target multicast bearer carried in the response message. In addition, the participating service entity 2 may further determine, according to the response message, that another participating service entity is currently using the target multicast bearer, that is, the participating service entity 1 is using the target multicast bearer. How to perform determining is described in detail subsequently. Therefore, the participating service entity 2 instructs, by using indication information, the terminal 4 and the terminal 5 to receive the service data on the target multicast bearer. In addition, the participating service entity 2 does not send the service data to the terminal 1 to the terminal 7 in the terminal group A. Likewise, the participating service entity 3 instructs the terminal 6 and the terminal 7 to receive the service data on the target multicast bearer. In addition, the participating service entity 3 does not send the service data to the terminal 1 to the terminal 7 in the terminal group A.

Implementation 2: The response message sent by the target service entity to the participating service entity includes the identity of the target multicast bearer and first indication information.

The first indication information is used to instruct the participating service entity to send the service data of the terminal group by using the target multicast bearer.

A main difference between the implementation 2 and the implementation 1 lies in that the first indication information is used to explicitly notify the participating service entity that the service data of the terminal group can be sent currently by using the target multicast bearer. Other aspects are the same as those in the foregoing implementation 1. For details, refer to the foregoing descriptions. Details are not described again.

Case 2: It is found that another participating service entity is using the target multicast bearer to send the service data of the terminal group.

In this case, when the response message includes not only the identity of the target multicast bearer but also a piece of second indication information, the second indication information is used to instruct the participating service entity not to send the service data of the terminal group to the terminal that is in the terminal group and is located in the service area. In this case, the participating service entity determines that another participating service entity is using the target multicast bearer to send the service data to the terminal group.

Therefore, the participating service entity needs to send only an indication message to the terminal that is in the terminal group and is registered with the participating service entity, instructing the terminal to receive the service data of the terminal group on the target multicast bearer, and the participating service entity does not need to send the service data to the terminal group.

For example, in the example provided above, when the participating service entity 1 uses the target multicast bearer to send the service data, after the participating service entity 2 sends the request message to the target service entity, the response message sent by the target service entity to the participating service entity 2 includes the identity of the target multicast bearer and second indication information. Therefore, the participating service entity 2 sends indication information to the terminal 4 and the terminal 5, instructing the terminal 4 and the terminal 5 to receive the service data on the target multicast bearer. Likewise, the participating service entity 3 sends indication information to the terminal 6, instructing the terminal 6 to receive the service data on the target multicast bearer.

The foregoing implementation may also be understood as "when the participating service entity sends a request message to the target service entity, the target service entity sends a response message to the participating service entity, where the response message includes indication information".

When the indication information is the identity of the target multicast bearer, it corresponds to the implementation 1 in the case 1; when the indication information is the identity of the target multicast bearer and the first indication information, it corresponds to the implementation 2 in the case 1; or when the indication information is the identity of the target multicast bearer and the second indication information, it corresponds to the case 2. For details, refer to the foregoing descriptions.

It should be noted that, in the foregoing implementation, when the response message includes only the identity of the target multicast bearer, it may be agreed that no other participating service entity is currently using the target multicast bearer to send the service data. Certainly, when the response message includes only the identity of the target multicast bearer, it may also be agreed that another participating service entity is using the target multicast bearer to send the service data. A specific implementation thereof is similar to the foregoing implementation. Details are not described again herein.

In another implementation, if the foregoing step 401 and step 402 are replaced with the foregoing step 4011 to step 4014, correspondingly, in the foregoing case 1, that is, when the target service entity finds that no other participating service entity is using the target multicast bearer, there are the following several implementations.

In an implementation, the target service entity may add first indication information to the second response message in step 4014, where the first indication information is used to instruct the participating service entity to use the target multicast bearer to send the service data of the terminal group.

In another implementation, the second response message in step 4014 carries nothing; in this case, the participating service entity may consider, by default according to a pre-agreement, that no other participating service entity is using the target multicast bearer. Therefore, the participating service entity can use the target multicast bearer.

Alternatively, the second response message in step 4014 carries the identity of the terminal group, and a function of the identity of the terminal group is the same as that of the first indication information. To be specific, when the second response message carries the identity of the terminal group, the participating service entity confirms that no other participating service entity is using the target multicast bearer. Therefore, the participating service entity can use the target multicast bearer.

In the foregoing case 2, that is, when the target service entity finds that another participating service entity is using the target multicast bearer to send the service data of the terminal group, there are the following several implementations:

The target service entity may add second indication information to the second response message in step 4014, where the second indication information is used to instruct the participating service entity not to send the service data of the terminal group to the terminal that is in the terminal group and is located in the service area. The second indication information may be carried in a specific position in the second response message, for example, implemented by using a character code or a digital code in a specific position in the second response message. Specifically, the second indication information may be indicated by "01", or may be identified by "NOT SEND". The second indication information and the first indication information may be located in a same position in the second response message, and are distinguished by using different values of a same information element. Specifically, when the participating service entity is the participating service entity creating the target multicast bearer, the second indication information may be used to instruct the participating service entity not to use the target multicast bearer to send the service data of the terminal group. Specifically, the participating service entity does not send the received service data (media plane data and control signaling) to the user plane address and port number of the target multicast bearer. Alternatively, the second indication information is used to instruct the participating service entity not to send the service data of the terminal group. When the participating service entity is not the participating service entity creating the target multicast bearer, the second indication information may be used to instruct the participating service entity not to forward the service data of the terminal group to the participating service entity creating the target multicast bearer.

The participating service entity determines that another participating service entity is using the target multicast bearer to send the service data to the terminal group. Therefore, the participating service entity needs to send an indication message only to the terminal that is in the terminal group and is located in the service area and is registered with the participating service entity, instructing the terminal to receive the service data of the terminal group on the target multicast bearer. In addition, the participating service entity does not need to send the service data to the terminal group.

In the foregoing method, when a participating service entity is using the target multicast bearer to send the service data in the service area, other participating service entities only need to instruct the terminals that are in the terminal group and are located in the service area and are registered with the participating service entities to receive the service data on the target multicast bearer. Therefore, only one of participating service entities associated with the terminal group uses the target multicast bearer to send the service data to the terminal group. This prevents a plurality of participating service entities from sending the service data to the terminal group simultaneously, can resolve a problem of sending same service data by different participating service entities repeatedly in the prior art, and helps save resources.

The solutions provided by this application are described above mainly from a perspective of interaction between entities. It may be understood that, each entity includes a corresponding hardware structure and/or software module for performing each function to implement the foregoing functions. A person skilled in the art should be easily aware that, units and algorithm steps in the examples described with reference to the embodiments disclosed in this application can be implemented by hardware or a combination of hardware and computer software in the present application. Whether a function is performed by hardware or hardware driven by computer software depends on particular applications and implementation constraint conditions of the technical solutions. A person skilled in the art may use different methods to implement the described functions for each particular application, but it should not be considered that the implementation goes beyond the scope of the present application.

The following describes a communication method of this application in detail with reference to accompanying drawings by using several specific embodiments.

Figure 5:
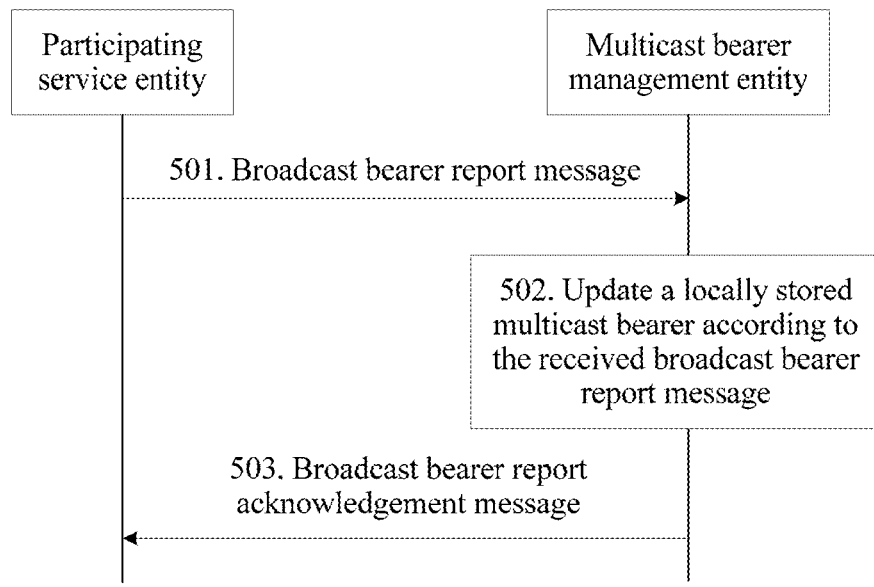
FIG. 5 is a schematic diagram of another communication method according to this application.

As shown in FIG. 5, FIG. 5 is a schematic diagram of another communication method according to this application. A participating service entity in the embodiment shown in FIG. 5 may be a third participating service entity in the foregoing embodiment, and a broadcast bearer report message may be the response message in the foregoing embodiment. The method includes the following steps.

Step 501: A participating service entity sends a broadcast bearer report message to a multicast bearer management entity.

After the participating service entity (the participating service entity may be any one of participating service entities with which a terminal group is registered, and for example, is referred to as a third participating service entity) pre-creates a multicast bearer, or dynamically creates a multicast bearer, or updates a multicast bearer, the participating service entity sends the broadcast bearer report message to the multicast bearer management entity, where the broadcast bearer report message includes a temporary mobile group identity (TMGI), and a service area identifier (SAI), and optionally further includes a bearer expiration time (expiration time), and a terminal group identity (Group ID). Optionally, the broadcast bearer report message further includes address information of the participating service entity, where the address may be an IPv4 address, or may be an IPv6 address, or may be an FQDN, or may be a URL.

The TMGI is used to identify a multicast bearer. In other words, the TMGI may be understood as an identity of a multicast bearer. The SAI is used to identify a service area. The group ID is used to indicate a terminal group that is using the multicast bearer. Certainly, if no group communication data is being transmitted on the multicast bearer identified by the TMGI, the broadcast bearer report message may not carry the group ID.

It should be noted that, the broadcast bearer report message may also be referred to as a report message, or the like.

Step 502: The multicast bearer management entity updates a locally stored multicast bearer according to the received broadcast bearer report message.

If the multicast bearer management entity does not store information about the multicast bearer, the multicast bearer management entity stores information in the broadcast bearer report message. If the multicast bearer management entity already stores information about the multicast bearer, the multicast bearer management entity updates the stored information about the multicast bearer according to information in the received broadcast bearer report message.

Step 503: The multicast bearer management entity sends a broadcast bearer report acknowledgement message to the participating service entity.

The broadcast bearer report acknowledgement message is used to indicate that the broadcast bearer report message is already received successfully.

In the foregoing step 501 to step 503, after a participating service entity creates a multicast bearer, the participating service entity may send information about the multicast bearer to the multicast bearer management entity for storage, so that the multicast bearer can be obtained from the multicast bearer management entity directly when required for use.

Figure 6:
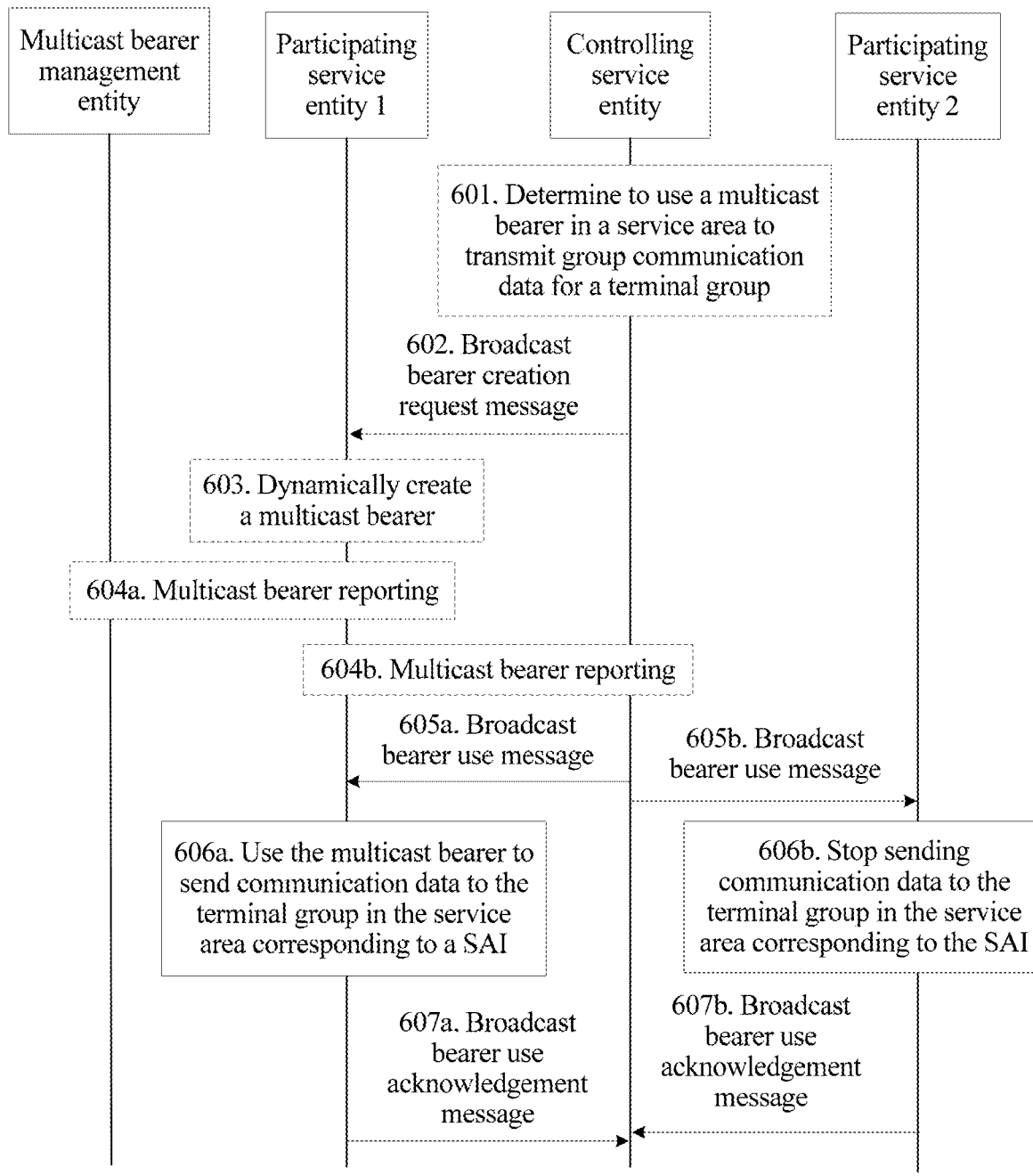
FIG. 6 is a schematic diagram of another communication method according to this application.

As shown in FIG. 6, FIG. 6 is a schematic diagram of another communication method according to this application. A participating service entity 1 is the first participating service entity in the foregoing embodiment, and a participating service entity 2 is the second participating service entity in the foregoing embodiment. The method includes the following steps.

Step 601: A controlling service entity determines to use a multicast bearer in a service area to transmit group communication data for a terminal group.

The controlling service entity may determine whether to use the multicast bearer in the service area to transmit the group communication data for the terminal group, for example, send service data.

Step 602: The controlling service entity sends a broadcast bearer creation request message to a participating service entity 1, and the participating service entity 1 receives the broadcast bearer creation request message from the controlling service entity.

If the controlling service entity does not find information about a multicast bearer in the service area locally or from a multicast bearer management entity, a participating service entity such as the participating service entity 1 is selected for creating a bearer.

Therefore, the controlling service entity sends the broadcast bearer creation request message to the participating service entity 1. The broadcast bearer creation request message includes a service area identifier SAI and a terminal group identity group ID, and optionally further includes Session Description Protocol (SDP) information and quality of service (QoS), where the SDP information is service description information, for example, including coding and decoding information.

Optionally, if the controlling service entity has obtained a TMGI corresponding to the SAI, the TMGI may also be carried in the broadcast bearer creation request message and sent to the participating service entity 1, so that the participating service entity 1 uses the TMGI to activate the bearer.

Step 603: The participating service entity 1 creates a multicast bearer.

Step 604a: The participating service entity 1 sends information about the multicast bearer to a multicast bearer management entity.

Step 604b: The participating service entity 1 sends the information about the multicast bearer to the controlling service entity.

Step 605a: The controlling service entity sends a broadcast bearer use message to the participating service entity 1, and the participating service entity 1 receives the broadcast bearer use message from the controlling service entity.

The broadcast bearer use message includes the TMGI, the SAI, the group ID, and a media sending indicator, where the media sending indicator instructs the participating service entity 1 to use the multicast bearer corresponding to the TMGI to send group communication data such as service data to a terminal indicated by the group ID.

Step 605b: The controlling service entity sends a broadcast bearer use message to a participating service entity 2, and the participating service entity 2 receives the broadcast bearer use message from the controlling service entity.

The broadcast bearer use message includes the TMGI, the SAI, the group ID, and a media sending indicator, and optionally further includes a timer, where the media sending indicator instructs the participating service entity 2 not to send communication data to the terminal group in the service area indicated by the SAI. If the timer is included, the timer is used to indicate how soon the participating service entity 2 stops sending communication data to the terminal group in the service area indicated by the SAI.

Step 606a: The participating service entity 1 uses the multicast bearer corresponding to a TMGI to send communication data to the terminal group in the service area corresponding to a SAI.

Step 606b: The participating service entity 2 stops sending communication data to the terminal group in the service area corresponding to the SAI.

Further, the participating service entity 2 needs to instruct a terminal that is in the terminal group and is located in the service area and is registered with the participating service entity 2 to receive the communication data on the multicast bearer corresponding to the TMGI.

Step 607a: The participating service entity 1 sends a broadcast bearer use acknowledgement message to the controlling service entity.

Step 607b: The participating service entity 2 sends a broadcast bearer use acknowledgement message to the controlling service entity.

In the method, the controlling service entity instructs the participating service entity 1 to send the service data of the terminal group by using the multicast bearer, and instructs the participating service entity 2 not to send the service data of the terminal group to the terminal that is in the terminal group and is located in the service area and is registered with the participating service entity 2. This prevents the terminal group from receiving the same service data from a plurality of participating service entities and saves resources.

Figure 7:
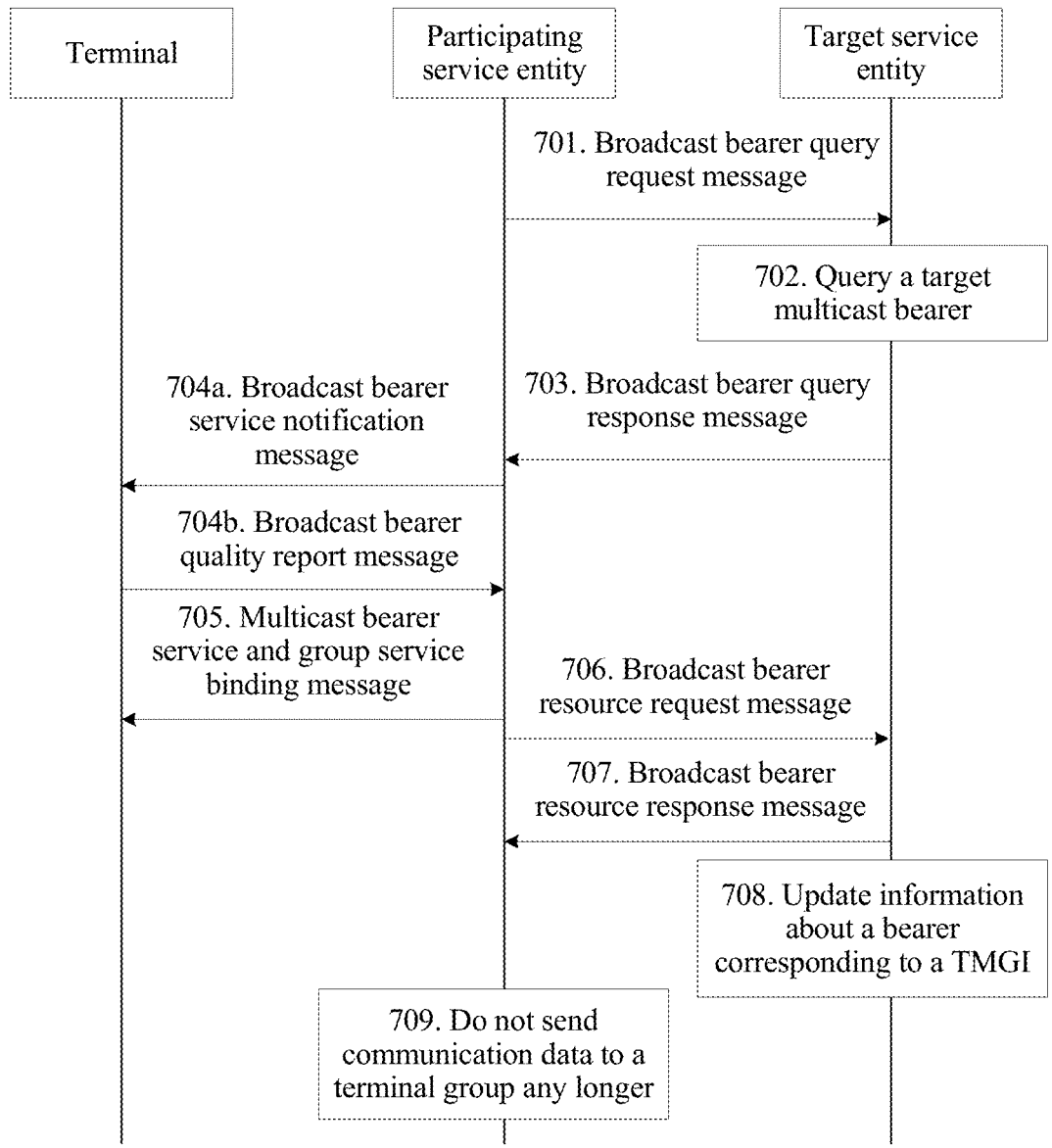
FIG. 7 is a schematic diagram of another communication method according to this application.

As shown in FIG. 7, FIG. 7 is a schematic diagram of another communication method according to this application. In this embodiment, a participating service entity determines to use a multicast bearer, and then queries, from a target service entity (a controlling service entity or a multicast bearer management entity), whether a multicast bearer for transmitting communication data of a same group already exists in a service area. If the multicast bearer already exists, the participating service entity instructs a terminal registered with the participating service entity to receive service data on the existing multicast bearer, and the participating service entity does not send service data to the terminal group any longer. The method includes the following steps.

Step 701: A participating service entity sends a broadcast bearer query request message to a target service entity, and the target service entity receives the broadcast bearer query request message from the participating service entity.

The broadcast bearer query request message includes a SAI, and optionally further includes QoS and SDP information.

Optionally, the broadcast bearer query request message further includes a group ID.

Step 702: The target service entity queries, according to the broadcast bearer query request message, a target multicast bearer satisfying a condition.

Step 703: The target service entity sends a broadcast bearer response message to the participating service entity, and the participating service entity receives the broadcast bearer response message from the target service entity.

The broadcast bearer response message includes a TMGI and a no communication indicator (No echo indicator), where the TMGI is used to indicate an identity of a target multicast bearer that is being used, and the no echo indicator is used to indicate that the participating service entity does not need to send communication data to a terminal in group communication in a service area corresponding to a SAI corresponding to the TMGI. Optionally, the broadcast bearer response message further includes the SAI corresponding to the TMGI.

If the request message in the foregoing step 701 includes a group ID, the TMGI is used to indicate an identity of a target multicast bearer that a terminal group corresponding to the group ID is using.

Step 704a: The participating service entity sends a broadcast service notification message to a terminal that is in a terminal group and is located in a service area and is registered with the participating service entity, and the terminal receives the broadcast service notification message from the participating service entity.

The broadcast service notification message includes the TMGI and the SAI, and is used to instruct the terminal to monitor received quality on the multicast bearer corresponding to the TMGI.

Step 704b: The terminal sends a broadcast bearer quality report message to the participating service entity, and the participating service entity receives the broadcast bearer quality report message from the terminal.

The broadcast bearer quality report message includes the TMGI and quality information obtained through listening.

Step 705: The participating service entity sends a multicast bearer service and group communication binding message to the terminal that is in the terminal group and is located in the service area and is registered with the participating service entity, and the terminal receives the multicast bearer service and group communication binding message from the participating service entity.

The multicast bearer service and group communication binding message includes the TMGI and the group ID.

After receiving the message, the terminal binds the TMGI with the group ID, that is, establishes a correspondence.

It should be noted that, step 705 may also be performed before step 704a, or performed between step 704a and step 704b.

Step 706: The participating service entity sends a broadcast bearer use request message to the target service entity, and the target service entity receives the broadcast bearer use request message from the participating service entity.

The broadcast bearer use request message includes the TMGI, a reserved resource such as a bandwidth, and the group ID, and indicates that the participating service entity will soon send, on the multicast bearer corresponding to the TMGI, the communication data to the terminal group corresponding to the group ID, and therefore needs to request the resource quantity such as the bandwidth from the target service entity.

Step 707: The target service entity sends a broadcast bearer use response message to the participating service entity, and the participating service entity receives the broadcast bearer use response message from the target service entity.

The broadcast bearer use response message includes the TMGI, the SAI, the group ID, and the no echo indicator. The no echo indicator is used to indicate that the participating service entity does not need to use, in the service area corresponding to the SAI, the multicast bearer corresponding to the TMGI to send the communication data such as service data to the terminal group corresponding to the group ID.

Step 708: The target service entity updates information about a multicast bearer corresponding to a TMGI.

Step 709: After receiving a no echo indicator, the participating service entity does not use the multicast bearer corresponding to the TMGI to send communication data to the terminal group corresponding to the group ID any longer.

In this embodiment, only one participating service entity in the same service area uses the multicast bearer to send the communication data to the terminal group. This prevents a terminal in the terminal group from receiving the same service data from different participating service entities. Therefore, resources can be saved.

Figure 8:
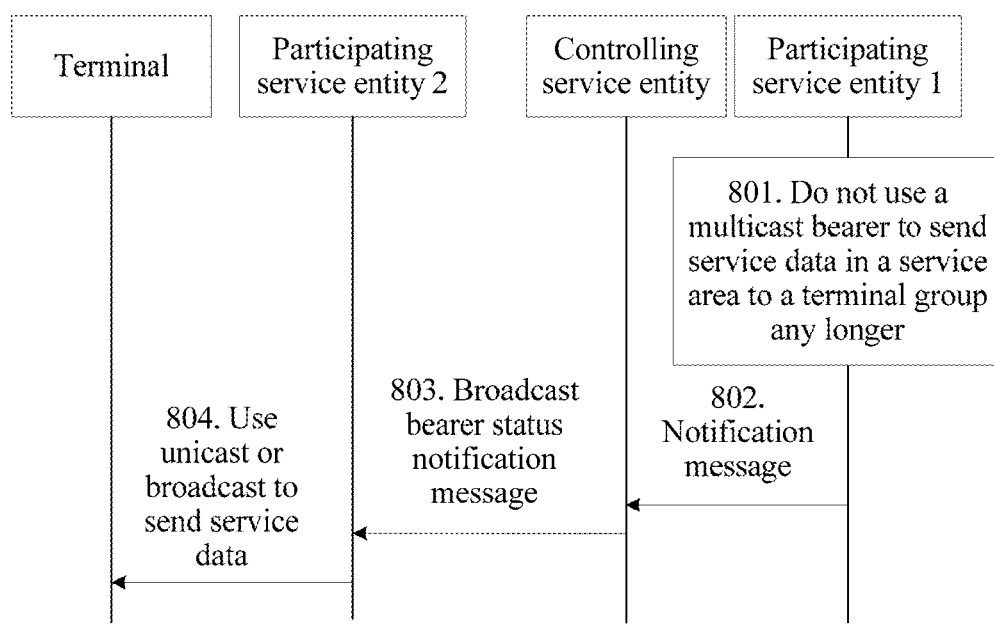
FIG. 8 is a schematic diagram of another communication method according to this application.

As shown in FIG. 8, FIG. 8 is a schematic diagram of another communication method according to this application. Both a participating service entity 1 and a participating service entity 2 are in a service area, and the participating service entity 1 is currently sending service data of a terminal group to the terminal group by using a multicast bearer in the service area. A terminal that is in the terminal group and is registered with the participating service entity 2 receives the service data of the terminal group on the multicast bearer. The participating service entity 2 does not send service data to the terminal that is in the terminal group and is located in the service area and is registered with the participating service entity 2.

If the participating service entity 1 needs to stop sending the service data to the terminal group, the following steps are performed:

Step 801: A participating service entity 1 determines not to use a multicast bearer to send service data in a service area any longer.

For example, because of a fault, overload, exit from communication, or the like, the participating service entity 1 stops using the multicast bearer to send the service data to a terminal group.

Step 802: The participating service entity 1 sends a notification message to a controlling service entity, and the controlling service entity receives the notification message from the participating service entity 1.

The notification message may also be referred to as a stop sending data message. The message includes a TMGI, a SAI, and a group ID, and indicates that the participating service entity 1 does not use, in the service area corresponding to the SAI, the multicast bearer corresponding to the TMGI to send the service data to the terminal group corresponding to the group ID any longer.

Step 803: The controlling service entity sends a broadcast bearer status notification message to a participating service entity 2, and the participating service entity 2 receives the broadcast bearer status notification message from the controlling service entity.

The broadcast bearer status notification message includes the SAI, and is used to instruct the participating service entity 2 to use, in the service area corresponding to the SAI, unicast or multicast to send service data to a terminal that is in the terminal group and is registered with the participating service entity 2.

Step 804: After receiving the broadcast bearer status notification message, the participating service entity 2 uses, in the service area corresponding to a SAI, unicast or broadcast to send service data to a terminal that is in the terminal group and is located in the service area and is registered with the participating service entity 2.

In this embodiment, when the participating service entity sending the service data to the terminal group stops sending the service data, the participating service entity with which the terminal is registered can send the service data to the terminal to ensure normal communication.

Figure 9:
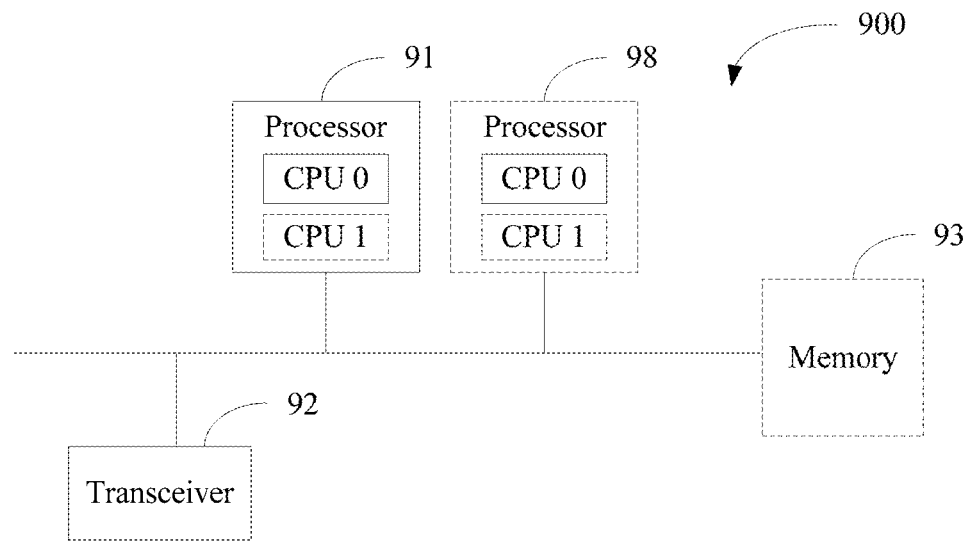
FIG. 9 is a schematic diagram of an apparatus according to this application.

Based on a same inventive concept, as shown in FIG. 9, FIG. 9 is a schematic diagram of an apparatus according to this application. The apparatus 900 may be a controlling service entity, or may be a system-on-chip or a chip, and may perform the method performed by the controlling service entity in any one of the foregoing embodiments.

The apparatus 900 includes at least one processor 91 and a transceiver 92, and optionally further includes a memory 93. The processor 91, the transceiver 92, and the memory 93 are connected by a communications bus.

The processor 91 may be a general-purpose central processing unit (CPU), a microprocessor, an ASIC, or one or more integrated circuits for controlling program execution in the solution of the present application.

The communications bus may include a path for transmitting information between the foregoing units.

The transceiver 92 is configured to communicate with another device or communications network. The transceiver may be a communications interface, for example, a wired interface or a wireless interface, or a Wi-Fi interface, or the transceiver includes a radio frequency circuit.

The memory 93 may be a ROM or another type of static storage device capable of storing static information and instructions, or a RAM or another type of dynamic storage device capable of storing information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 93 may exist independently, and is connected to the processor 91 by the communications bus. The memory 93 may also be integrated with the processor. The memory 93 is configured to store application program code used to execute the solution of the present application, where the application program code is executed by the processor 91. The processor 91 is configured to execute the application program code stored in the memory 93.

In a specific implementation, in an embodiment, the processor 91 may include one or more CPUs, for example, a CPU 0 and a CPU 1 in FIG. 9.

In a specific implementation, in an embodiment, the apparatus 900 may include a plurality of processors, for example, the processor 91 and a processor 98 in FIG. 9. Each of the processors may be a single-core (single-CPU) processor, or may be a multi-core (multi-CPU) processor. Herein the processor may be one or more devices, a circuit, and/or a processing core for processing data (for example, a computer program instruction).

It should be understood that, the apparatus may be configured to implement steps performed by the controlling service entity in the communication method in the embodiment of the present application. For related features, refer to the foregoing descriptions. Details are not described again herein.

Figure 10:
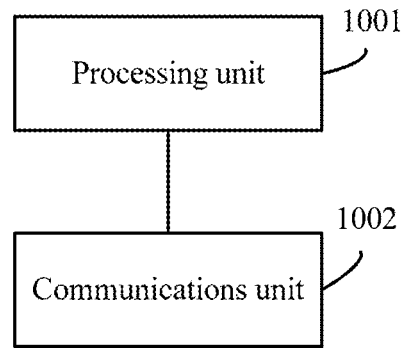
FIG. 10 is a schematic diagram of another apparatus according to this application.

In this application, functional modules in the apparatus may be obtained through division according to the foregoing method examples. For example, each functional module corresponding to each function may be obtained through division, or two or more functions may be integrated in one processing module. The integrated module may be implemented in a form of hardware, or may be implemented in a form of a software functional module. It should be noted that, division of modules in this application is merely an example, and is only division of logical functions. Other division manners may be available in actual implementations. For example, when each functional module corresponding to each function is obtained through division, FIG. 10 shows a schematic diagram of an apparatus. The apparatus may be the controlling service entity used in the foregoing embodiment or a system-on-chip or a chip. The apparatus includes a processing unit 1001 and a communications unit 1002.

In an application:

the processing unit 1001 is configured to obtain an identity of a multicast bearer, where the multicast bearer is used to transmit service data of a terminal group in a service area;

the communications unit 1002 is configured to send a first indication message to a first participating service entity associated with the terminal group, where the first indication message is used to instruct the first participating service entity to send the service data of the terminal group by using the multicast bearer;

the communications unit 1002 is further configured to send a second indication message to a second participating service entity associated with the terminal group, where the second indication message is used to instruct the second participating service entity not to send the service data of the terminal group to a terminal that is in the terminal group and is located in the service area, and the first participating service entity is different from the second participating service entity;

where At least one terminal in the terminal group is registered with the first participating service entity, and at least one terminal in the terminal group is registered with the second participating service entity.

In a possible implementation, the processing unit 1001 is specifically configured to control the communications unit 1002 to:

send a query message to a multicast bearer management entity, where the query message includes an identifier of the service area, and the query message is used to request to query the multicast bearer corresponding to the service area; and receive a response message from the multicast bearer management entity, where the response message includes the identity of the multicast bearer.

In a possible implementation, the communications unit 1002 is further configured to:

send a request message to a third participating service entity associated with the terminal group, where the request message includes the identifier of the service area, and the request message is used to request the third participating service entity to create a multicast bearer in the service area.

In a possible implementation, the communications unit 1002 is further configured to:

receive a response message from the third participating service entity, where the response message includes an identity of the multicast bearer.

In a possible implementation, the request message includes an identity of the terminal group.

In a possible implementation, the communications unit 1002 is further configured to:

receive a notification message from the first participating service entity, where the notification message is used to instruct the first participating service entity to stop sending the service data of the terminal group by using the multicast bearer; and send a third indication message to the second participating service entity, where the third indication message is used to instruct the second participating service entity to send the service data of the terminal group to a terminal that is in the terminal group and is located in the service area and is registered with the second participating service entity.

In another application:

the processing unit 1001 is configured to control the communications unit 1002 to:

send a request message to a target service entity, where the request message includes an identifier of a service area and a group identity, the request message is used to request to query a target multicast bearer, and the target multicast bearer is used to send, in the service area, service data of a terminal group corresponding to the group identity;

receive a response message from the target service entity, where the response message includes an identity of the target multicast bearer; and send an indication message to a terminal, where the indication message is used to instruct the terminal to receive the service data of the terminal group by using the target multicast bearer;

where the terminal is a terminal that is in the service area and is registered with the participating service entity.

In a possible implementation, the processing unit 1001 is further configured to control the communications unit 1002 to send the service data of the terminal group by using the target multicast bearer; or the response message further includes first indication information, where the first indication information is used to instruct the participating service entity to send the service data of the terminal group by using the target multicast bearer; and the processing unit 1001 is further configured to control the communications unit 1002 to send the service data of the terminal group by using the target multicast bearer.

In a possible implementation, the response message further includes second indication information, where the second indication information is used to instruct not to send the service data of the terminal group to a terminal that is in the terminal group and is located in the service area.

In this embodiment, the apparatus is presented in a form of functional modules obtained through division and corresponding to functions, or the apparatus is presented in a form of functional modules obtained through integration. Herein the "module" may be an ASIC, a circuit, a processor and a memory executing one or more software or firmware programs, an integrated logic circuit, and/or other components that may provide the foregoing functions.

It should be understood that, the apparatus may be configured to implement steps performed by the controlling service entity in the communication method in the foregoing embodiment of the present application. For related features, refer to the foregoing descriptions. Details are not described again herein.

Figure 11:
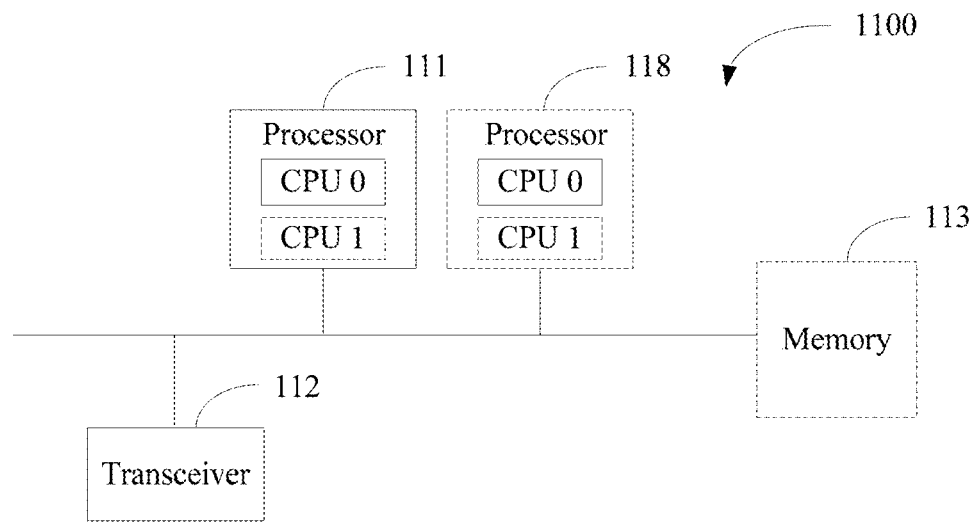
FIG. 11 is a schematic diagram of an apparatus according to this application.

Based on a same inventive concept, as shown in FIG. 11, FIG. 11 is a schematic diagram of an apparatus according to this application. The apparatus 1100 may be, for example, a participating service entity, or may be a system-on-chip or a chip, and may perform the method performed by the participating service entity in any one of the foregoing embodiments.

The apparatus 1100 includes at least one processor 111 and a transceiver 112, and optionally further includes a memory 113. The processor 111, the transceiver 112, and the memory 113 are connected by a communications bus.

The processor 111 may be a general-purpose central processing unit (CPU), a microprocessor, a specific ASIC, or one or more integrated circuits for controlling program execution in the solution of the present application.

The communications bus may include a path for transmitting information between the foregoing units.

The transceiver 112 is configured to communicate with another device or communications network. The transceiver may be a communications interface, for example, a wired interface or a wireless interface, or a Wi-Fi interface, or the transceiver includes a radio frequency circuit.

The memory 113 may be a ROM or another type of static storage device capable of storing static information and instructions, or a RAM or another type of dynamic storage device capable of storing information and instructions, or may be an EEPROM, a CD-ROM, or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 113 may exist independently, and is connected to the processor 111 by the communications bus. The memory 113 may also be integrated with the processor. The memory 113 is configured to store application program code used to execute the solution of the present application, where the application program code is executed by the processor 111. The processor 111 is configured to execute the application program code stored in the memory 113.

In a specific implementation, in an embodiment, the processor 111 may include one or more CPUs, for example, a CPU 0 and a CPU 1 in FIG. 11.

In a specific implementation, in an embodiment, the apparatus 1100 may include a plurality of processors, for example, the processor 111 and a processor 118 in FIG. 11. Each of the processors may be a single-core (single-CPU) processor, or may be a multi-core (multi-CPU) processor. Herein the processor may be one or more devices, a circuit, and/or a processing core for processing data (for example, a computer program instruction).

It should be understood that, the apparatus may be configured to implement steps performed by the participating service entity in the communication method in the foregoing embodiment of the present application. For related features, refer to the foregoing descriptions. Details are not described again herein.

Figure 12:
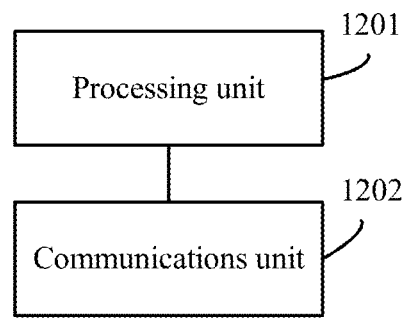
FIG. 12 is a schematic diagram of another apparatus according to this application.

In this application, functional modules in the apparatus may be obtained through division according to the foregoing method examples. For example, each functional module corresponding to each function may be obtained through division, or two or more functions may be integrated in one processing module. The integrated module may be implemented in a form of hardware, or may be implemented in a form of a software functional module. It should be noted that, division of modules in this application is merely an example, and is only division of logical functions. Other division manners may be available in actual implementations. For example, when each functional module corresponding to each function is obtained through division, FIG. 12 shows a schematic diagram of an apparatus. The apparatus may be a participating service entity used in the foregoing embodiment. The apparatus includes a processing unit 1201 and a communications unit 1202.

In an application:

the processing unit 1201 is configured to control the communications unit 1202 to:

receive a second indication message from a controlling service entity, where the second indication message includes an identity of a multicast bearer, an identifier of a service area, and a group identity, and the second indication message is used to instruct the participating service entity not to send service data of a terminal group to a terminal that is in the terminal group corresponding to the group identity and is located in the service area; and send a fourth indication message to the terminal, where the fourth indication message includes the identity of the multicast bearer, and the fourth indication message is used to instruct the terminal to receive service data of the terminal group by using the multicast bearer, and the terminal is a terminal that is in the terminal group and is located in the service area and is registered with the participating service entity.

In a possible implementation, the processing unit 1201 is further configured to control the communications unit 1202 to:

receive a third indication message from the controlling service entity, where the third indication message is used to instruct the participating service entity to send the service data of the terminal group to the terminal.

In another application:

the processing unit 1201 is configured to control the communications unit 1202 to:

receive a request message from a participating service entity, where the request message includes an identifier of a service area and a group identity, the request message is used to request to query a target multicast bearer, and the target multicast bearer is used to send, in the service area, service data of a terminal group corresponding to the group identity; and send a response message to the participating service entity, where the response message includes an identity of the target multicast bearer.

In a possible implementation, the response message further includes first indication information, where the first indication information is used to instruct the participating service entity to send the service data of the terminal group by using the target multicast bearer.

In a possible implementation, the response message further includes second indication information, where the second indication information is used to instruct the participating service entity not to send the service data of the terminal group to a terminal that is in the terminal group and is located in the service area.

In this embodiment, the apparatus is presented in a form of functional modules obtained through division and corresponding to functions, or the apparatus is presented in a form of functional modules obtained through integration. Herein the "modules" may be an ASIC, a circuit, a processor and a memory executing one or more software or firmware programs, an integrated logic circuit, and/or other components that may provide the foregoing functions.

It should be understood that, the apparatus may be configured to implement steps performed by the participating service entity in the communication method in the foregoing embodiment of the present application. For related features, refer to the foregoing descriptions. Details are not described again herein.

Figure 13:
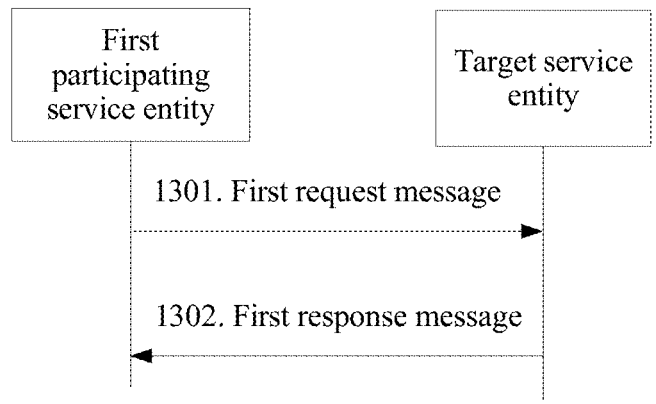
FIG. 13 is a schematic diagram of another communication method according to this application.

As shown in FIG. 13, this application further provides a communication method. The communication method may be performed by a target service entity and a participating service entity (a first participating service entity and a third participating service entity are used as an example in the figure) managed by a target service entity. The first participating service entity and the third participating service entity are any two of participating service entities managed by the target service entity.

The target service entity may be a controlling service entity or a multicast bearer management entity.

In this embodiment, a second participating service entity and a fourth participating service entity are further mentioned subsequently. The second participating service entity may be any participating service entity other than the first participating service entity among participating service entities with which terminals in a terminal group are registered, the fourth participating service entity may be any one of the participating service entities with which the terminals in the terminal group are registered, and the fourth participating service entity may be the first participating service entity or the third participating service entity. This is not limited.

It should be noted that, herein numbers of the first participating service entity, the second participating service entity, the third participating service entity, and the fourth participating service entity are used merely for mutual distinguishing. Actually, other names may also be used.

The following describes an implementation process of the communication method shown in FIG. 13. The method includes the following steps.

Step 1301: A first participating service entity sends a first request message to a target service entity, and the target service entity receives the first request message from the first participating service entity.

The target service entity may be a controlling service entity or may be a multicast bearer management entity. This is not limited.

The first request message may include a group identity and an identity of a target multicast bearer, and the first request message may be used to request to use the target multicast bearer to send service data of a terminal group corresponding to the group identity.

It should be noted that, the first participating service entity may be any participating service entity managed by the controlling service entity. For the terminal group corresponding to the group identity, there are one corresponding controlling service entity and one or more corresponding participating service entities. Herein "managed" may be understood as "for the terminal group, the controlling service entity of the terminal group may get in contact with one or more participating service entities corresponding to the terminal group, and undertake a centralized control function in call control and media plane control".

In an example, when the first participating service entity determines to use the target multicast bearer to send the service data of the terminal group, the first participating service entity sends the first request message to the target service entity, where the first request message includes the group identity and the identity of the target multicast bearer. The first participating service entity may determine, based on terminal status information in the terminal group, to use the target multicast bearer to send the service data of the terminal group. For example, when a quantity of terminals that are in the terminal group and are served by the first participating service entity and are located in a service area corresponding to the target multicast bearer satisfies a preset condition, the first participating service entity determines to use the target multicast bearer to send the service data of the terminal group.

In an example, before the foregoing step 1301, the target service entity already stores information about the target multicast bearer, such as the identity of the target multicast bearer. The information about the target multicast bearer stored in the target service entity may be obtained in the following manners:

In an implementation, the target multicast bearer is created by the first participating service entity, and the information (for example, the identity of the target multicast bearer) about the created target multicast bearer is reported to the target service entity.

In this implementation, because the target multicast bearer is created by the first participating service entity, the first participating service entity also stores the information about the target multicast bearer locally. Further, in the foregoing step 1301, the identity of the target multicast bearer that is carried in the first request message sent by the first participating service entity to the target service entity may be obtained by the first participating service entity locally.

In another implementation, the target multicast bearer is created by another participating service entity (for example, a second participating service entity), and the information (for example, the identity of the target multicast bearer) about the created target multicast bearer is reported to the target service entity. In this case, in the foregoing step 1301, the identity of the target multicast bearer that is carried in the first request message sent by the first participating service entity to the target service entity may be obtained by the first participating service entity in the following manners:

Case 1: The target service entity is a controlling service entity.

After receiving the information about the target multicast bearer that is reported by the second participating service entity, the controlling service entity pushes the information to another participating service entity, for example, pushes the information to the first participating service entity, and the first participating service entity stores the information about the target multicast bearer locally.

Further, in the foregoing step 1301, when sending the first request message to the target service entity, the first participating service entity may obtain the identity of the target multicast bearer locally, and send the first request message carrying the identity of the target multicast bearer to the target service entity.

Case 2: The target service entity is a multicast bearer management entity.

After receiving the information about the multicast bearer that is reported by the second participating service entity, the multicast bearer management entity does not push the information to another participating service entity. In this case, the first participating service entity may obtain the identity of the target multicast bearer in the following manner:

The first participating service entity sends a query request message to the multicast bearer management entity, where the query request message includes an identifier of the service area, and the query request message is used to request to obtain the information about the multicast bearer for sending the service data to the service area corresponding to the identifier of the service area; further, the query request message may further include the group identity, and is used to request to obtain the information about the multicast bearer for sending the service data of the terminal group corresponding to the group identity to the service area corresponding to the identifier of the service area. Then the multicast bearer management entity sends a query response message to the first participating service entity, where the query response message includes the identity of the target multicast bearer. Then the first participating service entity stores the information (for example, the identity of the target multicast bearer) of the target multicast bearer locally.

Further, in the foregoing step 1301, when sending the first request message to the target service entity, the first participating service entity may obtain the identity of the target multicast bearer locally, and send the first request message carrying the identity of the target multicast bearer to the target service entity.

Step 1302: The target service entity sends a first response message to the first participating service entity, and the first participating service entity receives the first response message from the target service entity.

The first response message may include a status of use of the target multicast bearer by the terminal group.

Optionally, the status of use of the target multicast bearer by the terminal group is: in use or not in use; or service data of the terminal group is being sent on the target multicast bearer, or no service data of the terminal group is being sent on the target multicast bearer; or no participating service entity is using the target multicast bearer to send service data of the terminal group, or a participating service entity is using the target multicast bearer to send service data of the terminal group, or the second participating service entity is using the target multicast bearer to send service data of the terminal group.

If the status of use of the target multicast bearer by the terminal group is "in use", it indicates that another participating service entity is currently using the target multicast bearer to send service data to the terminal group. In this case, the first participating service entity does not send the service data to the terminal group, so as to avoid repeated sending of the same service data. The first participating service entity only needs to instruct a terminal to receive the service data on the target multicast bearer. Details are described subsequently.

If the status of use of the target multicast bearer by the terminal group is "not in use", it may indicate that no other participating service entity is currently using the target multicast bearer to send service data to the terminal group. In this case, the first participating service entity may use the target multicast bearer to send the service data to the terminal group.

In the foregoing embodiment, after receiving the first request message from the first participating service entity, the target service entity sends the status of use of the target multicast bearer by the terminal group to the first participating service entity, so that the first participating service entity can determine, according to the received status of use, whether the target multicast bearer can be used to send the service data to the terminal group. For example, the first participating service entity uses the target multicast bearer to send the service data only when the first participating service entity determines that the status of use of the target multicast bearer by the terminal group is "not in use". This helps prevent a plurality of participating service entities from simultaneously using the target multicast bearer to send data to the terminal group, and further helps prevent a terminal in the terminal group from repeatedly receiving same service data. Therefore, resources can be saved.

Optionally, in a first implementation scenario of the foregoing embodiment, the method further includes:

Step 1303: The first participating service entity determines, according to the status of use, to use the target multicast bearer to send the service data of the terminal group, and sends an indication message to the target service entity.

The indication message may be used to indicate that the first participating service entity is using the target multicast bearer to send the service data of the terminal group.

Correspondingly, the method may further include:

Step 1304: The target service entity receives the indication message from the first participating service entity, and updates, according to the indication message, the status of use of the target multicast bearer by the terminal group.

For example, in step 1304, any one of the following manners may be used to update the status of use of the target multicast bearer by the terminal group:

The target service entity updates the status of use of the target multicast bearer by the terminal group as "the first participating service entity is using the target multicast bearer to send the service data of the terminal group"; or the target service entity updates the status of use of the target multicast bearer by the terminal group as "a participating service entity is using the target multicast bearer to send the service data of the terminal group"; or the target service entity updates the status of use of the target multicast bearer by the terminal group as "in use".

Further, if the target service entity is a controlling service entity, the target service entity may send a notification message to a participating service entity other than the first participating service entity, where the notification message may be used to notify the updated status of use of the target multicast bearer to the another participating service entity, so that the another participating service entity also learns the latest status of use of the target multicast bearer. Therefore, the another participating service entity can learn the status of use of the target multicast bearer in time, and can further use the multicast bearer to send the service data of the group. Therefore, a quantity of terminals covered by the multicast bearer is increased, and transmission efficiency is improved.

The latest status of use may be "the first participating service entity is using the target multicast bearer to send the service data of the terminal group", or "a participating service entity is using the target multicast bearer to send the service data of the terminal group", or "in use".

In an actual application, the first participating service entity determines, according to the status of use in the received first response message, whether the target multicast bearer can be used to send the service data of the terminal group. When the first participating service entity determines, according to the status of use in the received first response message, to use the target multicast bearer to send the service data of the terminal group, the first participating service entity uses the target multicast bearer to send the service data to the terminal group.

In an implementation, that the first participating service entity determines, according to the status of use, to use the target multicast bearer to send the service data of the terminal group may include the following method:

For example, when the first participating service entity has to-be-sent service data of the terminal group, and the status of use in the received first response message is "no participating service entity is using the target multicast bearer to send service data of the terminal group", the first participating service entity determines to use the target multicast bearer to send the service data of the terminal group.

For another example, when the first participating service entity has to-be-sent service data of the terminal group, and the status of use in the received first response message is "not in use", the first participating service entity determines to use the target multicast bearer to send the service data of the terminal group.

For another example, when the first participating service entity has to-be-sent service data of the terminal group, and the status of use in the received first response message is "no service data of the terminal group is being sent on the target multicast bearer", the first participating service entity determines to use the target multicast bearer to send the to-be-sent service data of the terminal group.

For another example, when the status of use in the received first response message is "no participating service entity is using the target multicast bearer to send service data of the terminal group", the first participating service entity determines to use the target multicast bearer to send the service data of the terminal group.

For another example, when the status of use in the received first response message is "not in use", the first participating service entity determines to use the target multicast bearer to send the service data of the terminal group.

For another example, when the status of use in the received first response message is "no service data of the terminal group is being sent on the target multicast bearer", the first participating service entity determines to use the target multicast bearer to send the to-be-sent service data of the terminal group.

In an implementation, when the first participating service entity determines that another participating service entity is using the target multicast bearer to send the service data of the terminal group, the first participating service entity may still send the service data of the terminal group. In this case, the controlling service entity may discard the service data of the terminal group that is sent by one of the participating service entities, and generally discard service data that is sent later.

Further optionally, the target service entity is a controlling service entity, and after step 1304, the method further includes:

the target service entity sends a notification message to a third participating service entity, where the notification message includes the updated status of use of the target multicast bearer.

In an example, the controlling service entity notifies the updated status of use to a participating service entity other than the first participating service entity.

The third participating service entity may be a participating service entity other than the first participating service entity. This is not limited.

Further, the method may further include:

the target service entity receives a notification status report message from the third participating service entity, where the notification status report message is used to indicate that the third participating service entity instructs a terminal to receive the service data of the terminal group on the target multicast bearer.

For details, refer to the related descriptions in step 1306. Details are not described herein.

Further optionally, when the first participating service entity determines to use the target multicast bearer to send the service data of the terminal group, the method further includes:

Step 1305: The first participating service entity sends a notification message to a terminal.

Correspondingly, the method may further include: the terminal receives the notification message from the first participating service entity.

The notification message may be used to instruct the terminal to use the target multicast bearer to receive the service data of the terminal group.

The notification message may include the identity of the target multicast bearer, and optionally further include the group identity.

It should be pointed out that, for names or terms mentioned in this embodiment, refer to the related descriptions in the foregoing embodiments. This is not limited.

In an implementation, the first participating service entity sends the notification message to the service area in multicast transmission mode. In this case, terminals receiving the notification message may include some or all of the terminals in the terminal group, or may include terminals in other groups, and the terminals may be registered with the first participating service entity or may be registered with other participating service entities. This implementation may be understood as "the first participating service entity sends the notification message in the service area to some or all of the terminals in the service area in multicast transmission mode.

In another implementation, the first participating service entity sends, in unicast mode, the notification message to a terminal that is in the terminal group and is registered with the first participating service entity.

In another implementation, the first participating service entity sends, in unicast mode, the notification message to a terminal that is in the terminal group and is registered with the first participating service entity and is currently located in the service area.

The notification message is used to instruct the terminal to use the target multicast bearer to receive the service data. If the terminal receiving the notification message is not in the service area, the terminal cannot receive the service data. If the terminal receiving the notification message is not a terminal in the terminal group, processing may be performed in another processing manner. For example, the terminal discards the data packet when failed to attempt to decrypt content of the message, or discards the data packet when determining that the terminal is not a terminal in the terminal group.

Further optionally, the method further includes:

Step 1306: The first participating service entity sends a notification status report message to the target service entity.

Correspondingly, the method further includes: the target service entity receives the notification status report message from the first participating service entity.

The notification status report message may be used to indicate that the first participating service entity instructs the terminal to receive the service data of the terminal group on the target multicast bearer. The notification status report message may also be referred to as a multicast status report message, or a multicast use status report message. Details are not described again herein. It may be understood that, after the first participating service entity confirms that the terminal is successfully instructed to receive the service data of the terminal group on the target multicast bearer (for example, after receiving an acknowledgement message from the terminal), the first participating service entity performs step 1306; or the first participating service entity performs step 1306 as long as the first participating service entity sends a message to the terminal to instruct the terminal to receive the service data of the terminal group on the target multicast bearer, regardless of whether the terminal receives the message successfully.

In the method in the first implementation scenario, when the first participating service entity determines to use the target multicast bearer to send the service data of the terminal group, the first participating service entity sends the first request message to the target service entity, and determines, according to the status of use of the target multicast bearer by the terminal group in the received first response message, whether the target multicast bearer can be used to send the service data to the terminal group. When the status of use of the target multicast bearer by the terminal group is "not in use", the first participating service entity can use the target multicast bearer to send the service data. Further, the target service entity may further update the status of use of the target multicast bearer. Further, if the target service entity is a controlling service entity, the controlling service entity further notifies a participating service entity other than the first participating service entity of the updated status of use.

Optionally, on a basis of the first implementation scenario, the method further includes:

Step 1307: The first participating service entity uses the target multicast bearer to send the service data of the terminal group to the terminal.

In an implementation, when the target multicast bearer is created by the first participating service entity, the first participating service entity uses the target multicast bearer to send the service data of the terminal group, that is, the first participating service entity directly uses the target multicast bearer to send the service data of the terminal group.

In another implementation, when the target multicast bearer is not created by the first participating service entity, the first participating service entity sends indication information and the service data of the terminal group to a participating service entity creating the target multicast bearer, where the indication information is used to instruct the participating service entity creating the target multicast bearer to use the target multicast bearer to send the service data of the terminal group. To be specific, the first participating service entity sends the service data of the terminal group to the participating service entity creating the target multicast bearer, and the participating service entity creating the target multicast bearer uses the target multicast bearer to send the service data of the terminal group.

For example, if the target multicast bearer is created by the second participating service entity, the first participating service entity may obtain information about the second participating service entity (for example, including identity information of the second participating service entity, and/or address information of the second participating service entity) in a manner of pushed by the controlling service entity or an active request by the first participating service entity. The first participating service entity sends the service data of the terminal group and indication information to the second participating service entity, instructing the second participating service entity to use the target multicast bearer to send the service data of the terminal group.

In the foregoing two implementations, the participating service entity creating the target multicast bearer uses the target multicast bearer to send the service data to the terminal.

In still another implementation, regardless of which participating service entity creates the target multicast bearer, in this step, the first participating service entity uses the target multicast bearer to send the service data to the terminal. It may be understood that, a participating service entity obtaining a right to use the target multicast bearer uses the target multicast bearer to send the service data to the terminal.

Optionally, on a basis of the first implementation scenario, when the first participating service entity uses the target multicast bearer to send the service data of the terminal group, if another participating service entity (the another participating service entity may be a participating service entity that participates in communication of the terminal group, other than the first participating service entity among participating service entities with which the terminals in the terminal group are registered), such as the third participating service entity, also determines to use the target multicast bearer to send the service data of the terminal group, the method may further include step 1308 and step 1309.

Step 1308: A third participating service entity sends a second request message to the target service entity.

Correspondingly, the method may further include: the target service entity receives the second request message from the third participating service entity.

The second request message may include the group identity and the identity of the target multicast bearer, and the second request message is used to request to use the target multicast bearer to send the service data of the terminal group.

Step 1309: The target service entity sends a second response message to the third participating service entity.

Correspondingly, the method may further include: the third participating service entity receives the second response message from the target service entity.

The second response message may include the updated status of use of the target multicast bearer.

Optionally, the updated status of use is "the first participating service entity is using the target multicast bearer to send the service data of the terminal group", or "a participating service entity is using the target multicast bearer to send the service data of the terminal group", or "in use".

Therefore, if the third participating service entity learns that the target multicast bearer is currently being used, that is, another participating service entity is using the target multicast bearer to send service data to a terminal in the terminal group, to avoid repeated sending of the same service data, the third participating service entity determines not to send the service data of the terminal group. Therefore, this helps prevent a plurality of participating service entities from simultaneously using the target multicast bearer to send data to the terminal group, and further helps prevent a terminal in the terminal group from repeatedly receiving same service data. Therefore, resources can be saved.

It should be noted that, if the third participating service entity has received the notification message sent by the controlling service entity, and has learned that the target multicast bearer is already in use, the foregoing step 1308 and step 1309 may not be performed.

Further, the method may further include:

Step 1310: The third participating service entity sends a notification message to a terminal.

Correspondingly, the method may further include: the terminal receives the notification message from the third participating service entity.

The notification message may be used to instruct the terminal to use the target multicast bearer to receive the service data of the terminal group.

Optionally, the notification message includes the identity of the target multicast bearer, and optionally further includes the group identity.

In an implementation, the third participating service entity sends the notification message to the service area in multicast transmission mode. In this case, terminals receiving the notification message may include some or all of the terminals in the terminal group, or may include terminals in other groups, and the terminals may be registered with the third participating service entity or may be registered with other participating service entities. This implementation may be understood as "the third participating service entity sends the notification message in the service area to some or all of the terminals in the service area in multicast transmission mode".

In another implementation, the third participating service entity sends, in unicast mode, the notification message to a terminal that is in the terminal group and is registered with the third participating service entity.

In another implementation, the third participating service entity sends, in unicast mode, the notification message to a terminal that is in the terminal group and is registered with the third participating service entity and is currently located in the service area.

The notification message may be used to instruct the terminal to use the target multicast bearer to receive the service data. If the terminal receiving the notification message is not in the service area, the terminal cannot receive the service data. If the terminal receiving the notification message is not a terminal in the terminal group, processing may be performed in another processing manner. For example, the terminal discards the data packet when failed to attempt to decrypt content of the message, or discards the data packet when determining that the terminal is not a terminal in the terminal group.

Further, the method may further include:

Step 1311: The third participating service entity sends a notification status report message to the target service entity.

Correspondingly, the method may further include: the target service entity receives the notification status report message from the third participating service entity.

The notification status report message may be used to indicate that the third participating service entity instructs the terminal to receive the service data of the terminal group on the target multicast bearer. It may be understood that, after the third participating service entity confirms that the terminal is successfully instructed to receive the service data of the terminal group on the target multicast bearer (for example, after receiving an acknowledgement message from the terminal), the third participating service entity performs step 1311; or the third participating service entity performs step 1311 as long as the third participating service entity sends a message to the terminal to instruct the terminal to receive the service data of the terminal group on the target multicast bearer, regardless of whether the terminal receives the instruction successfully.

By performing the foregoing step 1308 to step 1310, the third participating service entity determines to use the target multicast bearer to send the service data of the terminal group. When the third participating service entity learns that the status of use of the target multicast bearer is "in use", the third participating service entity does not send the service data to the terminal, but instructs the terminal to receive the service data on the target multicast bearer. Therefore, this helps prevent a plurality of participating service entities from simultaneously using the target multicast bearer to send data to the terminal group, and further helps prevent a terminal in the terminal group from repeatedly receiving same service data. Therefore, resources can be saved.

On a basis of the first implementation scenario of the foregoing embodiment, in an implementation, when the target service entity in the foregoing embodiment is a multicast bearer management entity, each participating service entity can learn a current status of use of the multicast bearer only when sending a request message to the multicast bearer management entity. In another implementation, when the target service entity in the foregoing embodiment is a controlling service entity, the controlling service entity may actively push the latest status of use of the multicast bearer to each participating service entity, and each participating service entity may obtain the status of use of the multicast bearer.

Optionally, on a basis of the first implementation scenario of the foregoing embodiment, the method further includes:

if the first participating service entity stops using the target multicast bearer to send the service data, the first participating service entity may send an indication message to the target service entity.

The indication message is used to notify the target service entity that the first participating service entity stops using the target multicast bearer to send the service data.

Correspondingly, the method may further include: the target service entity updates the status of use of the target multicast bearer by the terminal group as "no participating service entity is using the target multicast bearer to send service data of the terminal group"; or the target service entity updates the status of use of the target multicast bearer by the terminal group as "no service data of the terminal group is being sent on the target multicast bearer"; or the target service entity updates the status of use of the target multicast bearer by the terminal group as "not in use".

Optionally, in a second implementation scenario of the foregoing embodiment, the method further includes:

the first participating service entity sends a bearer information report message to the target service entity, where the bearer information report message includes the identifier of the service area, the group identity, and the identity of the target multicast bearer; or when the target service entity is a controlling service entity, the first participating service entity receives a push message from the controlling service entity, where the push message includes the identifier of the service area, the group identity, and the identity of the target multicast bearer.

It should be noted that, the second implementation scenario and the first implementation scenario may be combined. This is not limited.

In the second implementation scenario, when the first participating service entity creates the target multicast bearer, the information about the target multicast bearer, for example, including the identifier of the service area, the group identity, and the identity of the target multicast bearer, is carried in the bearer information reporting message and sent to the target service entity, so that the target service entity can manage the target multicast bearer.

When the target multicast bearer is created by another participating service entity, and the information about the created target multicast bearer is reported to the participating service entity, if the participating service entity is a controlling service entity, the controlling service entity has a function for pushing the information about the multicast bearer. Therefore, a push message may be sent to other participating service entities (for example, including the first participating service entity) than the participating service entity creating the target multicast bearer, where the push message includes the identifier of the service area, the group identity, and the identity of the target multicast bearer. Therefore, all the participating service entities with which the terminals in the terminal group are registered can obtain information about a multicast bearer created by one of the participating service entities.

The following describes an implementation in which the target service entity in the foregoing embodiment obtains the information (including the identity of the target multicast bearer) about the target multicast bearer and manages the status of use of the target multicast bearer. The target service entity may be a controlling service entity or a multicast bearer management entity.

Implementation 1: The target service entity is a controlling service entity.

The controlling service entity may manage the participating service entities with which the terminals in the terminal group are registered.

For example, if the first participating service entity managed by the controlling service entity creates the target multicast bearer, after creating the target multicast bearer, the first participating service entity sends a bearer information report message to the controlling service entity, where the bearer information report message includes the group identity and the identity of the target multicast bearer. Optionally, the bearer information report message further includes the identifier of the service area.

The bearer information report message may be used to report the information about the created multicast bearer.

In this embodiment, when any participating service entity creates a multicast bearer and sends information about the created multicast bearer by using a report message, the report message may be referred to as a bearer information report message.

After receiving the bearer information report message sent by the first participating service entity, the controlling service entity obtains the group identity and the identity of the target multicast bearer from the message, and optionally, further obtains the identifier of the service area. Then the controlling service entity records the information about the target multicast bearer.

Further, the controlling service entity further records the status of use of the multicast bearer. For example, the following manners may exist:

Manner 1: The status of use is "in use", or the status of use is "not in use".

In this manner, the target service entity records the status of use of the multicast bearer as "in use" or "not in use".

"In use" indicates that currently a participating service entity is using the multicast bearer to send service data or that currently a participating service entity is using the multicast bearer and is ready for sending service data.

"Not in use" indicates that currently no service entity is using the multicast bearer to send service data, or that currently no participating service entity is using the multicast bearer nor is ready for sending service data.

Manner 2: The status of use is "service data of the terminal group is being sent on the multicast bearer", or the status of use is "no service data of the terminal group is being sent on the multicast bearer".

In this manner, the controlling service entity records the status of use of the multicast bearer as "service data of the terminal group is being sent on the multicast bearer", or "no service data of the terminal group is being sent on the multicast bearer".

"Service data of the terminal group is being sent on the multicast bearer" indicates that currently the multicast bearer is being used to send the service data of the terminal group.

"No service data of the terminal group is being sent on the multicast bearer" indicates that currently the multicast bearer is not being used to send the service data of the terminal group.

Manner 3: The status of use is "no participating service entity is using the multicast bearer to send service data of the terminal group", or the status of use is "a participating service entity is using the multicast bearer to send service data of the terminal group", or the status of use is "the second participating service entity is using the multicast bearer to send service data of the terminal group".

Specifically, in the manner 3, "service data of the terminal group is being sent on the multicast bearer" in the manner 2 is recorded as "a participating service entity is using the multicast bearer to send service data of the terminal group", or "the second participating service entity is using the multicast bearer to send service data of the terminal group". The second participating service entity is any participating service entity associated with the controlling service entity.

In the manner 3, "no service data of the terminal group is being sent on the multicast bearer" in the manner 2 is recorded as "no participating service entity is using the multicast bearer to send service data of the terminal group".

It should be noted that, all the foregoing three manners are methods for recording the status of use of the multicast bearer. In an actual application, any one or more of the methods may be selected for implementing.

In an actual application, any participating service entity managed by the controlling service entity may create a multicast bearer (for example, create the foregoing target multicast bearer), and report information about the created multicast bearer to the controlling service entity. For example, if a fourth participating service entity is used to represent any participating service entity managed by the controlling service entity, the reporting process may be expressed as follows: The controlling service entity receives a bearer information report message from the fourth participating service entity, where the bearer information report message includes the identifier of the service area and the identity of the multicast bearer. Optionally, the bearer information report message further includes the group identity. Optionally, the bearer information report message further includes information about the fourth participating service entity, such as address information or identity information.

In the foregoing method, the controlling service entity may record information about a multicast bearer created and reported by each participating service entity, where the recorded information includes a status of use of the multicast bearer by the terminal group.

After receiving the bearer information report message sent by the participating service entity and obtaining and recording the information about the multicast bearer, such as the group identity, the identity of the multicast bearer, and the identifier of the service area, the controlling service entity further sends a push message to other participating service entities than the participating service entity creating the multicast bearer, among the participating service entities managed by the controlling service entity, where the push message includes the group identity and the identity of the multicast bearer. Optionally, the push message further includes the identifier of the service area. Optionally, the push message further includes information about the participating service entity creating the multicast bearer. Optionally, the push message further includes the status of use of the multicast bearer by the terminal group.

In the method, after any participating service entity creates a multicast bearer, the multicast bearer information is reported to the controlling service entity. The controlling service entity, on one hand, records information about the multicast bearer, and on the other hand, pushes the information about the multicast bearer to other participating service entities, so that all the participating service entities managed by the controlling service entity can record the information about the multicast bearer.

Implementation 2: The target service entity is a multicast bearer management entity.

If the target service entity is a multicast bearer management entity, on one hand, the multicast bearer management entity may use a method same as the method for obtaining the information about the multicast bearer by the controlling service entity, to obtain information about the multicast bearer created by the participating service entity. In addition, a manner of recording the information about the multicast bearer may also be the same as the recording manner used by the controlling service entity.

On the other hand, because the multicast bearer management entity has no group information of the terminal group, and cannot learn which participating service entities are included in the group, the multicast bearer management entity may not have the foregoing push function of the controlling service entity. To be specific, after recording the information about the multicast bearer reported by the participating service entity, the multicast bearer management entity may not push the recorded information about the multicast bearer to other participating service entities.

Figure 14:
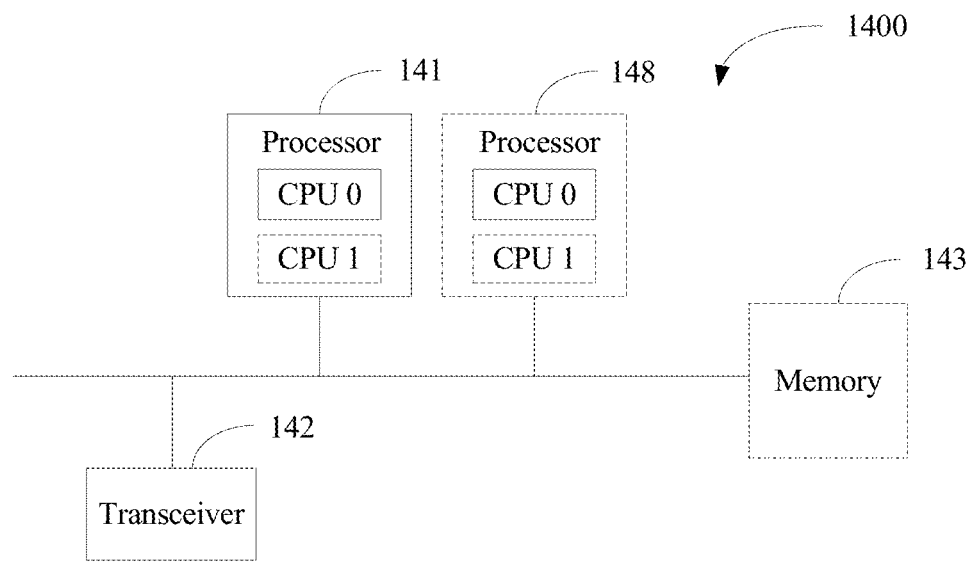
FIG. 14 is a schematic diagram of another apparatus according to this application.

Based on a same inventive concept, as shown in FIG. 14, FIG. 14 is a schematic diagram of an apparatus according to this application. The apparatus 1400 may be a target service entity, or may be a system-on-chip or a chip, and may perform the method performed by the target service entity in the embodiment shown in FIG. 13.

The apparatus 1400 includes at least one processor 141 and a transceiver 142, and optionally further includes a memory 143. The processor 141, the transceiver 142, and the memory 143 are connected by a communications bus.

The processor 141 may be a general-purpose central processing unit (CPU), a microprocessor, a specific ASIC, or one or more integrated circuits for controlling program execution in the solution of the present application.

The communications bus may include a path for transmitting information between the foregoing units.

The transceiver 142 is configured to communicate with another device or communications network. The transceiver may be a communications interface, for example, a wired interface or a wireless interface, or a Wi-Fi interface, or the transceiver includes a radio frequency circuit.

The memory 143 may be a ROM or another type of static storage device capable of storing static information and instructions, or a RAM or another type of dynamic storage device capable of storing information and instructions, or may be an EEPROM, a CD-ROM, or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 143 may exist independently, and is connected to the processor 141 by the communications bus. The memory 143 may also be integrated with the processor. The memory 143 is configured to store application program code used to execute the solution of the present application, where the application program code is executed by the processor 141. The processor 141 is configured to execute the application program code stored in the memory 143.

In a specific implementation, in an embodiment, the processor 141 may include one or more CPUs, for example, a CPU 0 and a CPU 1 in FIG. 14.

In a specific implementation, in an embodiment, the apparatus 1400 may include a plurality of processors, for example, the processor 141 and a processor 148 in FIG. 14. Each of the processors may be a single-core (single-CPU) processor, or may be a multi-core (multi-CPU) processor. Herein the processor may be one or more devices, a circuit, and/or a processing core for processing data (for example, a computer program instruction).

It should be understood that, the apparatus may be configured to implement steps performed by the target service entity in the communication method in the embodiment shown in FIG. 13. For related features, refer to the foregoing descriptions. Details are not described again herein.

Figure 15:
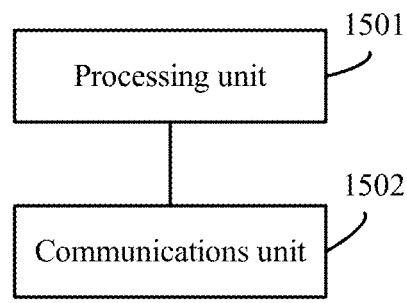
FIG. 15 is a schematic diagram of another apparatus according to this application.

In this application, functional modules in the apparatus may be obtained through division according to the foregoing method examples. For example, each functional module corresponding to each function may be obtained through division, or two or more functions may be integrated in one processing module. The integrated module may be implemented in a form of hardware, or may be implemented in a form of a software functional module. It should be noted that, division of modules in this application is merely an example, and is only division of logical functions. Other division manners may be available in actual implementations. For example, when each functional module corresponding to each function is obtained through division, FIG. 15 shows a schematic diagram of an apparatus. The apparatus may be the target service entity used in the embodiment shown in FIG. 13 or a system-on-chip or a chip. The apparatus includes a processing unit 1501 and a communications unit 1502.

The processing unit 1501 is configured to control the communications unit 1502 to:

receive a first request message from a first participating service entity, where the first request message includes a group identity and an identity of a target multicast bearer, and the first request message is used to request to use the target multicast bearer to send service data of a terminal group corresponding to the group identity; and send a first response message to the first participating service entity, where the first response message includes a status of use of the target multicast bearer by the terminal group.

In a possible implementation, the status of use includes:

in use or not in use; or service data of the terminal group is being sent on the target multicast bearer, or no service data of the terminal group is being sent on the target multicast bearer; or no participating service entity is using the target multicast bearer to send service data of the terminal group, or a participating service entity is using the target multicast bearer to send service data of the terminal group, or a second participating service entity is using the target multicast bearer to send service data of the terminal group.

In a possible implementation, the processing unit 1501 is further configured to control the communications unit 1502 to:

receive an indication message from the first participating service entity, where the indication message is used to indicate that the first participating service entity is using the target multicast bearer to send the service data of the terminal group; and the processing unit 1501 is further configured to update, according to the indication message, the status of use.

In a possible implementation, the processing unit 1501 is specifically configured to:

update the status of use to "the first participating service entity is using the target multicast bearer to send the service data of the terminal group"; or update the status of use to "a participating service entity is using the target multicast bearer to send the service data of the terminal group"; or update the status of use to "in use".

In a possible implementation, the processing unit 1501 is further configured to control the communications unit 1502 to:

receive a second request message from a third participating service entity, where the second request message includes the group identity and the identity of the target multicast bearer, and the second request message is used to request to use the target multicast bearer to send service data of the terminal group; and send a second response message to the third participating service entity, where the second response message includes the updated status of use of the target multicast bearer.

In a possible implementation, the apparatus 1500 is a controlling service entity, and the processing unit 1501 is further configured to control the communications unit 1502 to: send a notification message to a third participating service entity, where the notification message includes the updated status of use of the target multicast bearer.

In a possible implementation, the processing unit 1501 is further configured to control the communications unit 1502 to:

receive a notification status report message from the third participating service entity, where the notification status report message is used to indicate that the third participating service entity instructs a terminal to receive the service data of the terminal group on the target multicast bearer.

In a possible implementation, the processing unit 1501 is further configured to control the communications unit 1502 to:

receive a bearer information report message from a fourth participating service entity, where the bearer information report message may include an identifier of a service area, the group identity, and the identity of the target multicast bearer, and optionally, further include an identity and/or an address of the fourth participating service entity.

In this embodiment, the apparatus is presented in a form of functional modules obtained through division and corresponding to functions, or the apparatus is presented in a form of functional modules obtained through integration. Herein the "module" may be an ASIC, a circuit, a processor and a memory executing one or more software or firmware programs, an integrated logic circuit, and/or other components that may provide the foregoing functions.

It should be understood that, the apparatus may be configured to implement steps performed by the target service entity in the communication method in the embodiment of the present application. For related features, refer to the foregoing descriptions. Details are not described again herein.

Figure 16:
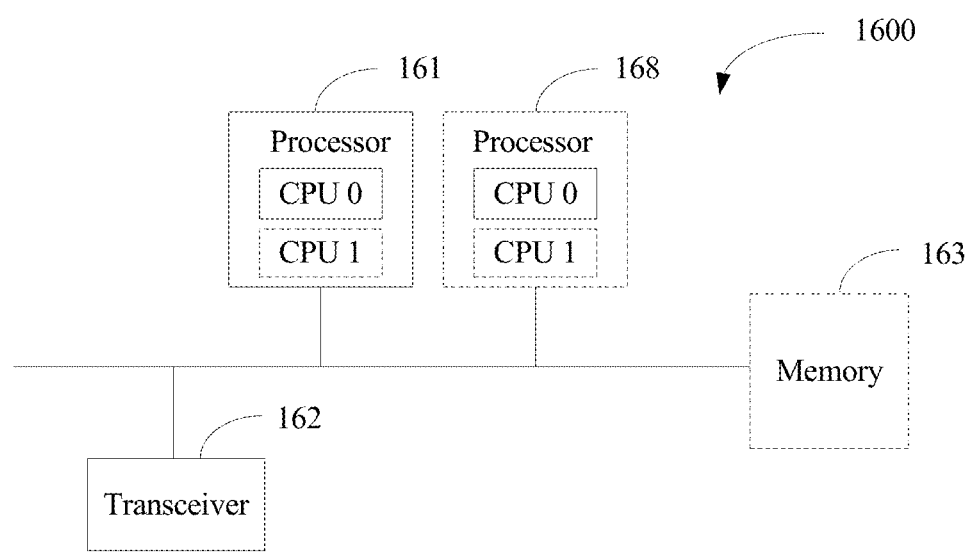
FIG. 16 is a schematic diagram of another apparatus according to this application.

Based on a same inventive concept, as shown in FIG. 16, FIG. 16 is a schematic diagram of an apparatus according to this application. The apparatus 1600 may be, for example, a participating service entity, or may be a system-on-chip or a chip, and may perform the method performed by the first participating service entity in the embodiment shown in FIG. 13.

The apparatus 1600 includes at least one processor 161 and a transceiver 162, and optionally further includes a memory 163. The processor 161, the transceiver 162, and the memory 163 are connected by a communications bus.

The processor 161 may be a general-purpose central processing unit (CPU), a microprocessor, an ASIC, or one or more integrated circuits for controlling program execution in the solution of the present application.

The communications bus may include a path for transmitting information between the foregoing units.

The transceiver 162 is configured to communicate with another device or communications network. The transceiver may be a communications interface, for example, a wired interface or a wireless interface, or a Wi-Fi interface, or the transceiver includes a radio frequency circuit.

The memory 163 may be a ROM or another type of static storage device capable of storing static information and instructions, or a RAM or another type of dynamic storage device capable of storing information and instructions, or may be an EEPROM, a CD-ROM, or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 163 may exist independently, and is connected to the processor 161 by the communications bus. The memory 163 may also be integrated with the processor. The memory 163 is configured to store application program code used to execute the solution of the present application, where the application program code is executed by the processor 161. The processor 161 is configured to execute the application program code stored in the memory 163.

In a specific implementation, in an embodiment, the processor 161 may include one or more CPUs, for example, a CPU 0 and a CPU 1 in FIG. 16.

In a specific implementation, in an embodiment, the apparatus 1600 may include a plurality of processors, for example, the processor 161 and a processor 168 in FIG. 16. Each of the processors may be a single-core (single-CPU) processor, or may be a multi-core (multi-CPU) processor. Herein the processor may be one or more devices, a circuit, and/or a processing core for processing data (for example, a computer program instruction).

It should be understood that the apparatus may be configured to implement steps performed by the first participating service entity in the communication method in the embodiment shown in FIG. 13. For related features, refer to the foregoing descriptions. Details are not described again herein.

Figure 17:
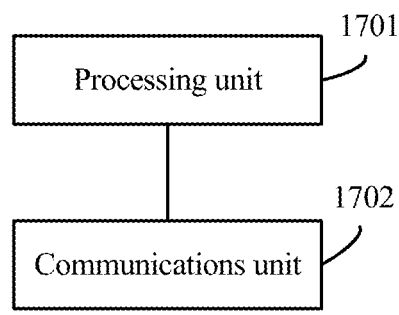
FIG. 17 is a schematic diagram of another apparatus according to this application.

In this application, functional modules in the apparatus may be obtained through division according to the foregoing method examples. For example, each functional module corresponding to each function may be obtained through division, or two or more functions may be integrated in one processing module. The integrated module may be implemented in a form of hardware, or may be implemented in a form of a software functional module. It should be noted that, division of modules in this application is merely an example, and is only division of logical functions. Other division manners may be available in actual implementations. For example, when each functional module corresponding to each function is obtained through division, FIG. 17 shows a schematic diagram of an apparatus. The apparatus may be the first participating service entity used in the embodiment shown in FIG. 13. The apparatus includes a processing unit 1701 and a communications unit 1702.

The processing unit 1701 is configured to control the communications unit 1702 to:

send a request message to a target service entity, where the request message includes a group identity and an identity of a target multicast bearer, and the request message is used to request to use the target multicast bearer to send service data of a terminal group corresponding to the group identity; and receive a response message from the target service entity, where the response message includes a status of use of the target multicast bearer by the terminal group.

In a possible implementation, the processing unit 1701 is further configured to determine, according to the status of use, to use the target multicast bearer to send the service data of the terminal group; and the processing unit 1701 is further configured to control the communications unit 1702 to send an indication message to the target service entity, where the indication message is used to indicate that the first participating service entity is using the target multicast bearer to send the service data of the terminal group.

In a possible implementation, the processing unit 1701 is specifically configured to:

when there is to-be-sent service data of the terminal group in the first participating service entity, and the status of use is "no participating service entity is using the target multicast bearer to send service data of the terminal group", or the status of use is "not in use", or the status of use is "no service data of the terminal group is being sent on the target multicast bearer", determine to use the target multicast bearer to send the service data of the terminal group; or when the status of use is "no participating service entity is using the target multicast bearer to send service data of the terminal group", or the status of use is "not in use", or the status of use is "no service data of the terminal group is being sent on the target multicast bearer", determine to use the target multicast bearer to send the service data of the terminal group.

In a possible implementation, the processing unit 1701 is further configured to control the communications unit 1702 to send a notification message to a terminal, where the notification message is used to instruct the terminal to receive the service data of the terminal group by using the target multicast bearer.

In a possible implementation, the processing unit 1701 is further configured to control the communications unit 1702 to send a notification status report message to the target service entity, where the notification status report message is used to indicate that the first participating service entity instructs the terminal to receive the service data of the terminal group on the target multicast bearer.

In a possible implementation, when the target multicast bearer is created by the first participating service entity, the processing unit 1701 is further configured to control the communications unit 1702 to use the target multicast bearer to send the service data of the terminal group; or when the target multicast bearer is created by a second participating service entity, the processing unit 1701 is further configured to control the communications unit 1702 to send indication information and to-be-sent service data of the terminal group to the second participating service entity, where the indication information is used to instruct the second participating service entity to use the target multicast bearer to send the to-be-sent service data of the terminal group.

In a possible implementation, the processing unit 1701 is further configured to control the communications unit 1702 to:

send a bearer information report message to the target service entity, where the bearer information report message includes an identifier of a service area, the group identity, and the identity of the target multicast bearer; or receive a push message from the target service entity, where the push message includes an identifier of a service area, the group identity, and the identity of the target multicast bearer.

In this embodiment, the apparatus is presented in a form of functional modules obtained through division and corresponding to functions, or the apparatus is presented in a form of functional modules obtained through integration. Herein the "module" may be an ASIC, a circuit, a processor and a memory executing one or more software or firmware programs, an integrated logic circuit, and/or other components that may provide the foregoing functions.

It should be understood that, the apparatus may be configured to implement steps performed by the first participating service entity in the communication method in the embodiment shown in FIG. 13 of the present application. For related features, refer to the foregoing descriptions. Details are not described again herein.

Figure 18:
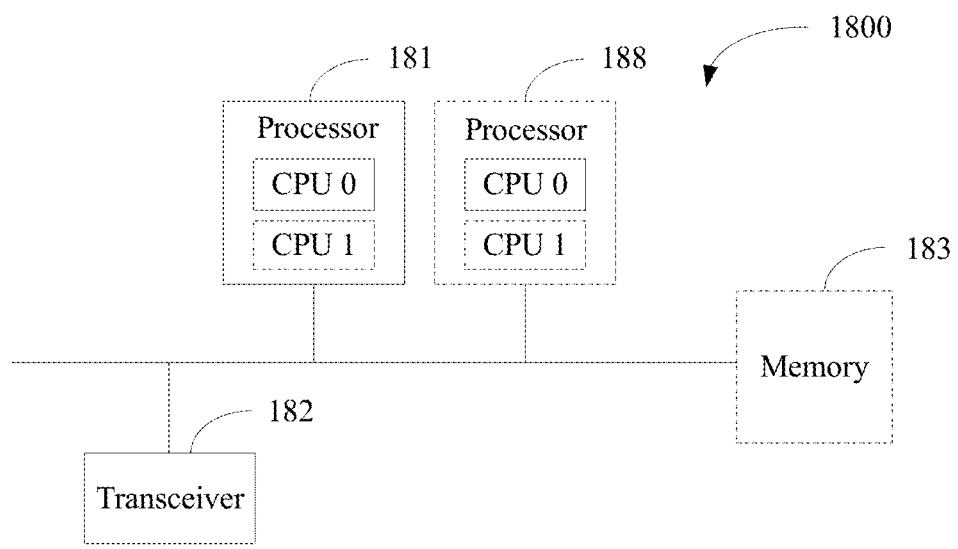
FIG. 18 is a schematic diagram of another apparatus according to this application.

Based on a same inventive concept, as shown in FIG. 18, FIG. 18 is a schematic diagram of an apparatus according to this application. The apparatus 1800 may be a target service entity, or may be a system-on-chip or a chip, and may perform the method performed by the target service entity in step 4011 to step 4014 in the foregoing embodiment.

The apparatus 1800 includes at least one processor 181 and a transceiver 182, and optionally further includes a memory 183. The processor 181, the transceiver 182, and the memory 183 are connected by a communications bus.

The processor 181 may be a general-purpose central processing unit (CPU), a microprocessor, a specific ASIC, or one or more integrated circuits for controlling program execution in the solution of the present application.

The communications bus may include a path for transmitting information between the foregoing units.

The transceiver 182 is configured to communicate with another device or communications network. The transceiver may be a communications interface, for example, a wired interface or a wireless interface, or a Wi-Fi interface, or the transceiver includes a radio frequency circuit.

The memory 183 may be a ROM or another type of static storage device capable of storing static information and instructions, or a RAM or another type of dynamic storage device capable of storing information and instructions, or may be an EEPROM, a CD-ROM, or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 183 may exist independently, and is connected to the processor 181 by the communications bus. The memory 183 may also be integrated with the processor. The memory 183 is configured to store application program code used to execute the solution of the present application, where the application program code is executed by the processor 181. The processor 181 is configured to execute the application program code stored in the memory 183.

In a specific implementation, in an embodiment, the processor 181 may include one or more CPUs, for example, a CPU 0 and a CPU 1 in FIG. 18.

In a specific implementation, in an embodiment, the apparatus 1800 may include a plurality of processors, for example, the processor 181 and a processor 188 in FIG. 18. Each of the processors may be a single-core (single-CPU) processor, or may be a multi-core (multi-CPU) processor. Herein the processor may be one or more devices, a circuit, and/or a processing core for processing data (for example, a computer program instruction).

It should be understood that, the apparatus may be configured to implement steps performed by the target service entity in step 4011 to step 4014 in the foregoing embodiment. For related features, refer to the foregoing descriptions. Details are not described again herein.

Figure 19:
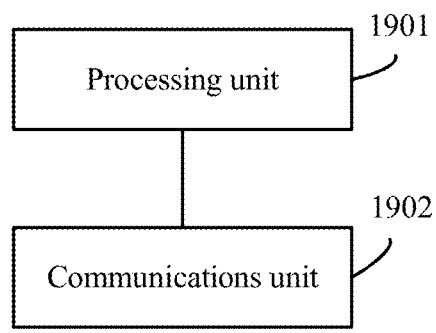
FIG. 19 is a schematic diagram of another apparatus according to this application.

In this application, functional modules in the apparatus may be obtained through division according to the foregoing method examples. For example, each functional module corresponding to each function may be obtained through division, or two or more functions may be integrated in one processing module. The integrated module may be implemented in a form of hardware, or may be implemented in a form of a software functional module. It should be noted that, division of modules in this application is merely an example, and is only division of logical functions. Other division manners may be available in actual implementations. For example, when each functional module corresponding to each function is obtained through division, FIG. 19 shows a schematic diagram of an apparatus. The apparatus may be the target service entity used in the embodiment shown in FIG. 13 or a system-on-chip or a chip. The apparatus includes a processing unit 1901 and a communications unit 1902.

The processing unit 1901 is configured to control the communications unit 1902 to:

receive a first request message from a first participating service entity, where the first request message includes an identity of a target multicast bearer and a group identity of a terminal group, and the first request message is used to request to use the target multicast bearer to send service data of the terminal group; and send a first response message to the first participating service entity, where the first response message is used to instruct the first participating service entity to use the target multicast bearer to send the service data of the terminal group.

In a possible implementation, the first response message includes first indication information, and the first indication information is used to instruct the first participating service entity to use the target multicast bearer to send the service data of the terminal group.

In a possible implementation, the processing unit 1901 is further configured to control the communications unit 1902 to:

receive a second request message from a second participating service entity, where the second request message includes the identity of the target multicast bearer and the group identity of the terminal group, and the second request message is used to request to use the target multicast bearer to send service data of the terminal group; and send a second response message to the second service entity, where the second response message is used to instruct the second participating service entity not to use the target multicast bearer to send the service data of the terminal group.

In a possible implementation, the second response message includes second indication information, and the second indication information is used to instruct the second participating service entity not to use the target multicast bearer to send the service data of the terminal group.

In a possible implementation, the processing unit 1901 is further configured to control the communications unit 1902 to:

receive a report message from a third participating service entity, where the report message includes the identity of the target multicast bearer.

In a possible implementation, the report message further includes address information of the third participating service entity.

In this embodiment, the apparatus is presented in a form of functional modules obtained through division and corresponding to functions, or the apparatus is presented in a form of functional modules obtained through integration. Herein the "module" may be an ASIC, a circuit, a processor and a memory executing one or more software or firmware programs, an integrated logic circuit, and/or other components that may provide the foregoing functions.

It should be understood that, the apparatus may be configured to implement steps performed by the target service entity in step 4011 to step 4014 in the foregoing embodiment of the present application. For related features, refer to the foregoing descriptions. Details are not described again herein.

Figure 20:
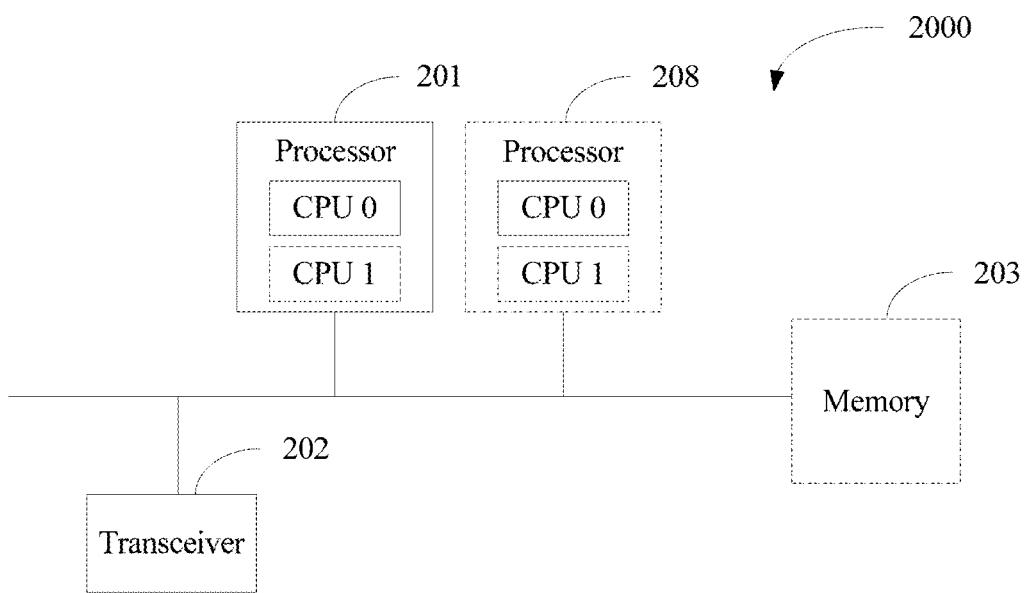
FIG. 20 is a schematic diagram of another apparatus according to this application.

Based on a same inventive concept, as shown in FIG. 20, FIG. 20 is a schematic diagram of an apparatus according to this application. The apparatus 2000 may be, for example, a participating service entity, or may be a system-on-chip or a chip, and may perform the method performed by the participating service entity in step 4011 to step 4014 in the foregoing embodiment.

The apparatus 2000 includes at least one processor 201 and a transceiver 202, and optionally further includes a memory 203. The processor 201, the transceiver 202, and the memory 203 are connected by a communications bus.

The processor 201 may be a general-purpose central processing unit (CPU), a microprocessor, an ASIC, or one or more integrated circuits for controlling program execution in the solution of the present application.

The communications bus may include a path for transmitting information between the foregoing units.

The transceiver 202 is configured to communicate with another device or communications network. The transceiver may be a communications interface, for example, a wired interface or a wireless interface, or a Wi-Fi interface, or the transceiver includes a radio frequency circuit.

The memory 203 may be a ROM or another type of static storage device capable of storing static information and instructions, or a RAM or another type of dynamic storage device capable of storing information and instructions, or may be an EEPROM, a CD-ROM, or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory 203 may exist independently, and is connected to the processor 201 by the communications bus. The memory 203 may also be integrated with the processor. The memory 203 is configured to store application program code used to execute the solution of the present application, where the application program code is executed by the processor 201. The processor 201 is configured to execute the application program code stored in the memory 203.

In a specific implementation, in an embodiment, the processor 201 may include one or more CPUs, for example, a CPU 0 and a CPU 1 in FIG. 20.

In a specific implementation, in an embodiment, the apparatus 2000 may include a plurality of processors, for example, the processor 201 and a processor 208 in FIG. 20. Each of the processors may be a single-core (single-CPU) processor, or may be a multi-core (multi-CPU) processor. Herein the processor may be one or more devices, a circuit, and/or a processing core for processing data (for example, a computer program instruction).

It should be understood that, the apparatus may be configured to implement steps performed by the participating service entity in step 4011 to step 4014 in the foregoing embodiment. For related features, refer to the foregoing descriptions. Details are not described again herein.

Figure 21:
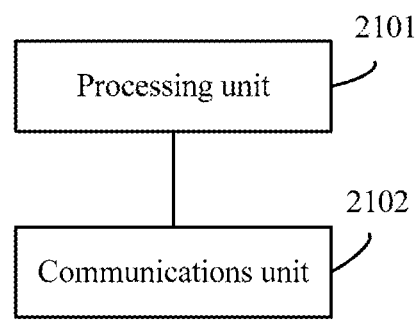
FIG. 21 is a schematic diagram of another apparatus according to this application.

In this application, functional modules in the apparatus may be obtained through division according to the foregoing method examples. For example, each functional module corresponding to each function may be obtained through division, or two or more functions may be integrated in one processing module. The integrated module may be implemented in a form of hardware, or may be implemented in a form of a software functional module. It should be noted that, division of modules in this application is merely an example, and is only division of logical functions. Other division manners may be available in actual implementations. For example, when each functional module corresponding to each function is obtained through division, FIG. 21 shows a schematic diagram of an apparatus. The apparatus may be the participating service entity used in step 4011 to step 4014 in the foregoing embodiment. The apparatus includes a processing unit 2101 and a communications unit 2102.

The processing unit 2101 is configured to control the communications unit 2102 to:

send a request message to a target service entity, where the request message includes an identity of a target multicast bearer and a group identity of a terminal group, and the request message is used to request to use the target multicast bearer to send service data of the terminal group; and receive a response message from the target service entity, where the response message is used to instruct the participating service entity to use the target multicast bearer to send the service data of the terminal group.

In a possible implementation, the response message includes first indication information, and the first indication information is used to instruct the participating service entity to use the target multicast bearer to send the service data of the terminal group.

In a possible implementation, the processing unit 2101 is further configured to control the communications unit 2102 to:

use the target multicast bearer to send the service data of the terminal group.

In this embodiment, the apparatus is presented in a form of functional modules obtained through division and corresponding to functions, or the apparatus is presented in a form of functional modules obtained through integration. Herein the "module" may be an ASIC, a circuit, a processor and a memory executing one or more software or firmware programs, an integrated logic circuit, and/or other components that may provide the foregoing functions.

It should be understood that, the apparatus may be configured to implement steps performed by the participating service entity in step 4011 to step 4014 in the foregoing embodiment. For related features, refer to the foregoing descriptions. Details are not described again herein.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

Although the present application is described with reference to the embodiments, in a process of implementing the present application that claims protection, a person in the art may understand and implement another variation of the disclosed embodiments by referring to the accompanying drawings, disclosed content, and the accompanying claims. In the claims, "including" (including) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), a computer-readable storage medium, or a computer program product. Therefore, this application may use a form of hardware only embodiments, software only embodiments, or embodiments with a combination of software and hardware. They are collectively referred to as "modules" or "systems".

This application is described with reference to the flowcharts and/or block diagrams of the method, the apparatus (device), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present application is described with reference to specific features and the embodiments thereof, obviously, various modifications and combinations may be made to them without departing from the spirit and scope of the present application. Correspondingly, the specification and accompanying drawings are merely descriptions of examples of the present application defined by the accompanying claims, and are considered as any or all of modifications, variations, combinations or equivalents that cover the scope of the present application. Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A communication method, comprising:
  receiving, by a target service server, a first request message from a first participating service server, wherein the first request message comprises an identity of a target multicast bearer and a group identity of a terminal group, and wherein the first request message is used to request to use the target multicast bearer to send service data of the terminal group;
  determining, by the target service server, that the service data of the terminal group is sent by another participating service server, and determining, by the target service server, that a multicast bearer used by the another participating service server to send the service data of the terminal group is the same as the target multicast bearer identified in the first request message, wherein the first participating service server and the another participating service server serve users in a same service area, wherein the target multicast bearer is used to send service data of the terminal group in the same service area; and
  sending, by the target service server, a first response message to the first participating service server, wherein the first response message indicates to the first participating service server not to use the target multicast bearer to send the service data of the terminal group, in response to determining that the service data of the terminal group is sent by the another participating service server and determining that the multicast bearer used by the another participating service server to send the service data of the terminal group is the same as the target multicast bearer identified in the first request message.

2. The method according to claim 1, wherein the first response message comprises first indication information, and wherein the first indication information indicates to the first participating service server not to use the target multicast bearer to send the service data of the terminal group.

3. The method according to claim 1, wherein the method further comprises:
sending, by the target service server, a second response message to the first participating service server, wherein the second response message indicates to the first participating service server to use the target multicast bearer to send the service data of the terminal group, in response to determining that the service data of the terminal group is not sent by the another participating service server or determining that the multicast bearer used by the another participating service server to send the service data of the terminal group is different from the target multicast bearer identified in the first request message.

4. The method according to claim 3, wherein the second response message comprises second indication information, and wherein the second indication information indicates to the another participating service server to use the target multicast bearer to send the service data of the terminal group.

5. The method according to claim 1, wherein the target service server is a controlling service server or a multicast bearer management server.

6. A communication method, comprising:
sending, by a first participating service server, a request message to a target service server, wherein the request message comprises an identity of a target multicast bearer and a group identity of a terminal group, and wherein the request message is used to request to use the target multicast bearer to send service data of the terminal group;
receiving, by the target service server, the request message;
determining, by the target service server, that the service data of the terminal group is sent by another participating service server, and determining, by the target service server, that a multicast bearer used by the another participating service server to send the service data of the terminal group is the same as the target multicast bearer identified in a first request message, wherein the first participating service server and the another participating service server serve users in a same service area, wherein the target multicast bearer is used to send service data of the terminal group in the same service area;
sending, by the target service server, a response message to the first participating service server, wherein the response message indicates to the first participating service server not to use the target multicast bearer to send the service data of the terminal group, in response to determining that the service data of the terminal group is sent by the another participating service server and determining that the multicast bearer used by the another participating service server to send the service data of the terminal group is the same as the target multicast bearer identified in the first request message; and receiving, by the first participating service server, the response message from the target service server.

7. The method according to claim 6, wherein the response message comprises first indication information, and wherein the first indication information indicates to the first participating service server not to use the target multicast bearer to send the service data of the terminal group.

8. The method according to claim 6, wherein the target service server is a controlling service server or a multicast bearer management server.

9. An apparatus, comprising at least one processor and a non-transitory memory, wherein:
the non-transitory memory is configured to store a set of programs; and
the at least one processor is configured to invoke the programs stored in the memory to perform the following steps:
receiving a first request message from a first participating service server, wherein the first request message comprises an identity of a target multicast bearer and a group identity of a terminal group, and wherein the first request message is used to request to use the target multicast bearer to send service data of the terminal group;
determining that the service data of the terminal group is sent by another participating service server, and determining that a multicast bearer used by the another participating service server to send the service data of the terminal group is the same as the target multicast bearer identified in the first request message, wherein the first participating service server and the another participating service server serve users in a same service area, wherein the target multicast bearer is used to send service data of the terminal group in the same service area; and
sending a first response message to the first participating service server, wherein the first response message indicates to the first participating service server not to use the target multicast bearer to send the service data of the terminal group, in response to determining that the service data of the terminal group is sent by the another participating service server and determining that the multicast bearer used by the another participating service server to send the service data of the terminal group is the same as the target multicast bearer identified in the first request message.

10. The apparatus according to claim 9, wherein the first response message comprises first indication information, and wherein the first indication information indicates to the first participating service server not to use the target multicast bearer to send the service data of the terminal group.

11. The apparatus according to claim 9, wherein the steps further comprises:
sending a second response message to the first participating service server, wherein the second response message indicates to the first participating service server to use the target multicast bearer to send the service data of the terminal group, in response to determining that the service data of the terminal group is not sent by the another participating service server or determining that the multicast bearer used by the another participating service server to send the service data of the terminal group is different from the target multicast bearer identified in the first request message.

12. The apparatus according to claim 11, wherein the second response message comprises second indication information, and wherein the second indication information indicates to a second participating service server to use the target multicast bearer to send the service data of the terminal group.

13. The apparatus according to claim 9, wherein the apparatus is a controlling service server or a multicast bearer management server.

14. A system, comprising a first participating service server and a target service server, wherein:
the first participating service server is configured to:
send a request message to the target service server, wherein the request message comprises an identity of a target multicast bearer and a group identity of a terminal group, and wherein the request message is used to request to use the target multicast bearer to send service data of the terminal group; the target service server is configured to:
receive the request message;
determine that the service data of the terminal group is sent by another participating service server, and determine that a multicast bearer used by the another participating service server to send the service data of the terminal group is the same as the target multicast bearer identified in a first request message, wherein the first participating service server and the another participating service server serve users in a same service area, wherein the target multicast bearer is used to send service data of the terminal group in the same service area; and
send a first response message to the first participating service server, wherein the first response message indicates to the first participating service server not to use the target multicast bearer to send the service data of the terminal group, in response to determining that the service data of the terminal group is sent by the another participating service server and determining that the multicast bearer used by the another participating service server to send the service data of the terminal group is the same as the target multicast bearer identified in the first request message; and
the first participating service server is further configured to:
receive the first response message.

15. The system according to claim 14, wherein the first response message comprises first indication information, and wherein the first indication information indicates to the first participating service server not to use the target multicast bearer to send the service data of the terminal group.

16. The system according to claim 14, wherein the target service server is a controlling service server or a multicast bearer management server.

17. The method according to claim 1, wherein the method further comprises:
receiving, by the target service server, a second request message from the first participating service server, wherein the second request message comprises an identifier of the same service area, wherein the second request message is used to request to query the target multicast bearer; and
sending, by the target service server, a second response message to the first participating service server, wherein the second response message comprises an identity of the target multicast bearer.

18. The method according to claim 6, wherein the method further comprises:

sending, by the first participating service server, a second request message to the target service server, wherein the second request message comprises an identifier of the same service area, and wherein the second request message requests to query a target multicast bearer;
receiving, by the target service server, the second request message from the first participating service server;
sending, by the target service server, a second response message to the first participating service server, wherein the second response message comprises an identity of the target multicast bearer; and
receiving, by the first participating service server, the second response message from the target service server.

19. The method according to claim 6, wherein the method further comprises:
sending, by the target service server, a second response message to the first participating service server, wherein the second response message indicates to the first participating service server to use the target multicast bearer to send the service data of the terminal group, in response to determining that the service data of the terminal group is not sent by the another participating service server or determining that the multicast bearer used by the another participating service server to send the service data of the terminal group is different from the target multicast bearer identified in the first request message; and
receiving, by the first participating service server, the second response message from the target service server.

20. The apparatus according to claim 9, wherein the steps further comprises:
receiving a second request message from the first participating service server, wherein the second request message comprises an identifier of the same service area, wherein the second request message requests to query the target multicast bearer; and
sending a second response message to the first participating service server, wherein the second response message comprises an identity of the target multicast bearer.

21. The system according to claim 14, wherein:
the first participating service server is further configured to:
send a second request message to the target service server, wherein the second request message comprises an identifier of the same service area, and wherein the second request message requests to query a target multicast bearer; and
receive a second response message from the target service server, wherein the second response message comprises an identity of the target multicast bearer; and
the target service server is further configured to:
receive a second request message from the first participating service server, wherein the second request message comprises the identifier of the same service area, and wherein the second request message requests to query a target multicast bearer; and
send a second response message to the first participating service server, wherein the second response message comprises an identity of the target multicast bearer.

22. The system according to claim 14, wherein:
the first participating service server is further configured to:
send a second response message to the first participating service server, wherein the second response message indicates to the first participating service server to use the target multicast bearer to send the service data of the terminal group, in response to determining that the service data of the terminal group is not sent by the another participating service server or determining that the multicast bearer used by the another participating service server to send the service data of the terminal group is different from the target multicast bearer identified in the first request message the first participating service server is further configured to:

receive the second response message from the target service server.

* * * * *